United States Patent
Nugent

(10) Patent No.: US 7,426,501 B2
(45) Date of Patent: Sep. 16, 2008

(54) NANOTECHNOLOGY NEURAL NETWORK METHODS AND SYSTEMS

(75) Inventor: Alex Nugent, Santa Fe, NM (US)

(73) Assignee: Knowntech, LLC, Albuquerque, NM (US)

( * ) Notice: Subject to any disclaimer, the term of this patent is extended or adjusted under 35 U.S.C. 154(b) by 306 days.

(21) Appl. No.: 10/735,934

(22) Filed: Dec. 15, 2003

(65) Prior Publication Data

US 2005/0015351 A1    Jan. 20, 2005

Related U.S. Application Data

(60) Provisional application No. 60/488,860, filed on Jul. 18, 2003.

(51) Int. Cl.
  *G06E 1/00*    (2006.01)
  *G06E 3/00*    (2006.01)
  *G06F 15/18*   (2006.01)
  *G06G 7/00*    (2006.01)

(52) U.S. Cl. .............................. 706/26; 706/15; 706/25; 706/33

(58) Field of Classification Search ............ 706/1, 706/15, 23, 25, 27, 33, 26; 709/26; 977/DIG. 1; 29/872
See application file for complete search history.

(56) References Cited

U.S. PATENT DOCUMENTS

| | | | |
|---|---|---|---|
| 2,707,223 A | | 4/1955 | Hollman ................... 338/32 R |
| 3,222,654 A | * | 12/1965 | Widrow et al. .............. 365/153 |
| 3,833,894 A | | 9/1974 | Aviram et al. ............... 365/151 |
| 4,802,951 A | | 2/1989 | Clark et al. .................. 156/630 |
| 4,926,064 A | | 5/1990 | Tapang ......................... 706/26 |
| 4,974,146 A | | 11/1990 | Works et al. ................ 364/200 |
| 4,988,891 A | | 1/1991 | Mashiko ..................... 307/201 |
| 5,315,162 A | * | 5/1994 | McHardy et al. .............. 706/33 |

(Continued)

FOREIGN PATENT DOCUMENTS

EP    1 022 764 A1    1/2000

(Continued)

OTHER PUBLICATIONS

Paul M. Adriani et al., Electric-field-induced aggregation in dilute colloidal suspensions, 1990, Faraday Discussions of the Chemical Society, 16-29.*

(Continued)

*Primary Examiner*—Joseph P Hirl
(74) *Attorney, Agent, or Firm*—Kermit D. Lopez; Luis M. Ortiz; Ortiz & Lopez, PLLC

(57) ABSTRACT

A physical neural network is disclosed, which includes a connection network comprising a plurality of molecular conducting connections suspended within a connection gap formed between one or more input electrodes and one or more output electrodes. One or more molecular connections of the molecular conducting connections can be strengthened or weakened according to an application of an electric field across said connection gap. Thus, a plurality of physical neurons can be formed from said molecular conducting connections of said connection network. Additionally, a gate can be located adjacent said connection gap and which comes into contact with said connection network. The gate can be connected to logic circuitry which can activate or deactivate individual physical neurons among said plurality of physical neurons.

20 Claims, 24 Drawing Sheets

U.S. PATENT DOCUMENTS

| | | | |
|---|---|---|---|
| 5,355,435 A * | 10/1994 | DeYong et al. | 706/26 |
| 5,422,983 A | 6/1995 | Castelaz et al. | 395/24 |
| 5,475,794 A | 12/1995 | Mashiko | 395/24 |
| 5,589,692 A | 12/1996 | Reed | 257/23 |
| 5,615,305 A * | 3/1997 | Nunally | 706/35 |
| 5,649,063 A | 7/1997 | Bose | 395/22 |
| 5,670,818 A | 9/1997 | Forouhi et al. | 257/530 |
| 5,696,883 A * | 12/1997 | Arima | 706/38 |
| 5,706,404 A | 1/1998 | Colak | 395/24 |
| 5,717,832 A | 2/1998 | Steimle et al. | 395/24 |
| 5,761,115 A | 6/1998 | Kozicki et al. | 365/182 |
| 5,783,840 A | 7/1998 | Randall et al. | 257/24 |
| 5,812,993 A | 9/1998 | Ginosar et al. | 706/26 |
| 5,864,835 A * | 1/1999 | Gorelik | 706/33 |
| 5,896,312 A | 4/1999 | Kozicki et al. | 365/153 |
| 5,904,545 A | 5/1999 | Smith et al. | 438/455 |
| 5,914,893 A | 6/1999 | Kozicki et al. | 365/107 |
| 5,951,881 A | 9/1999 | Rogers et al. | 216/41 |
| 5,978,782 A | 11/1999 | Neely | 706/16 |
| 6,026,358 A | 2/2000 | Tomabechi | 704/232 |
| 6,084,796 A | 7/2000 | Kozicki et al. | 365/153 |
| 6,128,214 A | 10/2000 | Kuekes et al. | 365/151 |
| 6,245,630 B1 | 6/2001 | Ishikawa | 438/393 |
| 6,248,529 B1 | 6/2001 | Connolly | 435/6 |
| 6,256,767 B1 | 7/2001 | Kuekes et al. | 716/9 |
| 6,282,530 B1 | 8/2001 | Huang | 706/41 |
| 6,294,450 B1 | 9/2001 | Chen et al. | 438/597 |
| 6,314,019 B1 | 11/2001 | Kuekes et al. | 365/151 |
| 6,330,553 B1 | 12/2001 | Uchikawa et al. | 706/2 |
| 6,335,291 B1 | 1/2002 | Freeman | 438/706 |
| 6,339,227 B1 | 1/2002 | Ellenbogen | 257/40 |
| 6,359,288 B1 | 3/2002 | Ying et al. | 257/14 |
| 6,363,369 B1 | 3/2002 | Liaw et al. | 706/15 |
| 6,383,923 B1 | 5/2002 | Brown et al. | 438/666 |
| 6,389,404 B1 | 5/2002 | Carson et al. | 706/18 |
| 6,407,443 B2 | 6/2002 | Chen et al. | 257/616 |
| 6,418,423 B1 | 7/2002 | Kambhatla et al. | 706/15 |
| 6,420,092 B1 | 7/2002 | Yang et al. | 430/311 |
| 6,422,450 B1 | 7/2002 | Zhou et al. | 228/121.85 |
| 6,423,583 B1 | 7/2002 | Avouris et al. | 438/132 |
| 6,424,961 B1 | 7/2002 | Ayala | 706/25 |
| 6,426,134 B1 | 7/2002 | Lavin et al. | 428/300.1 |
| 6,536,106 B1 * | 3/2003 | Jackson et al. | 29/872 |
| 6,620,346 B1 | 9/2003 | Schultz et al. | 252/519.51 |
| 6,798,692 B2 | 9/2004 | Kozicki et al. | 365/174 |
| 6,855,329 B1 | 2/2005 | Shakesheff et al. | 424/409 |
| 2001/0004471 A1 | 6/2001 | Zhang | 427/372.2 |
| 2001/0023986 A1 | 9/2001 | Mancevski | 257/741 |
| 2001/0024633 A1 | 9/2001 | Lee et al. | 423/447.3 |
| 2001/0031900 A1 | 10/2001 | Margrave et al. | 570/126 |
| 2001/0041160 A1 | 11/2001 | Margrave et al. | 423/460 |
| 2001/0044114 A1 | 11/2001 | Connolly | 435/6 |
| 2002/0001905 A1 | 1/2002 | Choi et al. | 438/268 |
| 2002/0004028 A1 | 1/2002 | Margrave et al. | 423/447.3 |
| 2002/0004136 A1 | 1/2002 | Gao et al. | 428/367 |
| 2002/0030205 A1 | 3/2002 | Varshavsky | 257/208 |
| 2002/0075126 A1 | 6/2002 | Reitz et al. | 338/21 |
| 2002/0086124 A1 | 7/2002 | Margrave et al. | 428/36.9 |
| 2002/0090468 A1 | 7/2002 | Goto et al. | 427/580 |
| 2002/0102353 A1 | 8/2002 | Mauthner et al. | 427/255.28 |
| 2003/0031438 A1 | 2/2003 | Kambe et al. | 385/122 |
| 2003/0177450 A1 | 9/2003 | Nugent | 716/1 |

FOREIGN PATENT DOCUMENTS

| | | |
|---|---|---|
| EP | 1 046 613 A2 | 4/2000 |
| EP | 1 100 106 A2 | 5/2001 |
| EP | 1 069 206 A2 | 7/2001 |
| EP | 1 115 135 A1 | 7/2001 |
| EP | 1 134 304 A2 | 9/2001 |
| RU | 2071126 C1 | 6/1996 |
| WO | WO 00/44094 | 7/2000 |
| WO | WO 03/017282 A1 | 2/2003 |

OTHER PUBLICATIONS

Therese C. Jordan, Electrorheology, 1989, IEEE, 0018-9367/89/1000-849, 849-878.*

Kishan Mehrotra et al., Elements of Artificial Neural Networks, 1997, MIT.*

S. H. Hong et al., Controllable Capture of Au Nano-Particles by using Dielectrophoresis, Dec. 2004, Journal of the Korean Physical Society, vol. 45, S665-S668.*

Peter Weiss, "Circuitry in a Nanowire: Novel Growth Method May Transform Chips," Science News Online, vol. 161, No. 6; Feb. 9, 2002.

Press Release, "Nanowire-based electronics and optics comes one step closer," Eureka Alert, American Chemical Society; Feb. 1, 2002.

Weeks et al., "High-pressure nanolithography using low-energy electrons from a scanning tunneling microscope," Institute of Physics Publishing, Nanotechnology 13 (2002), pp. 38-42; Dec. 12, 2001.

CMP Cientifica, "Nanotech: the tiny revolution"; CMP Cientifica, Nov. 2001.

Diehl, et al., "Self-Assembled, Deterministic Carbon Nanotube Wiring Networks," Angew. Chem. Int. Ed. 2002, 41, No. 2; Received Oct. 22, 2001.

G. Pirio, et al. "Fabrication and electrical characteristics of carbon nanotube field emission microcathodes with an integrated gate electrode," Institute of Physics Publishing, Nanotechnology 13 (2002), pp. 1-4, Oct. 2, 2001.

Leslie Smith, "An Introduction to Neural Networks,"Center for Cognitive and Computational Neuroscience, Dept. of Computing & Mathematics, University of Stirling, Oct. 25, 1996; http://www.cs.stir.ac.uk/~lss/NNIntro/InvSlides.html.

V. Derycke et al., "Carbon Nanotube Inter- and Intramolecular Logic Gates," American Chemical Society, Nano Letters, XXXX, vol. 0, No. 0, A-D.

Mark K. Anderson, "Mega Steps Toward the Nanochip," Wired News, Apr. 27, 2001.

Collins et al., "Engineering Carbon Nanotubes and Nanotube Circuits Using Electrical Breakdown," Science, vol. 292, pp. 706-709, Apr. 27, 2001.

Landman et al., "Metal-Semiconductor Nanocontacts: Silicon Nanowires," Physical Review Letters, vol. 85, No. 9, Aug. 28, 2000.

John G. Spooner, "Tiny tubes mean big chip advances," Cnet News.com, Tech News First, Apr. 26, 2001.

Jeong-Mi Moon et al., "High-Yield Purification Process of Singlewalled Carbon Nanotubes," J. Phys. Chem. B 2001, 105, pp. 5677-5681.

"A New Class of Nanostructure: Semiconducting Nanobelts Offer Potential for Nanosensors and Nanoelectronics," Mar. 12, 2001, http://www.sciencedaily.com/releases/2001/03/010309080953.htm.

Hermanson et al., "Dielectrophoretic Assembly of Electrically Functional Microwires from Nanoparticle Suspensions," Materials Science, vol. 294, No. 5544, Issue of Nov. 2, 2001, pp. 1082-1086.

Press Release, "Toshiba Demonstrates Operation of Single-Electron Transistor Circuit at Room Temperature," Toshiba, Jan. 10, 2001.

J. Appenzeller et al., "Optimized contact configuration for the study of transport phenomena in ropes of single-wall carbon nanotubes," Applied Physics Letters, vol. 78, No. 21, pp. 3313-3315, May 21, 2001.

David Rotman, "Molecular Memory, Replacing silicon with organic molecules could mean tiny supercomputers," Technology Review, May 2001, p. 46.

Westervelt et al., "Molecular Electronics," NSF Functional Nanostructures Grant 9871810, NSF Partnership in Nanotechnology Conference, Jan. 29-30, 2001; http://www.unix.oit.umass.edu/~nano/NewFiles/FN19_Harvard.pdf.

Niyogi et al., "Chromatographic Purification of Soluble Single-Walled Carbon Nanotubes (s-SWNTs)," J. Am. Chem. Soc 2001, 123, pp. 733-734, Received Jul. 10, 2000.

Duan et al., "Indium phosphide nanowires as building blocks for nanoscale electronic and optoelectronic devices," Nature, vol. 409, Jan. 4, 2001, pp. 67-69.

Paulson, et al., "Tunable Resistance of a Carbon Nanotube-Graphite Interface," Science, vol. 290, Dec. 1, 2000, pp. 1742-1744.

Wei et al., "Reliability and current carrying capacity of carbon nanotubes," Applied Physics Letters, vol. 79, No. 8, Aug. 20, 2001, pp. 1172-1174.

Collins et al., "Nanotubes for Electronics," Scientific American, Dec. 2000, pp. 62-69.

Avouris et al., "Carbon nanotubes: nanomechanics, manipulation, and electronic devices," Applied Surface Science 141 (1999), pp. 201-209.

Smith et al., "Electric-field assisted assembly and alignment of metallic nanowires," Applied Physics Letters, vol. 77, No. 9, Aug. 28, 2000, pp. 1399-1401.

Hone et al., "Electrical and thermal transport properties of magnetically aligned single wall carbon nanotube films," Applied Physics Letters, vol. 77, No. 5, Jul. 31, 2000, pp. 666-668.

Smith et al., "Structural anisotropy of magnetically aligned single wall carbon nanotube films," Applied Physics Letters, vol. 77, No. 5, Jul. 31, 2000, pp. 663-665.

Andriotis et al., "Various bonding configurations of transition-metal atoms on carbon nanotubes: Their effect on contact resistance," Applied Physics Letters, vol. 76, No. 26, Jun. 26, 2000, pp. 3890-3892.

Chen et al., "Aligning single-wall carbon nanotubes with an alternating-current electric field," Applied Physics Letters, vol. 78, No. 23, Jun. 4, 2001, pp. 3714-3716.

Bezryadin et al., "Self-assembled chains of graphitized carbon nanoparticles," Applied Physics Letters, vol. 74, No. 18, May 3, 1999, pp. 2699-2701.

Berzyadin et al., "Evolution of avalanche conducting states in electrorheological liquids," Physical Review E, vol. 59, No. 6, Jun. 1999, pp. 6896-6901.

Liu et al., "Fullerene Pipes," Science, vol. 280, May 22, 1998, pp. 1253-1255.

Yamamoto et al., "Orientation and purification of carbon nanotubes using ac electrophoresis," J. Phys. D: Appl. Phys 31 (1998) L34-L36.

Bandow et al., "Purification of Single-Wall Carbon Nanotubes by Microfiltration," J. Phys. Chem. B 1997, 101, pp. 8839-8842.

Tohji et al., "Purifying single walled nanotubes," Nature, vol. 383, Oct. 24, 1996, p. 679.

Dejan Rakovic, "Hierarchical Neural Networks and Brainwaves: Towards a Theory of Consciousness," Brain & Consciousness: Proc. ECPD Workshop (ECPD, Belgrade, 1997), pp. 189-204.

Dave Anderson & George McNeill, "Artificial Neural Networks Technology," A DACS (Data & Analysis Center for Software) State-of-the-Art Report, Contract No. F30602-89-C-0082, ELIN: A011, Rome Laboratory RL/C3C, Griffiss Air Force Base, New York, Aug. 20, 1992.

Greg Mitchell, "Sub-50 nm Device Fabrication Strategies," Project No. 890-00, Cornell Nanofabrication Facility, Electronics—p. 90-91, National Nanofabrication Users Network.

John-William DeClaris, "An Introduction to Neural Networks," http://www.ee.umd.edu/medlab/neural/nn1.html.

"Neural Networks," StatSoft, Inc., http://www.statsoftinc.com/textbook/stevnet.html.

Stephen Jones, "Neural Networks and the Computation Brain or Maters relating to Artificial Intelligence," The Brain Project, http://www.culture.com.au/brain_proj/neur_net.htm.

David W. Clark, "An Introduction to Neural Networks"; http://members.home.net/neuralnet/introtonn/index.htm.

"A Basic Introduction to Neural Networks"; http://blizzard.gis.uiuc.edu/htmldocs/Neural/neural.html.

Meyer et al., "Computational neural networks: a general purpose tool for nanotechnology," Abstract, 5th Foresight Conference on Molecular Nanotechnology; http://www.foresight.org/Conferences/MNT05/Abstracts/Meyeabst.html.

Saito et al., "A 1M Synapse Self-Learning Digital Neural Network Chip," ISSCC, pp. 6.5-1 to 6.5-10, IEEE 1998.

Espejo, et al., "A 16 x 16 Cellular Neural Network Chip for Connected Component Detection," Jun. 30, 1999; http://www.imse.cnm.csic.es/Chipcat/espejo/chip-2.pdf.

Pati et al., "Neural Networks for Tactile Perception," Systems Research Center and Dept. of Electrical Engineering, University of Maryland and U.S Naval Research Laboratory. 1987; http://www.isr.umd.edu/TechReports/ISR/1987/TR_87-123/TR_87-123.phtml.

Osamu Fujita, "Statistical estimation of the number of hidden units for feedforward neural networks," Neural Networks 11 (1998), pp. 851-859.

Abraham Harte, "Liquid Crystals Allow Large-Scale Alignment of Carbon Nanotubes," CURJ (Caltech Undergraduate Research Journal), Nov. 2001, vol. 1, No. 2, pp. 44-49.

"Quantum-Dot Arrays for Computation," ORNL Review vol. 34, No. 2, 2001, pp. 1-5. http://www.ornlgov/ORNLReview/v34_2_01/arrays.htm.

Jabri, M.A. et al., "Adaptive Analog VLSI Neural Systems," Chapman & Hall, London SE1 8HN, UK, 1996, pp. 92-95.

Lipson et al., "Automatic Design and Manufacture of Robotic Lifeforms," Nature, vol. 406, Aug. 31, 2000, pp. 974-978.

A. Bezryadin, et al., "Evolution of Avalanche Conducting.States in Electrorheological Liquids," The America Physical Society, Jun. 1999, vol. 59, No. 6, pp. 6896-6901.

Kunitoshi Yamamoto, et al., "Rapid Communication Orientation and Purification of Carbon Nanotubes Using AC Electrophoresis", J. Phys. D. Appl. Phys 31 (1998) L34-L36.

E.S. Snow, et al., "Random networks of carbon nanotubes as electronic material", Applied Physics Letters, vol. 82, No. 12, Mar. 31, 2003, pp. 2145-2147.

R. Martel, et al., "Ambipolar Electrical Transport in Semiconducting Single-Wall Carbon Nanotubes," Physical Review Letters, vol. 87, No. 25, Dec. 17, 2001, pp. 256805-1 to 256805-4.

S. Heinze, et al., "Carbon Nanotubes as Schottky Barrier Transistors", vol. 89, No. 10, Sep. 2, 2002, pp. 106801-1 to 106801-4.

M. Dubson, et al., "Measurement of the conductivity exponent in two-dimensional percolating networks: square lattice versus random-void continuum", Physical Review B, vol. 32, No. 11, Dec. 1, 1985, pp. 7621-7623.

D.J. Frank, et al., "Highly efficient algorithm for percolative transport studies in two dimensions", Physical Review B, vol. 37, No. 1, Jan. 1, 1988, pp. 302-307.

Uma R. Karmarkar, et al., "Mechanisms and significance of spike-timing dependent plasticity," Biol. Cybern. 87, 373-382 (2002), Jan. 28, 2002.

Uma R. Karmarkar, et al., "A Model of Spike-Timing Dependent Plasticity: One or Two Coincidence Detectors?", J. Neurophysiol, vol. 88, pp. 507-513, Jul. 2002.

M.C.W. van Rossum, et al., "Stable Hebbian Learning from Spkke-Timing-Dependent Plasticity", The Journal of Neuroscience, Dec. 1, 2003, 20(23), pp. 8812-8821.

Xiaohui Xie, et al., "Spike-based learning rules and stabilization of persistent neural activity."

Nace L. Golding, et al., "Dendritic spikes as a mechanism for cooperative long-term potentiation", Nature, vol. 418, Jul. 18, 2002, pp. 326-330.

Ozgur Turel, et al., "Possible nanoelectronic implementation of neuromorphic networks", Dept. o f Physics and Astronomy, Stony Brook University.

V.C. Moore, et al., "Individually Suspended Single-Walled Carbon Nanotubes in Various Surfactants," Nano Letters, 2003, vol. 3; Sep. 9, 2003; American Chemical Society, pp. 1379-1382.

J.M. Tour, et al., "NanoCell Electronic Memories," J.Am.Chem.Soc. 2003, 125, pp. 13279-13283.

J. Zaumseil, et al., "Three-Dimensional and Multilayer Nanostructures Formed by Nanotransfer Printing," Nano Letters, 2003, vol. 3, No. 9; Jul. 31, 2003, American Chemical Society, pp. 1223-1227.

Charles D. Schaper, "Patterned Transfer of Metallic Thin Film Nanostructures by Water-Soluble Polymer Templates," Nano Letters, 2003, vol. 3, No. 9; Jul. 26, 2003, American Chemical Society, pp. 1305-1309.

C.A. Dyke, et al., "Unbundled and Highly Functionalized Carbon Nanotubes from Aqueous Reactions," Nano Letters, 2003, vol. 3, No. 9; Aug. 19, 2003, American Chemical Society, pp. 1215-1218.

J. Chung, et al., "Nanoscale Gap Fabrication by Carbon Nanotube-Extracted Lithography (CEL)", Nano Letters, 2003, vol. 3, No. 8; Jul. 9, 2003, American Chemical Society, pp. 1029-1031.

O. Harnack, et al., "Rectifying Behavior of Electrically Aligned ZnO Nanorods," Nano Letters, 2003, vol. 3, No. 8; Jun. 24, 2003, American Chemical Society, pp. 1097-1101.

M. S. Kumar, et al., "Influence of electric field type on the assembly of single walled carbon nanotubes," Chemical Physics Letters 383 (2004), Dec. 2, 2003; pp. 235-239.

S.W. Lee, et al., "Dielectrophoresis and electrohydrodynamics-mediated fluidic assembly of silicon resistors," Applied Physics Letters, vol. 83, No. 18, Nov. 3, 2003, pp. 3833-3835.

R. Krupke, et al., "Simultaneous Deposition of Metallic Bundles of Single-walled Carbon Nanotubes Using Ac-dielectrophoresis," Nano Letters, 2003, vol. 3, No. 8; Jul. 9, 2003; American Chemical Society, pp. 1019-1023.

K. Bradley, et al., "Flexible Nanotube Electronics," Nano Letters, 2003, vol. 3, No. 10; Aug. 9, 2003, America Chemical Society, pp. 1353-1355.

T.B. Jones, "Frequency-dependent orientation of isolated particle chains," Journal of Electrostatics, 25 (1990), Elsevier Science Publishers, pp. 231-244.

L.A. Nagahara, "Directed placement of suspended carbon nanotubes for nanometer-scale assembly," Applied Physics Letters, vol. 80, No. 20; May 20, 2003; pp. 3826-3828.

A. Bezryadin, et al., "Electrostatic trapping of single conducting nanoparticles between electrodes," Applied Physics Letters, 71 (9), Sep. 1, 1997, pp. 1273-1275.

S. Suzuki, et al., "Quantitative Analysis of DNA Orientation in Stationary AC Electric Fields Using Fluorescence Anisotropy," IEEE Transactions of Industry Applications, vol. 34, No. 1; Jan./Feb. 1998, pp. 75-83.

Phaedon Avouris, "Molecular Electronics with Carbon Nanotubes," Accounts of Chemical Research, vol. 35, No. 12; Jul. 31, 2002, pp. 1025-1034.

X. Liu, et al., "Electric-Field Induced Accumulation and Alignment of Carbon Nanotubes," 2002 Annual Report Conference on Electrical Insulation and Dielectric Phenomena, pp. 31-34.

R. Krupke, et al., "Contacting single bundles of carbon nanotubes with alternating electric fields," Appl. Phys. A. 76, Oct. 28, 2002, pp. 397-400.

M. Law, et al., "Photochemical Sensing of $NO_2$ with $SnO^2$ Nanoribbon Nanosensors at Room Temperature," Angew. Chem. 2002, 114, Nr. 13, pp. 2511-2514.

J. Tour, et al., "Nanocell Logic Gates for Molecular Computing," IEEE Transactions on Nanotechnology, vol. 1, No. 2, Jun. 2002, pp. 100-109.

A. Leonardi, et al., "Simulation methodology for dielectrophoresis in microelectronic Lab-on-a-chip," Modeling and Simulation of Microsystems 2002, pp. 96-99.

J. Chung, et al., "Nanoscale Gap Fabrication and Integration of Carbon Nanotubes by Micromachining," Solid-State Sensor, Actuator and Microsystems Workshop, Jun. 2-6, 2003; Hilton Head Island, South Carolina, pp. 161-164.

L. Zheng, et al., "Towards Single Molecule Manipulation with Dielectrophoresis Using Nanoelectrodes," IEEE-NANO 2003, Aug. 12-14, 2003, Moscone Convention Center, San Francisco, CA; pp. 437-440.

http://ieeenano2003.arc.nasa.gov/program_contents.pdf.

A. van Schaik, "Building blocks for electronic spiking neural networks," Neural Networks 14 (2001), pp. 617-628.

V.C. Moore, et al., "Individually Suspended Single-Walled Carbon Nanotubes in Various Surfactants," Nano Letters, 2003, vol. 3, No. 10; American Chemical Society; Sep. 8, 2003; pp. 1379-1382.

R. Krupke, "Separation of Metallic from Semiconducting Single-Walled Carbon Nanotubes," Science, vol. 301; Jul. 18, 2003; pp. 344-347.

Wolfgang Maass, "On the Relevance of Time in Neural Computation and Learning," In M. Li and A. Maruoka, editors, *Proc. of the 8th International Conference on Algorithmic Learning Theory in Sendai (Japan)*, vol. 1316 of *Lecture Notes in Computer Science*, pp. 364-388. Springer (Berlin), 1997.

Wolfgang Maass, "Noisy Spiking Neurons with Temporal Coding have more Computational Power than Sigmoidal Neurons," In M. Mozer, M. I. Jordan, and T. Petsche, editors, *Advances in Neural Information Processing Systems*, vol. 9, pp. 211-217. MIT Press (Cambridge), 1997. (pp. 1-13, including Appendix).

L. Perrinet, et al., "Emergence of filters from natural scenes in a sparse spike coding scheme," Neurocomputing, 2003, pp. 1-14, http://www.laurent.perrinet.free.fr/publi/perrinet03neurocomputing.pdf.

L. Perrinet, et al., "Coherence detection in a spiking neuron via Hebbian learning," Neurocomputing, 2002, vol. 44-46, No. C., pp. 817-822, http://www.laurent.perrinet.free.fr/publi/perrinet02.pdf.

A. Jarosz, et al., "An Introductory Note on Gaussian Correlated Random Matrix," Feb. 21, 2003, pp. 1-20 http://www.if.uj.edu.pl/pl/koloSMP/prace/rndmatrix.pdf.

K. Bradley, et al., "Influence of Mobile Ions on Nanotube Based FET Devices," Nano Letters, 2003, vol. 3, No. 5; American Chemical Society, Apr. 4, 2003; pp. 639-641.

PCT Notification of Transmittal of the International Search Report or the Declaration, Date of Mailing Jun. 4, 2004.

*Nanoparticles Get Wired*, Dimes Institute, Delft University of Technology, 1997.

A. Bezryadin, *Trapping Single Particle with Nanoelectrodes*, Physics News Graphics, Sep. 1997.

Snow, et al., *Nanofabrication with Proximal Probes*, Proceedings of the IEEE, Apr. 1997.

P. O'Connor, G. Gramegna, P. Rehak, F. Corsi, C. Marzocca, *CMOS Preamplifier with High Linearity and Ultra Low Noise for X-Ray Spectroscopy*, IEEE Transactions on Nuclear Science, vol. 44, No. 3, Jun. 1997, pp. 318-325.

"Solid-State thin-film memistor for electronic neural networks", S. Thakoor, A. Moopenn, T. Daud, and A.P. Thakoor, Journal of Applied Physics—Mar. 15, 1990—vol. 67, Issue 6, pp. 3132-3135.

"Computational nanotechnology with carbon nanotubes and fuliemes", Srivastava, D. Menon M. Kyeongjae Cho, NASA Ames Res. Center, Moffett Flaid. CA. Computing in Science & Engineering, Jul./Aug. 2001, vol. 3, Issue 4, pp. 42-55.

* cited by examiner

NANOTECHNOLOGY NEURAL NETWORK METHODS AND SYSTEMS

CROSS-REFERENCE TO RELATED APPLICATION

This patent application claims priority under 35 U.S.C. § 119(e) to provisional patent application Ser. No. 60/488,860 filed Jul. 18, 2003, the disclosure of which is incorporated herein by reference.

TECHNICAL FIELD

The present invention generally relates to molecular technology, including nanotechnology. The present invention also relates to neural networks and neural computing systems and teaching methods thereof. The present invention also relates to the simulation of large scale, arbitrarily connected, pulsed and synaptically modifiable neural networks

BACKGROUND OF THE INVENTION

Neural networks are computational systems that permit computers to essentially function in a manner analogous to that of the human brain. Neural networks do not utilize the traditional digital model of manipulating 0's and 1's. Instead, neural networks create connections between processing elements, which are equivalent to neurons of a human brain. Neural networks are thus based on various electronic circuits that are modeled on human nerve cells (i.e., neurons).

Generally, a neural network is an information-processing network, which is inspired by the manner in which a human brain performs a particular task or function of interest. Computational or artificial neural networks are thus inspired by biological neural systems. The elementary building blocks of biological neural systems are the neuron, the modifiable connections between the neurons, and the topology of the network.

Biologically inspired artificial neural networks have opened up new possibilities to apply computation to areas that were previously thought to be the exclusive domain of human intelligence. Neural networks learn and remember in ways that resemble human processes. Areas that show the greatest promise for neural networks, such as pattern classification tasks, speech and image recognition, are areas where conventional computers and data-processing systems have had the greatest difficulty.

In general, artificial neural networks are systems composed of many nonlinear computational elements operating in parallel and arranged in patterns reminiscent of biological neural nets. The computational elements, or nodes, are connected via variable weights that are typically adapted during use to improve performance. Thus, in solving a problem, neural net models can explore many competing hypothesis simultaneously using massively parallel nets composed of many computational elements connected by links with variable weights.

In contrast, with conventional von Neumann computers, an algorithm must first be developed manually, and a program of instructions written and executed sequentially. In some applications, this has proved extremely difficult. This makes conventional computers unsuitable for many real-time problems for which we have no efficient algorithm.

In a neural network, "neuron-like" nodes can output a signal based on the sum of their inputs, the output being the result of an activation function. In a neural network, there exists a plurality of connections, which are electrically coupled among a plurality of neurons. The connections serve as communication bridges among of a plurality of neurons coupled thereto. A network of such neuron-like nodes has the ability to process information in a variety of useful ways. By adjusting the connection values between neurons in a network, one can match certain inputs with desired outputs.

One does not program a neural network. Instead, one "teaches" a neural network by examples. Of course, there are many variations. For instance, some networks do not require examples and extract information directly from the input data. The two variations are thus called supervised and unsupervised learning. Neural networks are currently used in applications such as noise filtering, face and voice recognition and pattern recognition. Neural networks can thus be utilized as an advanced technique for processing information.

Neural networks that have been developed to date are largely software-based. A true neural network (e.g., the human brain) is massively parallel (and therefore very fast computationally) and very adaptable. For example, half of a human brain can suffer a lesion early in its development and not seriously affect its performance. Software simulations are slow because during the learning phase a standard computer must serially calculate connection strengths. When the networks get larger (and therefore more powerful and useful), the computational time becomes enormous.

For example, networks with 10,000 connections can easily overwhelm a computer. In comparison, the human brain has about 100 billion neurons, each of which can be connected to about 5,000 other neurons. On the other hand, if a network is trained to perform a specific task, perhaps taking many days or months to train, the final useful result can be built or "downloaded" onto a piece of hardware and also mass-produced. Because most problems requiring complex pattern recognition are highly specific, networks are task-specific. Thus, users usually provide their own, task-specific training data.

A number of software simulations of neural networks have been developed. Because software simulations are performed on conventional sequential computers, however, they do not take advantage of the inherent parallelism of neural network architectures. Consequently, they are relatively slow. One frequently used measurement of the speed of a neural network processor is the number of interconnections it can perform per second.

For example, the fastest software simulations available can perform up to approximately 18 million interconnects per second. Such speeds, however, currently require expensive super computers to achieve. Even so, approximately 18 million interconnects per second is still too slow to perform many classes of pattern classification tasks in real time. These include radar target classifications, sonar target classification, automatic speaker identification, automatic speech recognition, electrocardiogram analysis, etc.

The implementation of neural network systems has lagged somewhat behind their theoretical potential due to the difficulties in building neural network hardware. This is primarily because of the large numbers of neurons and weighted connections required. The emulation of even of the simplest biological nervous systems would require neurons and connections numbering in the millions and/or billions.

Due to the difficulties in constructing such highly interconnected processors, currently available neural network hardware systems have not approached this level of complexity. Another disadvantage of hardware systems is that they typically are often custom designed and configured to implement one particular neural network architecture and are not easily, if at all, reconfigurable in implementing different architectures. A true physical neural network chip, with the learning abilities and connectivity of a biological network, has not yet been designed and successfully implemented.

The problem with a pure hardware implementation of a neural network utilizing existing technology is the inability to physically form a great number of connections and neurons. On-chip learning can exist, but the size of the network is limited by digital processing methods and associated electronic circuitry. One of the difficulties in creating true physical neural networks lies in the highly complex manner in which a physical neural network must be designed and constructed. The present inventor believes that solutions to creating a true physical and artificial neural network lie in the use of nanotechnology and the implementation of a novel form of variable connections.

The term "Nanotechnology" generally refers to nanometer-scale manufacturing processes, materials and devices, as associated with, for example, nanometer-scale lithography and nanometer-scale information storage. Nanometer-scale components find utility in a wide variety of fields, particularly in the fabrication of microelectrical and microelectromechanical systems (commonly referred to as "MEMS"). Microelectrical nano-sized components include transistors, resistors, capacitors and other nano-integrated circuit components. MEMS devices include, for example, micro-sensors, micro-actuators, micro-instruments, micro-optics, and the like.

In general, nanotechnology presents a solution to the problems faced in the rapid pace of computer chip design in recent years. According to Moore's law, the number of switches that can be produced on a computer chip has doubled every 18 months. Chips now can hold millions of transistors. It is, however, becoming increasingly difficult to increase the number of elements on a chip utilizing existing technologies. At the present rate, in the next few years the theoretical limit of silicon-based chips will have been attained. Because the number of elements and components that can be manufactured on a chip determines the data storage and processing capabilities of microchips, new technologies are required for the development of higher performance chips.

Present chip technology is also limited in cases where wires must be crossed on a chip. For the most part, the design of a computer chip is limited to two dimensions. Each time a circuit is forced to cross another circuit, another layer must be added to the chip. This increases the cost and decreases the speed of the resulting chip. A number of alternatives to standard silicon based complementary metal oxide semiconductor ("CMOS") devices have been proposed. The common goal is to produce logic devices on a nanometer scale. Such dimensions are more commonly associated with molecules than integrated circuits.

The issue of interconnects in neural network hardware poses a serious problem. Because of the massive interconnectivity, a neural network constructed with standard integrated electronic methods can never reach the desired neuron and synapse density, simply because the interconnections overwhelm the largely 2-diminsional chip. It can thus be appreciated that almost any sort of 3-diminsional connectivity, no matter how simple, could offer tremendous benefits.

Integrated circuits and electrical components thereof, which can be produced at a molecular and nanometer scale, include devices such as carbon nanotubes and nanowires, which essentially are nanoscale conductors ("nanoconductors"). Nanoconductors are tiny conductive tubes (i.e., hollow) or wires (i.e., solid) with a very small size scale (e.g., 0.7 to 300 nanometers in diameter and up to 1 mm in length). Their structure and fabrication have been widely reported and are well known in the art. Carbon nanotubes, for example, exhibit a unique atomic arrangement, and possess useful physical properties such as one-dimensional electrical behavior, quantum conductance, and ballistic electron transport.

Carbon nanotubes are among the smallest dimensioned nanotube materials with a generally high aspect ratio and small diameter. High-quality single-walled carbon nanotubes can be grown as randomly oriented, needle-like or spaghetti-like tangled tubules. They can be grown by a number of fabrication methods, including chemical vapor deposition (CVD), laser ablation or electric arc growth.

Carbon nanotubes can be grown on a substrate by catalytic decomposition of hydrocarbon containing precursors such as ethylene, methane, or benzene. Nucleation layers, such as thin coatings of Ni, Co, or Fe are often intentionally added onto the substrate surface in order to nucleate a multiplicity of isolated nanotubes. Carbon nanotubes can also be nucleated and grown on a substrate without a metal nucleating layer by using a precursor including one or more of these metal atoms. Semiconductor nanowires can be grown on substrates by similar processes.

Attempts have been made to construct electronic devices utilizing nano-sized electrical devices and components. For example, a molecular wire crossbar memory is disclosed in U.S. Pat. No. 6,128,214 entitled "Molecular Wire Crossbar Memory" dated Oct. 3, 2000 to Kuekes et al. Kuekes et al disclose a memory device that is constructed from crossbar arrays of nanowires sandwiching molecules that act as on/off switches. The device is formed from a plurality of nanometer-scale devices, each device comprising a junction formed by a pair of crossed wires where a single wire crosses another and at least one connector species connects the pair of crossed wires in the junction. The connector species comprises a bi-stable molecular switch. The junction forms either a resistor or a diode or an asymmetric non-linear resistor. The junction has a state that is capable of being altered by application of a first voltage and sensed by the application of a second, non-destructive voltage. A series of related patents attempts to cover everything from molecular logic to how to chemically assemble these devices.

Such a molecular crossbar device has two general applications. The notion of transistors built from nanotubes and relying on nanotube properties is being pursued. Second, two wires can be selectively brought to a certain voltage and the resulting electrostatic force attracts them. When they touch, the Van der Walls force keeps them in contact with each other and a "bit" is stored. The connections in this apparatus can therefore be utilized for a standard (i.e., binary and serial) computer. The inventors of such a device thus desire to coax a nanoconductor into a binary storage media or a transistor. As it turns out, such a device is easier to utilize as a storage device.

A need exists for a physical neural network, which can be implemented in the context of a semiconductor integrated circuit (i.e., a computer chip). Such a device, which can be referred to as a "physical neural network chip" or a "synapse chip" is thus disclosed herein. Such a device, if successfully implemented would be well suited for use with neural networks.

Researchers in the neuro-biological fields have attempted to develop a computationally efficient algorithm that can emulate a biologically realistic neural network. Specifically, researchers have attempted to develop method and/or systems, which would allow the efficient calculation of Spike-Timing Dependent-Plasticity (STDP), while also permitting fully interconnected pulsed networks. In STDP, timing between pre- and post-synaptic events can cause a net potentiation (LTP) or a net depression (LTD) of synapses.

A background for STPD is explained in "Mechanisms and Significance of Spike-Timing Dependent Plasticity" by Uma R. Karmarkar, et al., Biol. Cybern. 87, 373-382 (2002). STPD is also explained generally in "A Model of Spike-Timing Dependent Plasticity: One or Two Coincidence Detectors?" by Uma R. Karmarkar, et al., J. Neurophysiol, 88: 507-513, 2002. An additional reference regarding STDP is "Spike-Based Learning Rules and Stabilization of Persistent Neural Activity," by Xiaohui Xie, et al., Dept. of Brain & Cog, Sci, MIT, Cambridge, Mass. A further reference regarding STDP and issues faced thereof is described in "Dendritic Spikes as a Mechanism for Cooperative Long-Term Potentiation," Nace L. Golding, et al., Nature, Vol. 418, 18 Jul. 2002, pp. 326-330. The aforementioned references are indicated herein for generally illustrative and edification purposes only and are not considered limiting features of any embodiments of the present invention.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is, therefore, one aspect of the present invention to provide for a physical neural network, including an adaptive neural network, which can be formed and implemented utilizing nanotechnology.

It is still another aspect of the present invention to provide a physical neural network, which can be formed from a plurality of interconnected molecular connections, such as, for example, molecules, nanoconnections, and/or nanoconnectors.

It is yet a further aspect of the present invention to provide a physical neural network, which can be formed from a plurality of molecules, including molecular conducting structures.

It a further aspect of the present invention to provide a physical neural network based on nanoconductors, such as, for example, nanowires and/or nanotubes.

It is also an aspect of the present invention to provide physical, large scale, arbitrarily connected, pulsed and synaptically modifiable neural networks.

It is still an additional aspect of the present invention to provide a physical neural network, which can be implemented physically in the form of a chip structure.

The above and other aspects can be achieved as will now be described. A physical neural network is disclosed herein, which includes a connection network comprising a plurality of molecular conducting connections suspended within a connection gap formed between one or more input electrodes and one or more output electrodes. One or more molecular connections of the molecular conducting connections can be strengthened or weakened according to an application of an electric field across said connection gap. Thus, a plurality of physical neurons can be formed from said molecular conducting connections of said connection network.

Additionally, a gate can be located adjacent said connection gap and which comes into contact with the connection network, which includes a plurality of molecular connections (e.g., physical neural nanoconnections). The gate can be connected to logic circuitry which can activate or deactivate individual physical neurons among said plurality of physical neurons. Such logic circuitry can also be utilized to activate or deactivate groups of physical neurons. The molecular conducting connections can comprise conducting and/or semiconducting molecular structures. The logic circuitry can communicate with the gate, which in turn can be disposed beneath an insulating layer. The insulating layer can be located between the gate and the connection gap, thereby insulating the gate from the connection network of physical neural nanoconnections located within the connection gap.

Additionally, one or more of the input electrodes can comprise a pre-synaptic electrode, while one or more of the output electrodes can comprise a post-synaptic electrode. The resistance of the molecular conducting connections bridging the at least one pre-synaptic electrode and at least one post-synaptic electrode is generally a function of the prior electric field or electrical history across the pre-synaptic and post-synaptic electrodes. One or more generated pulses, including the shape of such pulses, from the pre-synaptic electrode to the post-synaptic electrode can be determinative of synaptic update values thereof. The physical neural network can be configured as adaptive neural network which is trainable based on the generated pulses across one or more of the pre-synaptic electrodes and one or more of the post-synaptic electrode.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

The physical neural network described and disclosed herein is different from prior art forms of neural networks in that the disclosed physical neural network does not require computer calculations for training, nor is its architecture based on any current neural network hardware device. The physical neural network described herein is generally fast and adaptable, no matter how large such a physical neural network becomes.

The physical neural network described herein with respect to one or more embodiments can be referred to generically as a Knowm™. The terms "physical neural network" and "Knowm" can thus be utilized interchangeably to refer to the same device, network, or structure. The term "Knowm" can also refer to a semiconductor implementation, such as a physical neural network chip and/or synapse chip. Note that the terms "physical neural network chip" and "synapse chip" can also be utilized herein to refer generally to the same or analogous type of Knowm™ device.

Network orders of magnitude larger than current VSLI neural networks can now be built. One consideration for a Knowm™ is that it must be large enough for its inherent parallelism to shine through. Because the connection strengths of such a physical neural network are dependant on the physical movement of nanoconnections thereof, the rate at which a small network can learn is generally very small and a comparable network simulation on a standard computer can be very fast. On the other hand, as the size of the network increases, the time to train the device does not change. Thus, even if the network takes a full second to change a connection value a small amount, if it does the same to a billion connections simultaneously, then its parallel nature begins to express itself.

A physical neural network (i.e., a Knowm™) must have two components to function properly. First, the physical neural network must have one or more neuron-like nodes that sum a signal and output a signal based on the amount of input signal received. Such a neuron-like node is generally nonlinear in output. In other words, there should be a certain threshold for input signals, below which nothing is output and above which a constant or nearly constant output is generated or allowed to pass. This is considered the basic building block of all neural networks, and can be accomplished by an activation function. The second requirement of a physical neural network is the inclusion of a connection network composed of a plurality of interconnected electrodes (e.g., nanoconnections). Such a connection network is described in greater detail herein.

Figure 1:
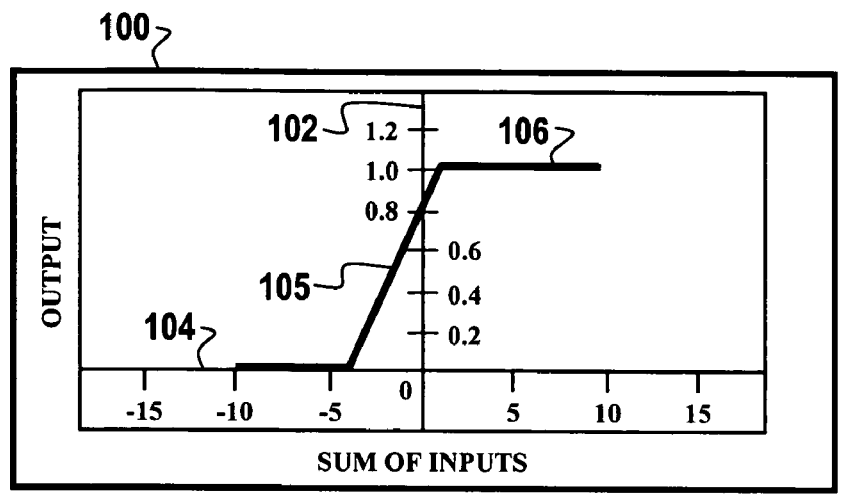
FIG. 1 illustrates a graph illustrating a typical activation function.

FIG. 1 illustrates a graph 100 illustrating a typical activation function that can be implemented in accordance with the physical neural network of the present invention. Note that the activation function need not be non-linear, although non-linearity is generally desired for learning complicated input-output relationships. The activation function depicted in FIG. 1 comprises a linear function, and is shown as such for general edification and illustrative purposes only. As explained previously, an activation function may also be non-linear.

As illustrated in FIG. 1, graph 100 includes a horizontal axis 104 representing a sum of inputs, and a vertical axis 102 representing output values. A graphical line 106 indicates threshold values along a range of inputs from approximately −10 to +10 and a range of output values from approximately 0 to 1. As more neural networks (i.e., active inputs) are established, the overall output as indicated at line 105 climbs until the saturation level indicated by line 106 is attained. If a connection is not utilized, then the level of output (i.e., connection strength) begins to fade until it is revived. This phenomenon is analogous to short term memory loss of a human brain. Note that graph 100 is presented for generally illustrative and edification purposes only and is not considered a limiting feature of the present invention.

Figure 2:
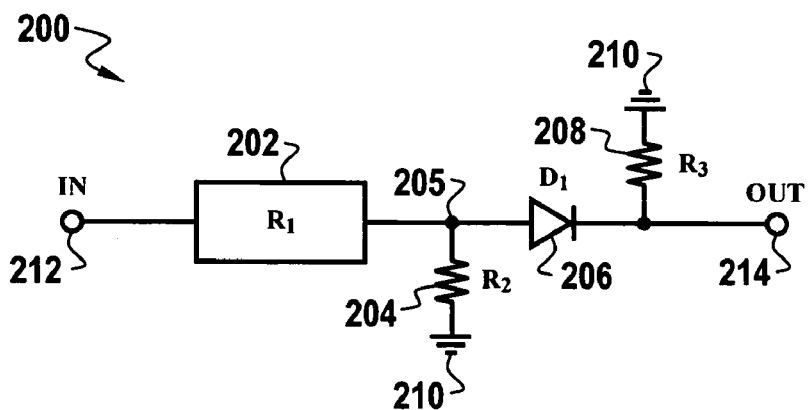
FIG. 2 illustrates a schematic diagram illustrating a diode configuration as a neuron, in accordance with one embodiment of the present invention.

In a Knowm™, the neuron-like node can be configured as a standard diode-based circuit, the diode being the most basic semiconductor electrical component, and the signal it sums can be a voltage. An example of such an arrangement of circuitry is illustrated in FIG. 2, which generally illustrates a schematic diagram illustrating a diode-based configuration as a neuron 200, in accordance with an embodiment of the present invention. The use of such a diode-based configuration is not considered a limiting feature of the present invention, but merely represents one potential arrangement in which the present invention can be implemented.

Although a diode may not necessarily be utilized, its current versus voltage characteristics are non-linear when used with associated resistors and similar to the relationship depicted in FIG. 1. The use of a diode as a neuron is thus not considered a limiting feature of the present invention, but is only referenced herein with respect to one potential embodiment of the present invention. The use of a diode and associated resistors with respect to an embodiment simply represents one possible "neuron" implementation. Such a configuration can be said to comprise an artificial neuron. It is anticipated that other devices and components can be utilized instead of a diode to construct a physical neural network and a neuron-like node (i.e., artificial neuron), as indicated herein.

Thus, neuron 200 comprises a neuron-like node that may include a diode 206, which is labeled $D_1$, and a resistor 204, which is labeled $R_2$. Resistor 204 is connected to a ground 210 and an input 205 of diode 206. Additionally, a resistor 202, which is represented as a block and labeled $R_1$ can be connected to input 205 of diode 206. Block 202 includes an input 212, which comprises an input to neuron 200. A resistor 208, which is labeled $R_3$, is also connected to an output 214 of diode 206. Additionally, resistor 208 is coupled to ground 210. Diode 206 in a physical neural network is analogous to a neuron of a human brain, while an associated connection formed thereof, as explained in greater detail herein, is analogous to a synapse of a human brain.

As depicted in FIG. 2, the output 214 is determined by the connection strength of $R_1$ (i.e., resistor 202). If the strength of $R_1$'s connection increases (i.e., the resistance decreases), then the output voltage at output 214 also increases. Because diode 206 conducts essentially no current until its threshold voltage (e.g., approximately 0.6V for silicon) is attained, the output voltage will remain at zero until $R_1$ conducts enough current to raise the pre-diode voltage to approximately 0.6V. After 0.6V has been achieved, the output voltage at output 214 will increase linearly. Simply adding extra diodes in series or utilizing different diode types may increase the threshold voltage.

An amplifier may also replace diode 206 so that the output voltage immediately saturates at a reference threshold voltage, thus resembling a step function. $R_3$ (i.e., resistor 208) functions generally as a bias for diode 206 (i.e., $D_1$) and should generally be about 10 times larger than resistor 204 (i.e., $R_2$). In the circuit configuration illustrated in FIG. 2, $R_1$ can actually be configured as a network of connections composed of many inter-connected conducting nanowires (i.e., see FIG. 3). As explained previously, such connections are analogous to the synapses of a human brain.

Figure 3:
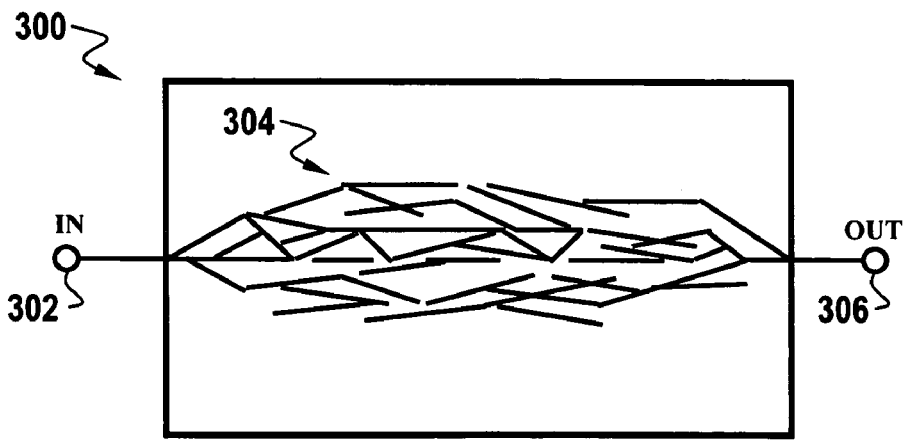
FIG. 3 illustrates a block diagram illustrating a network of nanoconnections formed between two electrodes, in accordance with one embodiment of the present invention.

FIG. 3 illustrates a block diagram illustrating a system 300 that includes, but is not limited to, a network of nanoconnections 304 formed between two or more electrodes, in accordance with one embodiment of the present invention. Nanoconnections 304 (e.g., nanoconductors) depicted in FIG. 3 can be located between input 302 and output 306. The network of nanoconnections depicted in FIG. 3 can be implemented as a network of molecules, including, for example, nanoconductors. Examples of nanoconductors include devices such as, for example, nanowires, nanotubes, and nanoparticles.

Nanoconnections 304, which are analogous to biological synapses, can be composed of electrical conducting material (i.e., nanoconductors). Nanoconductors can be provided in a variety of shapes and sizes without departing from the teachings herein. A nanoconductor can also be implemented as, for example, a molecule or groups of molecules. A nanoconductor can also be implemented as, for example, DNA. Studies have shown that DNA has special electrical properties which can function as essentially a tiny electrical wire. This recent discovery opens up a possible route to new applications in the electronics industry and particularly with respect to the physical neural network disclosed herein.

Carbon particles (e.g., granules or bearings) can also be utilized for developing nanoconnections. The nanoconductors utilized to form a connection network can be formed as a plurality of nanoparticles. Nanoconductors that are utilized to form a physical neural network (i.e., Knowm™) can be formed from such nanoparticles. Note that as utilized herein, the term "nanoparticle" can be utilized interchangeably with the term "nanoconductor." The term "nanoparticle" can refer simply to a particular type of nanoconductors, such as, for example, a carbon nanoparticle, or another type of nanoconductors, such as, for example, a carbon nanotube or carbon nanowire. Devices that conduct electricity and have dimensions on the order of molecular or nanometers can be referred to as nanoconductors.

A connection network as disclosed herein can be composed from a variety of different types of nanoconductors. For example, a connection network can be formed from a plurality of nanoconductors, including nanowires, nanotubes and/or nanoparticles. Note that such nanowires, nanotubes and/or nanoparticles, along with other types of nanoconductors can be formed from materials such as carbon or silicon. For example, carbon nanotubes may comprise a type of nanotube that can be utilized in accordance with the present invention.

As illustrated in FIG. 3, nanoconnections 304 comprise a plurality of interconnected nanoconnections, which can be referred to generally as a "connection network." An individual nanoconnection may constitute a nanoconductor such as, for example, a nanowire, a nanotube, nanoparticles(s), or any other nanoconducting structures. Nanoconnections 304 may comprise a plurality of interconnected nanotubes and/or a plurality of interconnected nanowires. Similarly, nanoconnections 304 can be formed from a plurality of interconnected nanoparticles.

A connection network is thus not one connection between two electrodes, but a plurality of connections between input electrodes and output electrodes. Nanotubes, nanowires, nanoparticles and/or other nanoconducting structures can be utilized, of course, to construct nanoconnections 304 between input 302 and input 306. Although a single input 302 and a single input 306 is depicted in FIG. 3, it can be appreciated that a plurality of inputs and a plurality of outputs can be implemented in accordance with the present invention, rather than simply a single input 302 or a single output 306.

Figure 4:
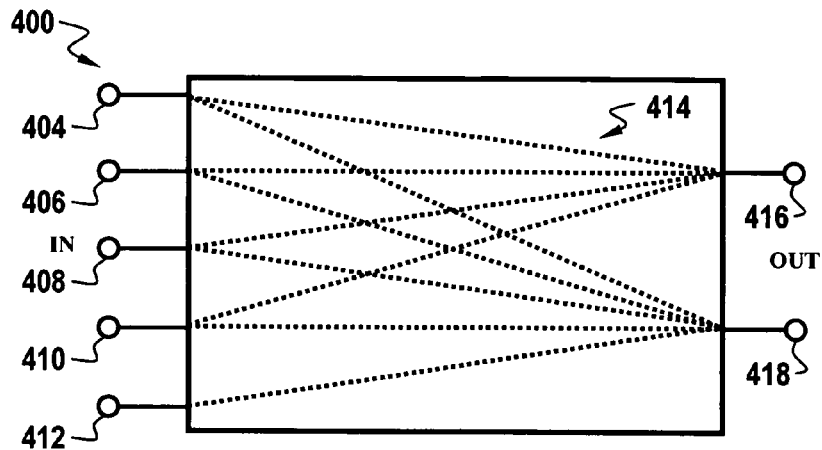
FIG. 4 illustrates a block diagram illustrating a plurality of connections between inputs and outputs of a physical neural network, in accordance with one embodiment of the present invention.

FIG. 4 illustrates a block diagram illustrating a plurality of connections 414 between inputs 404, 406, 408, 410, 412 and outputs 416 and 418 of a physical neural network, in accordance with one embodiment of the present invention. Inputs 404, 406, 408, 410, and 412 provide input signals to connections 414. Output signals are then generated from connections 414 via outputs 416 and 418. A connection network can thus be configured from the plurality of connections 414. Such a connection network is generally associated with one or more neuron-like nodes.

The connection network also comprises a plurality of interconnected nanoconnections, wherein each nanoconnection thereof is strengthened or weakened according to an application of an electric field. A connection network is not possible if built in one layer because the presence of one connection can alter the electric field so that other connections between adjacent electrodes could not be formed. Instead, such a connection network can be built in layers, so that each connection thereof can be formed without being influenced by field disturbances resulting from other connections. This can be seen in FIG. 5.

Figure 5:
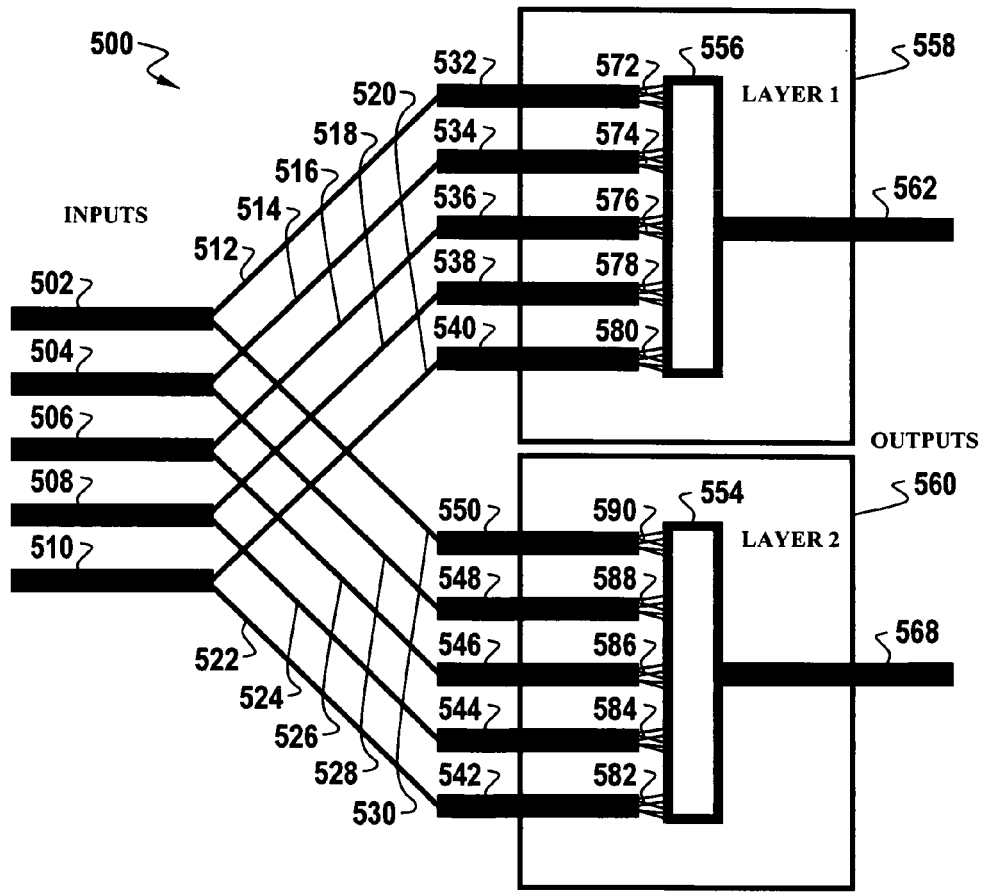
FIG. 5 illustrates a schematic diagram of a physical neural network that can be created without disturbances, in accordance with one embodiment of the present invention.

FIG. 5 illustrates a schematic diagram of a physical neural network 500 that can be created without disturbances, in accordance with one embodiment of the present invention. Physical neural network 500 is composed of a first layer 558 and a second layer 560. A plurality of inputs 502, 504, 506, 508, and 510 can be respectively provided to layers 558 and 560 respectively via a plurality of input lines 512, 514, 516, 518, and 520 and a plurality of input lines 522, 524, 526, 528, and 530. Input lines 512, 514, 516, 518, and 520 are further coupled to input lines 532, 534, 536, 538, and 540 such that each line 532, 534, 536, 538, and 540 is respectively coupled to nanoconnections 572, 574, 576, 578, and 580. Thus, input line 532 can be connected to nanconnections 572. Input line 534 can be connected to nanoconnections 574, and input line 536 can be connected to nanoconnections 576. Similarly, input line 538 can be connected to nanoconnections 578, and input line 540 is generally connected to nanoconnections 580.

Nanconnections 572, 574, 576, 578, and 580 may comprise nanoconductors such as, for example, nanotubes and/or nanowires. Nanoconnections 572, 574, 576, 578, and 580 thus comprise one or more nanoconductors. Additionally, input lines 522, 524, 526, 528, and 530 are respectively coupled to a plurality of input lines 542, 544, 546, 548 and 550, which are in turn each respectively coupled to nanoconnections 582, 584, 586, 588, and 590.

Thus, for example, input line 542 is connected to nanoconnections 582, while input line 544 is connected to nanoconnections 584. Similarly, input line 546 is connected to nanoconnections 586 and input line 548 is connected to nanoconnections 588. Additionally, input line 550 is connected to nanconnections 590. Box 556 and 554 generally represent simply the output and are thus illustrated connected to outputs 562 and 568. In other words, outputs 556 and 554 respectively comprise outputs 562 and 568. The aforementioned input lines and associated components thereof actually comprise physical electronic components, including conducting input and output lines and physical nanoconnections, such as nanotubes and/or nanowires.

Thus, the number of layers 558 and 560 equals the number of desired outputs 562 and 568 from physical neural network 500. In the previous two figures, every input was potentially connected to every output, but many other configurations are possible. The connection network can be made of any electrically conducting material, although the practicality of the application requires that they be very small so that they will align with a practical voltage. Carbon nanotubes or any conductive nanowire can be implemented in accordance with the physical neural network described herein.

Such components can thus form connections between electrodes by the presence of an electric field. The only general requirements for the conducting material utilized to configure the nanoconductors are that such conducting material must conduct electricity, and a dipole should preferably be induced in the material when in the presence of an electric field. Alternatively, the nanoconductors utilized in association with the physical neural network described herein can be configured to include a permanent dipole that is produced by a chemical means, rather than a dipole that is induced by an electric field. A connection network could also be configured from other conductive particles that are developed or found useful in the nanotechnology arts. For example, carbon particles (e.g., carbon "dust") may also be used as nanoconductors in place of nanowires or nanotubes. Such particles may include bearings or granule-like particles.

A connection network can be constructed as follows. Initially, a voltage can be applied across a gap that is filled with a mixture of nanowires and a "solvent". This mixture can be composed of a variety of materials or substances. The only general requirement in constructing such a connection network is that the conducting wires should be suspended in the solvent and/or dissolved or in a suspension, but free to move about. Additionally, the electrical conductance of the substance should generally be less than the electrical conductance of the suspended conducting nanowire(s) and/or other nanoparticle(s). The viscosity of the substance should not be too much so that the conducting nanowire(s) and/or other nanoparticles(s) cannot move when an electric field is applied.

The goal for such a connection network is to develop a network of connections of just the "right" values so as to satisfy particular signal-processing requirements, which is precisely how a neural network functions. Applying a voltage across a space occupied by the aforementioned mixture can form a connection network. To create a connection network, input terminals can be selectively raised to a positive voltage, while the output terminals can be selectively grounded.

Alternatively, an electric field, either AC or DC, can be applied across the terminals. Such an electric field can be, for example, a sinusoidal, square or a saw-tooth waveform. Thus, connections can gradually form between the inputs and outputs. The important requirement that makes a physical neural network functional as a neural network in accordance with an embodiment of the present invention is that the longer this electric field is applied across the connection gap, and/or the greater the frequency or amplitude of the field, the more nanotubes and/or nanowires and/or nanoparticles align and the stronger the connections thereof become.

The connections can either be initially formed and possess random resistances or no connections may be formed at all. By initially forming random connections, it might be possible to teach the desired relationships faster, because it is not necessary for the base connections to be constructed from scratch. Depending on the rate of connection decay, having initial random connections could prove faster, although not necessarily. The connection network can adapt itself to the requirements of a given situation regardless of the initial state of the connections.

The resistance of a connection can be maintained or lowered by selective activations of the connection. In other words, an electric field can be applied perpendicular to the direction of connection formation by perpendicular electrodes. Alternately, both the input and output electrodes could be given the same sinusoidal, alternating signal, which would create pulses of electrostatic repulsion in the connection region. The temperature of the solution can also be controlled so that the rate that connection degradation can be controlled.

The nanoconnections may or may not be arranged in an orderly array pattern between the input and output electrodes. The nanoconnections (e.g., nanotubes, nanowires, etc) of a physical neural network do not have to order themselves into neatly formed arrays. They simply float in the solution, or lie at the bottom of the gap, and more or less line up in the presence an electric field. Precise patterns are thus not necessary. In fact, neat and precise patterns may not be desired. Rather, precise patterns could be a drawback rather than an advantage. In fact, it may be desirable that the connections themselves function as poor conductors, so that variable connections are formed thereof, overcoming simply an "on" and "off" structure, which is commonly associated with binary and serial networks and structures thereof.

Although it can be seen that nanoparticles aligned in a dielectric solution offer a unique solution to emulated modifiable, variable connections within an electronic implementation of a neural network, it is not yet obvious how one would provide feedback that would train the connections. A training mechanism may be implemented in many different forms. Basically, the connections in a connection network must be able to change in accordance with the feedback provided. In other words, the very general notion of connections being strengthened or connections being weakened in a physical system is the essence of a physical neural network (i.e., a Knowm™ physical neural network).

Thus, it can be appreciated that the training of such a physical neural network may not require a "CPU" to calculate connection values thereof. The Knowm™ physical neural network, including artificial synapses thereof, can adapt itself. Complicated neural network solutions could be implemented very rapidly "on the fly", much like a human brain adapts as it performs. It is anticipated that various learning mechanisms can be implemented in accordance with preferred or alternative embodiments of the present invention. Two such learning mechanisms are generally discussed herein. First, a feedback mechanism is described that leads to the training of a multi-layer, feed-forward network. Second, a feedback mechanism is generally discussed, which can result in Hebbian synapse modification within recurrent, highly interconnected networks.

The physical neural network disclosed herein thus has a number of broad applications. The core concept of a Knowm™ physical neural network, however, is basic. The very basic idea that the connection values between electrode junctions by nanoconductors can be used in a neural network devise is all that required to develop an enormous number of possible configurations and applications thereof.

An important feature of a physical neural network is the ability to form negative connections. This is an important feature that makes possible inhibitory effects useful in data processing. The basic idea is that the presence of one input can inhibit the effect of another input. In artificial neural networks as they currently exist, this is accomplished by multiplying the input by a negative connection value. Unfortunately, with a physical device, the connection may only take on zero or positive values under such a scenario In other words, either there can be a connection or no connection. A connection can simulate a negative connection by dedicating a particular connection to be negative, but one connection cannot begin positive and through a learning process change to a negative connection. In general, if it starts positive, it can only go to zero. In essence, it is the idea of possessing a negative connection initially that results in the simulation, because this does not occur in a biological network. Only one type of signal travels through axons and dendrites in a biological network. That signal is transferred into the flow of a neurotransmitter whose effect on the receiving neuron can be either excitatory or inhibitory, depending on the neuron, thereby dedicating certain connections inhibitory and excitatory One method for solving this problem is to utilize two sets of connections for the same output, having one set represent the positive connections and the other set represent the negative connections. The output of these two layers can be compared, and the layer with the greater output will output either a high signal or a low signal, depending on the type of connection set (inhibitory or excitatory). This can be seen in FIG. 5, where the excitatory output is, for example, a layer 1 output and the inhibitory output is a layer 2 output.

Figure 7:
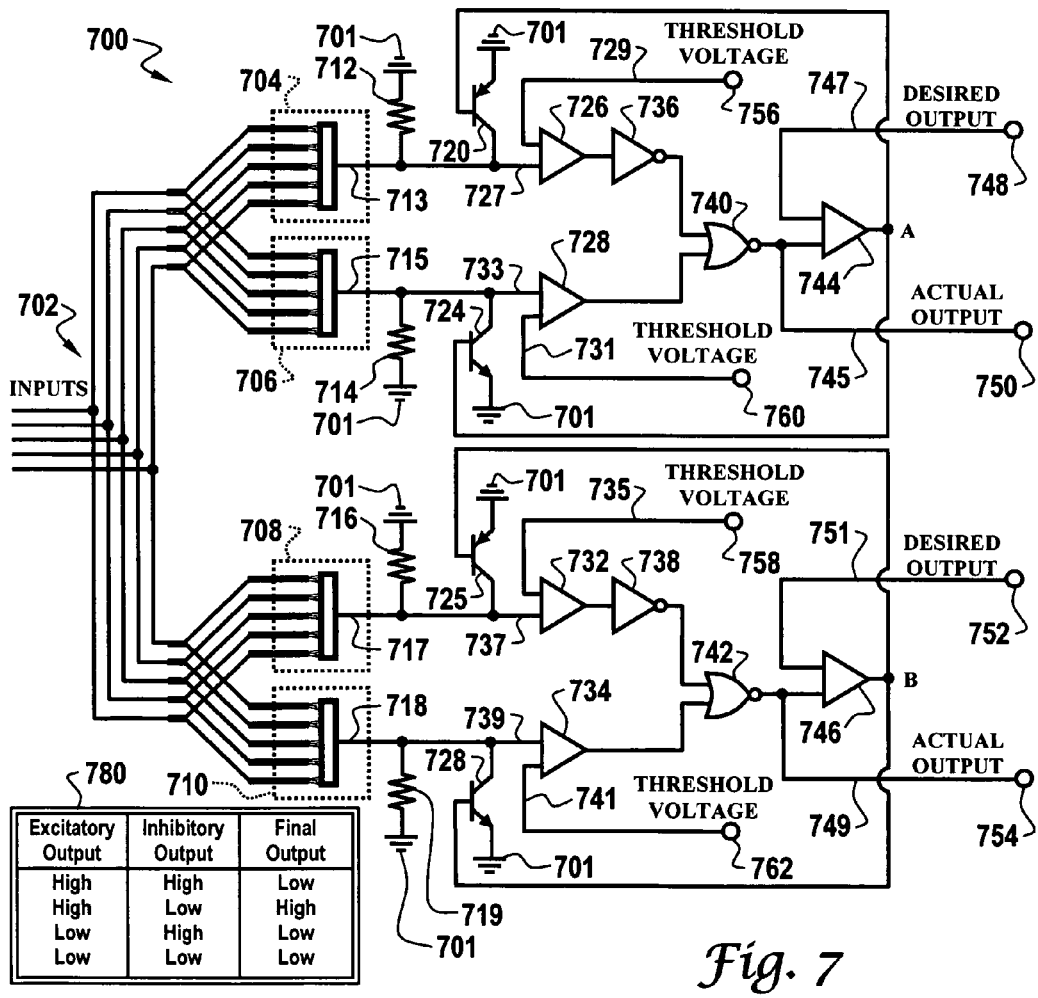
FIG. 7 illustrates a schematic diagram illustrating an example of a physical neural network that can be implemented in accordance with an alternative embodiment of the present invention.

A truth table for the output of circuit 700 is illustrated at block 780 in FIG. 7. As indicated at block 780, when an excitatory output is high and the inhibitory output is also high, the final output is low. When the excitatory output is high and the inhibitory output is low, the final output is high. Similarly, when the excitatory output is low and the inhibitory output is high, the final output is low. When the excitatory output is low and the inhibitory output is also low, the final output is low. Note that layers 704 and 708 may thus comprise excitatory connections, while layers 706 and 710 may comprise inhibitory connections.

At all times during the learning process, a weak alternating electric field can be applied perpendicular to the connections. This can cause the connections to weaken by rotating the nanotube perpendicular to the connection direction. This weakening of connections is important because it can allow for a much higher degree of adaptation. To understand this, one must realize that the connections cannot (practically) keep getting stronger and stronger. By weakening those connections not contributing much to the desired output, we decrease the necessary strength of the needed connections and allow for more flexibility in continuous training. Other mechanisms, such as increasing the temperature of the nanotube suspension could also be used for such a purpose.

The circuit depicted in FIG. 7 can be separated into two separate circuits. The first part of the circuit can be composed of nanotube connections, while the second part of the circuit comprises the "neurons" and the learning mechanism (i.e., op-amps/comparator). The learning mechanism on first glance appears similar to a relatively standard circuit that could be implemented on silicon with current technology. Such a silicon implementation can thus comprise the "neuron" portion of the chip.

Figure 8:
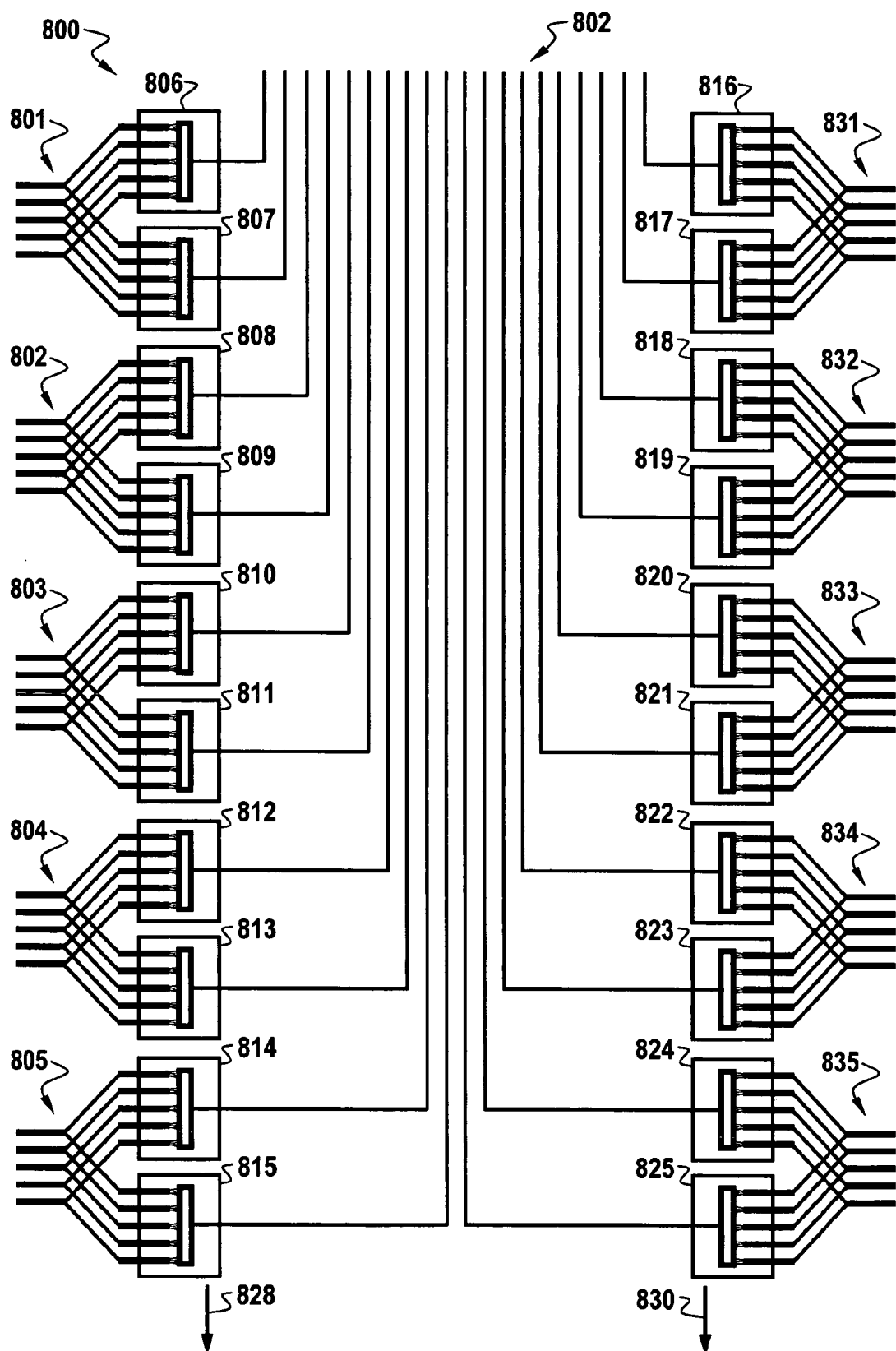
FIG. 8 illustrates a schematic diagram of a chip layout for a connection network that may be implemented in accordance with an alternative embodiment of the present invention.

The second part of the circuit (i.e., the connections) is thus a new type of chip structure, although it could be constructed with current technology. The connection chip can be composed of an orderly array of electrodes spaced anywhere from, for example, 100 nm to 1 μm or perhaps even further. In a biological system, one talks of synapses connecting neurons. It is in the synapses where the information is processed, (i.e., the "connection weights"). Similarly, such a chip can contain all of the synapses for the physical neural network. A possible 2-diminsional arrangement thereof can be seen in FIG. 8.

The training of such a chip is primarily based on two assumptions. First, the inherent parallelism of a physical neural network (i.e., a Knowm™ network or system) can permit all training sessions to occur simultaneously, no matter how large the associated connection network. Second, recent research has indicated that near perfect aligning of nanotubes can be accomplished in no more than 15 minutes utilizing practical voltages of about 5V.

If one considers that the input data, arranged as a vector of binary "high's" and "low's" is presented to the Knowm™ network or system simultaneously, and that all training vectors are presented one after the other in rapid succession (e.g., perhaps 100 MHz or more), then each connection would "see" a different frequency in direct proportion to the amount of time that its connection is required for accurate data processing (i.e., provided by a feedback mechanism). Thus, if it only takes approximately 15 minutes to attain an almost perfect state of alignment, then this amount of time would comprise the longest amount of time required to train, assuming that all of the training vectors are presented during that particular time period and adequate feedback has been provided.

Figure 9:
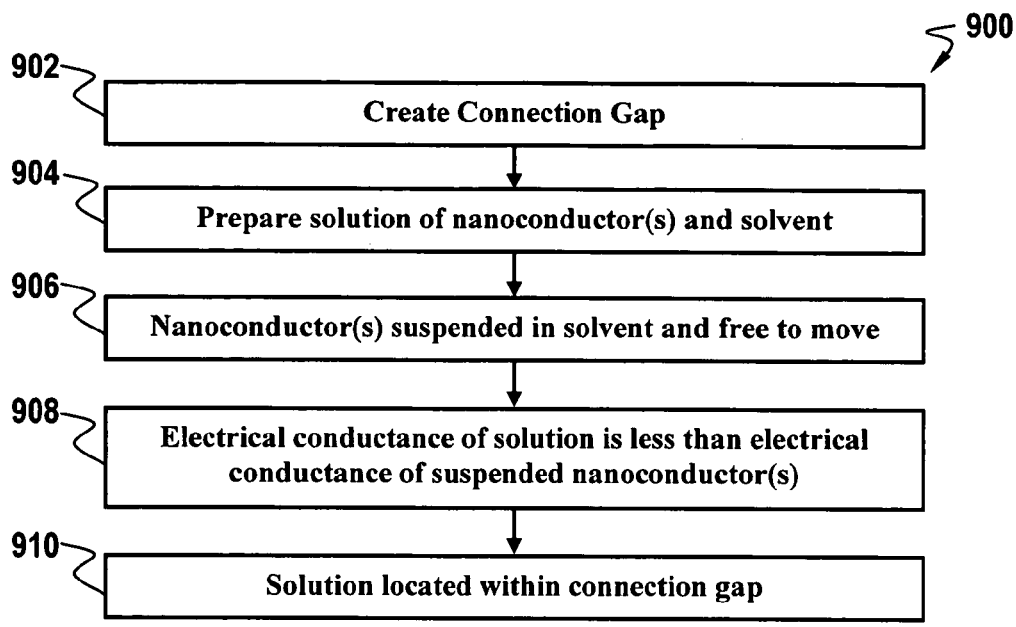
FIG. 9 illustrates a flow chart of operations illustrating operational steps that can be followed to construct a connection network, in accordance with one embodiment of the present invention.

FIG. 9 illustrates a flow chart 900 of logical operational steps that can be followed to construct a connection network, in accordance with an embodiment of the present invention. Initially, as indicated at block 902, a connection gap is created from a connection network structures. As indicated earlier, the goal for such a connection network is generally to develop a network of connections of "just" the right values to satisfy particular information processing requirements, which is precisely what a neural network accomplishes. As illustrated at block 904, a solution is prepared, which is composed of nanoconductors and a "solvent." Note that the term "solvent" as utilized herein has a variable meaning, which includes the traditional meaning of a "solvent," and also a suspension.

The solvent utilized can comprise a volatile liquid that can be confined or sealed and not exposed to air. For example, the solvent and the nanoconductors present within the resulting solution can be sandwiched between wafers of silicon or other materials. If the fluid has a melting point that is approximately at operating temperature, then the viscosity of the fluid could be controlled easily. Thus, if it is desired to lock the connection values into a particular state, the associated physical neural network (i.e., a Knowm™ network or system) can be cooled slightly until the fluid freezes. The term "solvent" as utilized herein thus can include fluids such as for example, toluene, hexadecane, mineral oil, liquid crystals, etc. Note that the solution in which the nanoconductors (i.e., nanoconnections) are present should generally comprise a substance that does not conduct electricity and allows for the suspension of nanoparticles.

Thus, when the resistance between the electrodes is measured, the conductivity of the nanoconductors can be measured, not that of the solvent. The nanoconductors can be suspended in the solution or can alternately lie on the bottom surface of the connection gap if the gap is 2-diminsional (i.e., formed on a planar surface such as electrodes deposited on the surface of a substrate). Note that the solvent described herein may also comprise liquid crystal media. Carbon nanotube alignment is possible by dissolving nanotubes in liquid crystal media, such that liquid crystals thereof align with an electric field and take the nanotubes and/or other nanoconductors with them.

As illustrated thereafter at block 906, the nanoconductors must be suspended in the solvent, either dissolved or in a suspension of sorts, but generally free to move around, either in the solution or on the bottom surface of the gap. As depicted next at block 908, the electrical conductance of the solution must be less than the electrical conductance of the suspended nanoconductor(s). Next, as illustrated at block 910, the viscosity of the substance should not be too much so that the nanoconductors cannot move when an electric field (e.g., voltage) is applied across the electrodes. Finally, as depicted at block 912, the resulting solution of the "solvent" and the nanoconductors is thus located within the connection gap.

Note that although a logical series of steps is illustrated in FIG. 9, it can be appreciated that the particular flow of steps can be re-arranged. Thus, for example, the creation of the connection gap, as illustrated at block 902, may occur after the preparation of the solution of the solvent and nanoconductor(s), as indicated at block 904. FIG. 9 thus represents merely possible series of steps, which can be followed to create a connection network. It is anticipated that a variety of other steps can be followed as long as the goal of achieving a connection network in accordance with the present invention is achieved. Similar reasoning also applies to FIG. 10.

Figure 10:
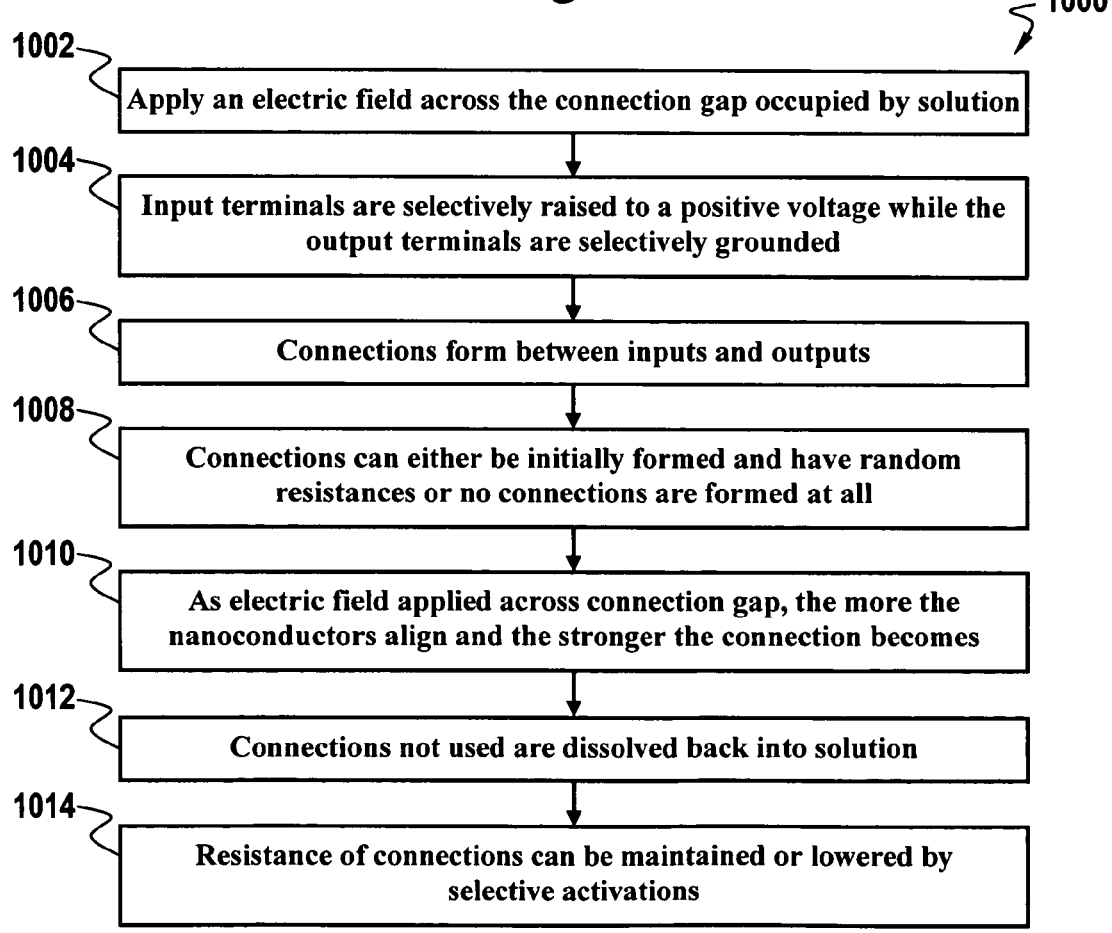
FIG. 10 illustrates a flow chart of operations illustrating operational steps that can be utilized to strengthen nanoconductors within a connection gap, in accordance with one embodiment of the present invention.

FIG. 10 illustrates a flow chart 1000 of logical operations steps that can be followed to strengthen nanoconductors within a connection gap, in accordance with a preferred of the present invention. As indicated at block 1002, an electric field can be applied across the connection gap discussed above with respect to FIG. 9. The connection gap can be occupied by the solution discussed above. As indicated thereafter at block 1004, to create the connection network, the input terminals can be selectively raised to a positive voltage while the output terminals are selectively grounded.

As illustrated thereafter at block 1006, connections thus form between the inputs and the outputs. The important requirements that make the resulting physical neural network functional as a neural network is that the longer this electric field is applied across the connection gap, or the greater the frequency or amplitude, the more nanoconductors align and the stronger the connection becomes. Thus, the connections that experience the most feedback during training become the strongest.

As indicated at block 1008, the connections can either be initially formed and have random resistances or no connections will be formed at all. By forming initial random connections, it might be possible to teach the desired relationships faster, because the base connections do not have to be built up as much. Depending on the rate of connection decay, having initial random connections could prove to be a faster method, although not necessarily. A connection network will adapt itself to whatever is required regardless of the initial state of the connections.

Thus, as indicated at block 1010, as the electric field is applied across the connection gap, the more the nonconductor(s) will align and the stronger the connection becomes. Connections (i.e., synapses) that are not used are dissolved back into the solution, as illustrated at block 1012. As illustrated at block 1014, the resistance of the connection can be maintained or lowered by selective activations of the connections. In other words, "if you do not use the connection, it will fade away," much like the connections between neurons in a human brain in response to Long Term Depression, or LTD.

The neurons in a human brain, although seemingly simple when viewed individually, interact in a complicated network that computes with both space and time. The most basic picture of a neuron, which is usually implemented in technology, is a summing device that adds up a signal. Actually, this statement can be made even more general by stating that a neuron adds up a signal in discrete units of time. In other words, every group of signals incident upon the neuron can be viewed as occurring in one moment in time. Summation thus occurs in a spatial manner. The only difference between one signal and another signal depends on where such signals originate. Unfortunately, this type of data processing excludes a large range of dynamic, varying situations that cannot necessarily be broken up into discrete units of time.

The example of speech recognition is a case in point. Speech occurs in the time domain. A word is understood as the temporal pronunciation of various phonemes. A sentence is composed of the temporal separation of varying words. Thoughts are composed of the temporal separation of varying sentences. Thus, for an individual to understand a spoken language at all, a phoneme, word, sentence or thought must exert some type of influence on another phoneme, word, sentence or thought. The most natural way that one sentence can exert any influence on another sentence, in the light of neural networks, is by a form of temporal summation. That is, a neuron "remembers" the signals it received in the past.

The human brain can accomplish such a feat in an almost trivial manner. When a signal reaches a neuron, the neuron has an influx of ions rush through its membrane. The influx of ions contributes to an overall increase in the electrical potential of the neuron. Activation is achieved when the potential inside the cell reaches a certain threshold. The one caveat is that it takes time for the cell to pump out the ions, something that it does at a more or less constant rate. So, if another signal arrives before the neuron has time to pump out all of the ions, the second signal will add with the remnants of the first signal and achieve a raised potential greater than that which could have occurred with only the second signal. The first signal influences the second signal, which results in temporal summation.

Implementing this in a technological manner has proved difficult in the past. Any simulation would have to include a "memory" for the neuron. In a digital representation, this requires data to be stored for every neuron, and this memory would have to be accessed continually. In a computer simulation, one must discritize the incoming data, since operations (such as summations and learning) occur serially. That is, a computer can only do one thing at a time. Transformations of a signal from the time domain into the spatial domain require that time be broken up into discrete lengths, something that is not necessarily possible with real-time analog signals in which no point exists within a time-varying signal that is uninfluenced by another point.

A physical neural network, however, is generally not digital. A physical neural network is a massively parallel analog device. The fact that actual molecules (e.g., nanoconductors) must move around (in time) makes one form of temporal summation a natural occurrence. This temporal summation is built into the nanoconnections and can occur at a time scale much longer that that which is possible with capacitors and standard analog circuitry in micron dimension VLSI designs. The easiest way to understand this is to view the multiplicity of nanoconnections as one connection with one input into a neuron-like node (Op-amp, Comparator, etc.). This can be seen in FIG. 11.

Figure 11:
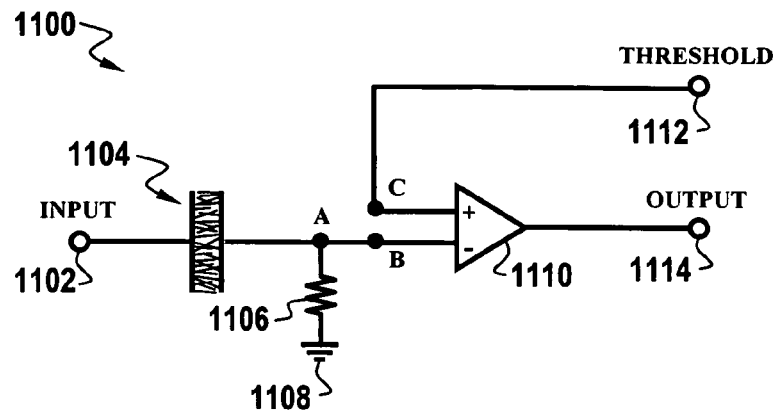
FIG. 11 illustrates a schematic diagram of a circuit illustrating temporal summation within a neuron, in accordance with one embodiment of the present invention.

FIG. 11 illustrates a schematic diagram of a circuit 1100 demonstrating temporal summation within a neuron, in accordance with one embodiment of the present invention. As indicated in FIG. 11, an input 1102 can be provided to nanoconnections 1104, which in turn provides a signal, which can be input to an amplifier 1110 (e.g., op amp) at node B. A resistor 1106 can be connected to node A, which in turn is electrically equivalent to node B. Node B can be connected to a negative input of amplifier 1100. Resistor 1108 can also be connected to a ground 1108. Amplifier 1110 can provide output 1114. Note that although nanoconnections 1104 is referred to in the plural it can be appreciated that nanoconnections 1104 can comprise a single nanoconnection or a plurality of nanoconnections. For simplicity sake, however, the plural form is used to refer to nanoconnections 1104.

Input 1102 can be provided by another physical neural network (i.e., a Knowm™ network or system) to cause increased connection strength of nanoconnections 1104 over time. This input will most likely arrive in pulses, but can also be continuous, depending upon a desired implementation. A constant or pulsed electric field perpendicular to the connections would serve to constantly erode the connections, so that only signals of a desired length or amplitude could cause a connection to form.

Once the connection is formed, the voltage divider formed by nanoconnection 1104 and resistor 1106 can cause a voltage at node A in direct proportion to the strength of nanoconnections 1104. When the voltage at node A reaches a desired threshold, the amplifier (i.e., an op-amp and/or comparator), will output a high voltage (i.e., output 1114). The key to the temporal summation is that, just like a real neuron, it takes time for the electric field to breakdown the nanoconnections 1104, so that signals arriving close in time will contribute to the firing of the neuron (i.e., op-amp, comparator, etc.). Temporal summation has thus been achieved. The parameters of the temporal summation could be adjusted by the amplitude and frequency of the input signals and the perpendicular electric field.

Figure 12:
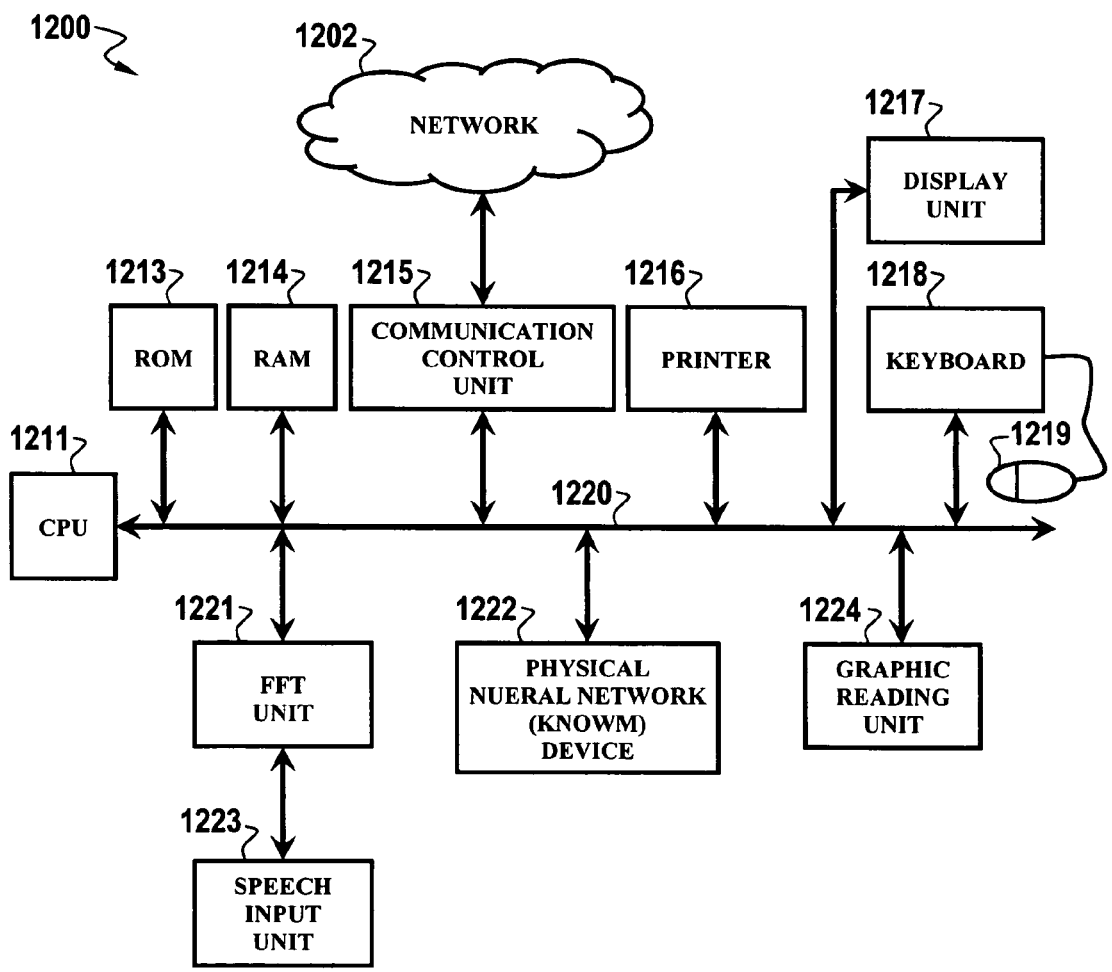
FIG. 12 illustrates a block diagram illustrating a pattern recognition system, which can be implemented with a physical neural network device, in accordance with an alternative embodiment of the present invention.

FIG. 12 illustrates a block diagram illustrating a pattern recognition system 1200, which can be implemented with a physical neural network device 1222, in accordance with an alternative embodiment of the present invention. Note that the pattern recognition system 1200 can be implemented as a speech recognition system. Although a pattern recognition system 1200 is depicted herein in the context of speech recognition, a physical neural network device (i.e., a Knowm™ device) can be implemented in association with other types of pattern recognition systems, such as visual and/or imaging recognition systems.

FIG. 12 thus is not considered a limiting feature of the present invention but is presented for general edification and illustrative purposes only. The diagram depicted in FIG. 12 can, of course, be modified as new applications and hardware are developed. The development or use of a pattern recognition system such as pattern recognition system 1200 of FIG. 12 by no means limits the scope of the physical neural network (i.e., Knowm™) disclosed herein.

FIG. 12 illustrates in block diagram fashion, a system structure of a speech recognition device using a neural network according to one alternative embodiment of the present invention. The pattern recognition system 1200 depicted in FIG. 12 can be provided with a CPU 1211 (e.g., a microprocessor) for performing the functions of inputting vector rows and instructor signals (vector rows) to an output layer for the learning process of a physical neural network device 1222, and changing connection weights between respective neuron devices based on the learning process. Pattern recognition system 1200 can be implemented within the context of a data-processing system, such as, for example, a personal computer or personal digital assistant (PDA), both of which are well known in the art.

The CPU 1211 can perform various processing and controlling functions, such as pattern recognition, including but not limited to speech and/or visual recognition based on the output signals from the physical neural network device 1222. The CPU 1211 is connected to a read-only memory (ROM) 1213, a random-access memory (RAM) 1214, a communication control unit 1215, a printer 1216, a display unit 1217, a keyboard 1218, an FFT (fast Fourier transform) unit 1221, a physical neural network device 1222 and a graphic reading unit 1224 through a bus line 1220 such as a data bus line. The bus line 1220 may comprise, for example, an ISA, EISA, or PCI bus.

The ROM 1213 is a read-only memory storing various programs or data used by the CPU 1211 for performing processing or controlling the learning process, and speech recognition of the physical neural network device 1222. The ROM 1213 may store programs for carrying out the learning process according to error back-propagation for the physical neural network device or code rows concerning, for example, 80 kinds of phonemes for performing speech recognition. The code rows concerning the phonemes can be utilized as second instructor signals and for recognizing phonemes from output signals of the neuron device network. Also, the ROM 1213 can store programs of a transformation system for recognizing speech from recognized phonemes and transforming the recognized speech into a writing (i.e., written form) represented by characters.

A predetermined program stored in the ROM 1213 can be downloaded and stored in the RAM 1214. RAM 1214 generally functions as a random access memory used as a working memory of the CPU 1211. In the RAM 1214, a vector row storing area can be provided for temporarily storing a power obtained at each point in time for each frequency of the speech signal analyzed by the FFT unit 1221. A value of the power for each frequency serves as a vector row input to a first input portion of the physical neural network device 1222. Further, in the case where characters or graphics are recognized in the physical neural network device, the image data read by the graphic reading unit 1224 are stored in the RAM 1214.

The communication control unit 1215 transmits and/or receives various data such as recognized speech data to and/or from another communication control unit through a communication network 1202 such as a telephone line network, an ISDN line, a LAN, or a personal computer communication network. Network 1202 may also comprise, for example, a telecommunications network, such as a wireless communications network. Communication hardware methods and systems thereof are well known in the art.

The printer 1216 can be provided with a laser printer, a bubble-type printer, a dot matrix printer, or the like, and prints contents of input data or the recognized speech. The display unit 1217 includes an image display portion such as a CRT display or a liquid crystal display, and a display control portion. The display unit 1217 can display the contents of the input data or the recognized speech as well as a direction of an operation required for speech recognition utilizing a graphical user interface (GUI).

The keyboard 1218 generally functions as an input unit for varying operating parameters or inputting setting conditions of the FFT unit 1221, or for inputting sentences. The keyboard 1218 is generally provided with a ten-key numeric pad for inputting numerical figures, character keys for inputting characters, and function keys for performing various functions. A mouse 1219 can be connected to the keyboard 1218 and serves as a pointing device.

A speech input unit 1223, such as a microphone can be connected to the FFT unit 1221. The FFT unit 1221 transforms analog speech data input from the voice input unit 1223 into digital data and carries out spectral analysis of the digital data by discrete Fourier transformation. By performing a spectral analysis using the FFT unit 1221, the vector row based on the powers of the respective frequencies are output at predetermined intervals of time. The FFT unit 1221 performs an analysis of time-series vector rows, which represent characteristics of the inputted speech. The vector rows output by the FFT 1221 are stored in the vector row storing area in the RAM 1214.

The graphic reading unit 224, provided with devices such as a CCD (Charged Coupled Device), can be used for reading images such as characters or graphics recorded on paper or the like. The image data read by the image-reading unit 1224 are stored in the RAM 1214. Note that an example of a pattern recognition apparatus, which can be modified for use with the physical neural network of the present invention, is disclosed in U.S. Pat. No. 6,026,358 to Tomabechi, Feb. 16, 2000, "Neural Network, A Method of Learning of a Neural Network and Phoneme Recognition Apparatus Utilizing a Neural Network."

Figure 6:
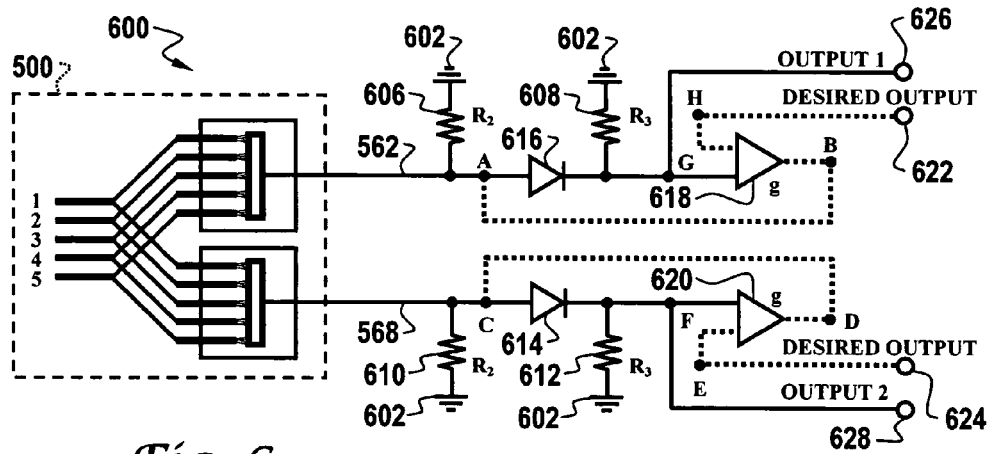
FIG. 6 illustrates a schematic diagram illustrating an example of a physical neural network that can be implemented in accordance with an alternative embodiment of the present invention.
Figure 14:
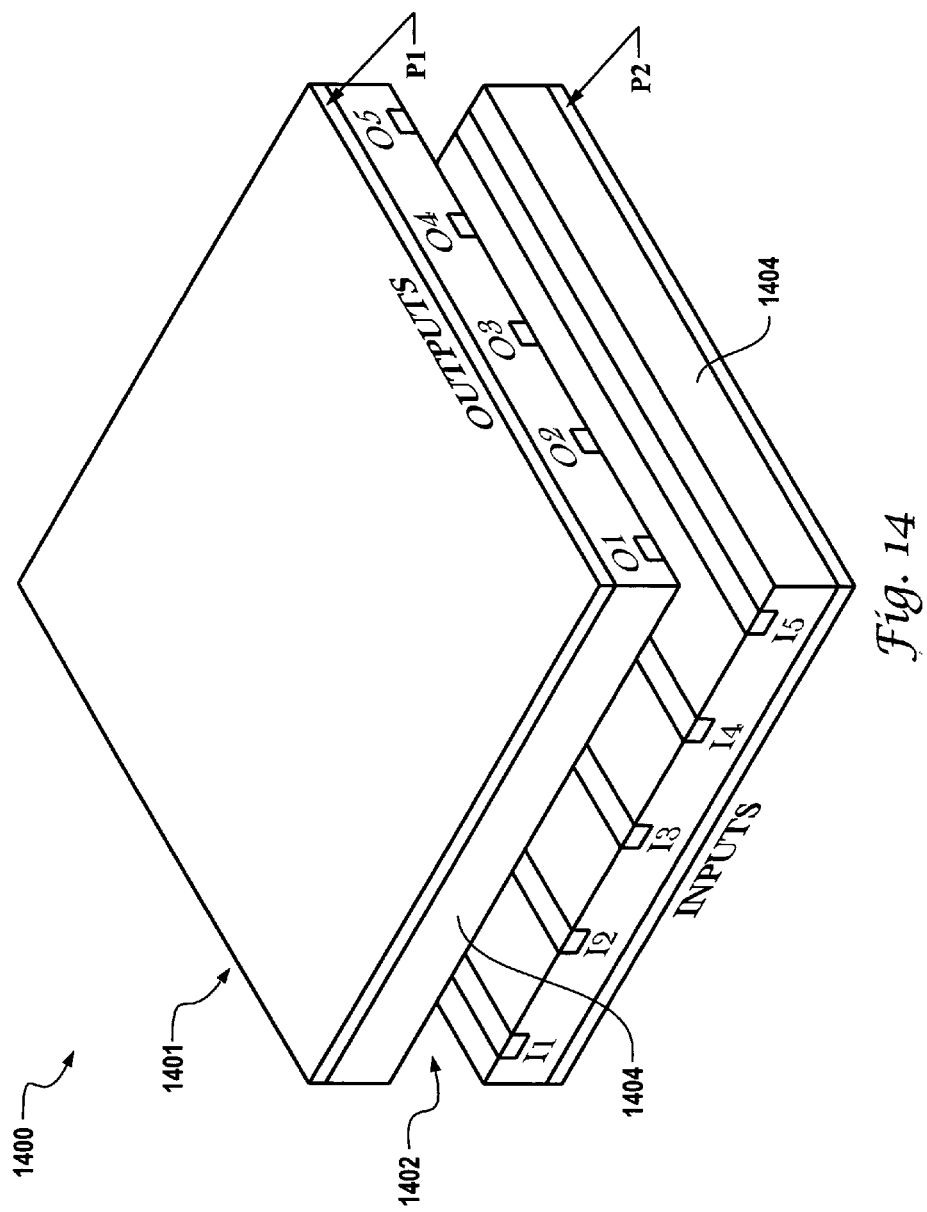
FIG. 14 illustrates a pictorial diagram of a perspective view of a synapse array, which can be implemented in accordance with one embodiment of the present invention.

The implications of a physical neural network are tremendous. With existing lithography technology, many electrodes in an array such as depicted in FIG. 5 or 14 can be etched onto a wafer of silicon. The "neurons" (i.e., amplifiers, diodes, etc.), as well as the training circuitry illustrated in FIG. 6, could be built onto the same silicon wafer. By building the neuron circuitry on one side of a substrate, and the electrode arrays on the other side, chips can be built that are no longer limited in synapse density. A solution of suspended nanoconductors could be placed between the electrode connections and the chip could be packaged. One could also place a rather large network parallel with a computer processor as part of a larger system. Such a network, or group of networks, can add significant computational capabilities to standard computers and associated interfaces.

For example, such a chip can be constructed utilizing a standard computer processor in parallel with a large physical neural network or group of physical neural networks. A program can then be written such that the standard computer teaches the neural network to read, or create an association between words, which is precisely the same sort of task in which neural networks can be implemented. This would amount to nothing more than presenting the Knowm network with a pre-defined sequence of input and output patterns stored in memory.

Once the physical neural network is able to "read", it can be taught for example to "surf" the Internet and find material of any particular nature. A search engine can then be developed that does not search the Internet by "keywords", but instead by meaning. This idea of an intelligent search engine has already been proposed for standard neural networks, but until now has been impractical because the network required was too big for a standard computer to simulate. The use of a physical neural network as disclosed herein now makes a truly intelligent search engine possible.

A physical neural network can be utilized in other applications, such as, for example, speech recognition and synthesis, visual and image identification, management of distributed systems, self-driving cars and filtering. Such applications have to some extent already been accomplished with standard neural networks, but are generally limited in expense, practicality and not very adaptable once implemented.

The use of a physical neural network can permit such applications to become more powerful and adaptable. Indeed, anything that requires a bit more "intelligence" could incorporate a physical neural network. One of the primary advantages of a physical neural network is that such a device and applications thereof can be very inexpensive to manufacture, even with present technology. The lithographic techniques required for fabricating the electrodes and channels there between has already been perfected and implemented in industry.

Most problems in which a neural network solution is generally implemented are complex adaptive problems, which change in time. An example is weather prediction. The usefulness of a physical neural network is that it could handle the enormous network needed for such computations and adapt itself in real-time. An example wherein a physical neural network (i.e., Knowm™) can be particularly useful is the Personal Digital Assistant (PDA). PDA's are well known in the art. A physical neural network applied to a PDA device can be advantageous because the physical neural network can ideally function with a large network that could constantly adapt itself to the individual user without devouring too much computational time from the PDA processor. A physical neural network could also be implemented in many industrial applications, such as developing a real-time systems control to the manufacture of various components. This systems control can be adaptable and totally tailored to the particular application, as necessarily it must.

The training of multiple connection networks between neuron layers within a multi-layer neural network is an important feature of any neural network. The addition of neuron layers to a neural network can increase the ability of the network to create increasingly complex associations between inputs and outputs. Unfortunately, the addition of extra neuron layers in a network raises an important question: How does one optimize the connections within the hidden layers to produce the desired output?

The neural network field was stalled for some time trying to answer this question until several parties simultaneously stumbled onto a computationally efficient solution, now referred to generally as "back-propagation" or "back-prop" for short. As the name implies, the solution involves a propagation of error back from the output to the input. Essentially, back-propagation amounts to efficiently determining the minimum of an error surface composed of n variables, where the variable n represents the number of connections.

Because back propagation is a computational algorithm, this concept may not make much sense physically. Another related question to ask is can the neurons in a human brain take a derivative? Do they "know" the result of a connection on another neuron? In other words, how does a neuron know what the desired output is if each neuron is an independent summing machine, only concerned with its own activation level and firing only when that activation is above threshold? What exactly can a neuron "know" about its environment?

Although this question is certainly open for debate, it is plausible to state that a neuron can only "know" if it has fired and whether or not its own connections have caused the firing of other neurons. This is precisely the Hebbian hypothesis for learning: "if neuron A repeatedly takes part in firing neuron B, then the connection between neuron A and B strengthens so that neuron A can more efficiently take part in firing neuron B". With this hypothesis, a technique can be derived to train a multi-layer physical neural network device without utilizing back-propagation or any other training "algorithm", although the technique mirrors back-propagation in form, as information is transferred from output layers to input layers, providing feedback in the form of pulses that modify connections.

In fact, the resulting Knowm™ (i.e., physical neural network) can be self-adaptable and does not require any calculations. In other words, the network and its training mechanism can be a physical process that arises from feedback signals within the network. The structure of a Knowm™ physical neural network or synapse thereof thus creates a situation in which learning simply takes place when a desired output is given. The description that follows is thus based on the use of a physical neural network (i.e., a Knowm™) and constituent nanoconnections thereof.

Figure 13:
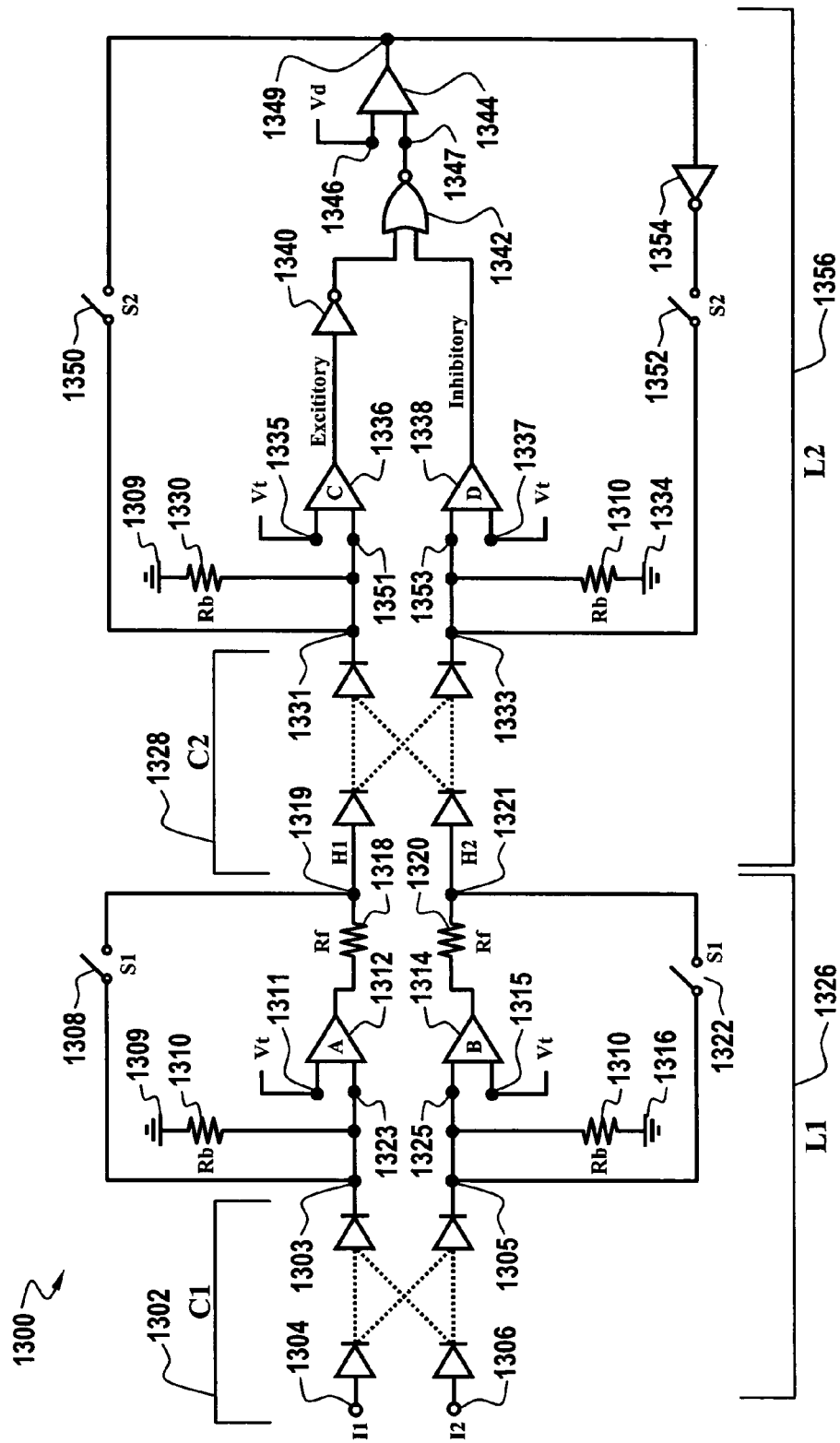
FIG. 13 illustrates a schematic diagram of a 2-input, 1-output, 2-layer inhibitory physical neural network, which can be implemented in accordance with one embodiment of the present invention.

FIG. 13 illustrates a schematic diagram of a 2-input, 1-output, 2-layer inhibitory physical neural network 1300, which can be implemented in accordance with one embodiment of the present invention. As indicated in FIG. 13, two layers 1326 and 1356 of physical neural network 1300 can be distinguished from one another. Note that as utilized herein, the term "layer" can be defined as comprising a connection network. Such a connection network can include one or more neurons in association with a plurality of nanoconductors present in a solvent, as explained herein. In FIG. 13, layers 1326 and 1356 are respectively labeled L1 and L2. Inputs 1304 and 1306 to a connection network 1302 are also indicated in FIG. 13, wherein inputs 1304 and 1306 are respectively labeled I1 and I2 and connection network 1302 is labeled C1.

Inputs 1304 and 1302 (i.e. I1 and I2) generally provide one or more signals, which can be propagated through connection network 1302 (i.e., C1). Connection network 1302 thus generates a first output signal at node 1303 and a second output signal at node 1305. The first output signal provided at node 1303 is further coupled to an input 1323 of an amplifier 1312, while the signal output signal provided at node 1305 is connected to an input 1325 of an amplifier 1314. Amplifier 1312 thus includes two inputs 1323 and 1311, while amplifier 1314 includes two inputs 1315 and 1325. Note that a voltage $V_t$ can be measured at input 1311 to amplifier 1312. Similarly, voltage $V_t$ can also be measured at input 1315 to amplifier 1314. Additionally, a resistor 1316 can be coupled to node 1305 and a resistor 1310 is connected to node 1303. Resistor 1310 is further coupled to a ground 1309. Resistor 1316 is further connected to ground 1309. Resistors 1310 and 1316 are labeled $R_b$ in FIG. 13.

Amplifier 1312 can thus function as a neuron A and amplifier 1314 functions as a neuron B. The two neurons, A and B, respectively sum the signals provided at nodes 1303 and 1305 to provide output signals thereof at nodes 1319 and 1321 (i.e., respectively H1 and H2). Additionally, a switch 1308, which is labeled S1, is connected between nodes 1303 and 1319. Likewise, a switch 1322, which is also labeled S1, is connected between nodes 1305 and 1321. A resistor 1318 is coupled between an output of amplifier 1312 and node 1319. Similarly, a resistor 1320 is coupled between an output of amplifier 1314 and node 1321. Node 1319, which carries signal H1, is connected to a connection network 1328. Also, node 1321, which carries signal H2, is connected to connection network 1328.

Note that connection network 1328 is labeled C2 in FIG. 3. A first signal can be output from connection network 1328 at node 1331. Likewise, a second signal can be output from connection network 1328 at node 1333. A resistor 1330, which is labeled $R_b$, is coupled between node 1331 and ground 1309. Also, a resistor 1334, which is also labeled $R_b$, is connected between node 1333 and ground 1309. Node 1333 is further connected to an input 1353 to amplifier 1338, while node 1331 is further coupled to an input 1351 to amplifier 1336. Note that resistor 1330 is also coupled to input 1351 at node 1331, while resistor 1334 is connected to input 1353 at node 1333.

A voltage $V_t$ can be measured at an input 1335 to amplifier 1336 and an input 1337 to amplifier 1338. Amplifiers 1335 and 1338 can be respectively referred to as neurons C and D. An output from amplifier 1336 is connected to a NOT gate 1340, which provides a signal that is input to a NOR gate 1342. Additionally, amplifier 1338 provides a signal, which can be input to NOR gate 1342. Such a signal, which is output from amplifier 1338 can form an inhibitory signal, which is input to NOR gate 1342. Similarly, the output from amplifier 1336 can comprise an excitatory signal, which is generally input to NOT gate 1340. The excitatory and inhibitory signals respectively output from amplifiers 1336 and 1338 form an excitatory/inhibitory signal pair. NOR gate 1342 generates an output, which is input to an amplifier 1344 at input node 1347. A voltage $V_d$ can be measured at input node 1346, which is coupled to amplifier 1344.

Thus, the signals H1 and H2, which are respectively carried at nodes 1319 and 1321 are generally propagated through connection network 1328, which is labeled C2, where the signals are again summed by the two neurons, C and D (i.e., amplifiers 1336 and 1338). The output of these two neurons therefore form an excitatory/inhibitory signal pair, which through the NOT gate 1340 and the NOR gate 1342 are transformed into a signal output O1 as indicated at output 1348. Note that signal output node O1 can be measured at input node 1347 of amplifier 1344. Amplifier 1344 also includes an output node 1349, which is coupled to node 1331 through a switch 1350, which is labeled S2. Output 1349 is further coupled to a NOT gate 1354, which in turn provides an output which is coupled to node 133 through a switch 1352, which is also labeled S2.

For inhibitory effects to occur, it may be necessary to implement twice as many outputs from the final connection network as actual outputs. Thus, every actual output represents a competition between a dedicated excitatory signal and inhibitory signal. The resistors labeled $R_b$ (i.e., resistors 1330 and 1334) are generally very large, about 10 or 20 times as large as a nanoconnection. On the other hand, the resistors labeled $R_f$ (i.e., resistors 1318 and 1320) may possess resistance values that are generally less than that of a nanoconnection, although such resistances can be altered to affect the overall behavior of the associated physical neural network. $V_t$ represents the threshold voltage of the neuron while $V_d$ represents the desired output. S1 and S2 are switches involved in the training of layers 1 and 2 respectively (i.e., L1 and L2, which are indicated respectively by brackets 1326 and 1356 in FIG. 13).

For reasons that will become clear later, a typical training cycle can be described as follows. Initially, an input vector can be presented at I1 and I2. For this particular example, such an input vector generally corresponds to only 4 possible combinations, 11, 10, 01 or 00. Actual applications would obviously require many more inputs, perhaps several thousand or more. One should be aware that the input vector does not have to occur in discrete time intervals, but can occur in real time. The inputs also need not necessarily be digital, but for the sake of simplicity in explaining this example, digital representations are helpful. While an input pattern is being presented, a corresponding output can be presented at $V_d$. Again, in this particular case there is only one output with only two corresponding possible outcomes, 1 or 0. The desired output also does not have to be presented in discrete units of time.

For learning to occur, the switches 1350 and 1352 (i.e., S2) can be closed, followed by switches 1308 and 1322 (i.e., S1). Both groupings of switches (S1 and S2) can then be opened and the cycle thereof repeated. Although only two layers L1 and L2 are illustrated in FIG. 13, it can be appreciated that a particular embodiment of the present invention can be configured to include many more layers. Thus, if more than two layers exist, then the switches associated with the preceding layer can be initially closed, then the second to last, the third to last and so on, until the last switch is closed on the input layer. The cycle is repeated. This "training wave" of closing switches can occur at a frequency determined by the user. Although it will be explained in detail later, the more rapid the frequency of such a training wave, the faster the learning capabilities of the physical neural network.

For example, it can be assumed that no connections have formed within connection networks C1 or C2 and that inputs are being matched by desired outputs while the training wave is present. Since no connections are present, the voltage at neurons A, B, C and D are all zero and consequently all neurons output zero. One can quickly realize that whether the training wave is present or not, a voltage drop will not ensue across any connections other than those associated with the input connection network. The inputs, however, are being activated. Thus, each input is seeing a different frequency. Connections then form in connection network C1, with the value of the connections essentially being random.

Before a connection has been made, the voltage incident on neurons A and B is zero, but after a connection has formed, the voltage jumps to approximately two diode drops short of the input voltage. This is because the connections form a voltage divider with $R_b$, such that $R_b$ (i.e., resistors 1310 and/or 1316) possesses a resistance very much larger than that of the nanoconnections. Two reasons for utilizing a large $R_b$ are to minimize power consumption of the physical neural network during a normal operation thereof, and to lower the voltage drop across the connections so that learning (i.e. connection modification) only takes place when feedback is present. Fortunately, nanotube contact resistances are on the order of about 100 kΩ, or more, which can allow for an $R_b$ of a few MΩ or greater. $V_t$ must be somewhere between two diode drops of the input voltage and the voltage produce by one nanoconnection in a voltage divider with $R_b$, the later being lower than the former.

Once connections have formed across C1 and grown sufficiently strong enough to activate neurons A and B, the connections across C2 can form in the same manner. Before continuing, however, it is important to determine what will occur to the nanoconnections of connection network 1302 (i.e., C1) after they grow strong enough to activate the first layer neurons. For the sake of example, assume that neuron A has been activated. When S1 is closed in the training wave, neuron A "sees" a feedback that is positive (i.e., activated). This locks the neuron into a state of activation, while S1 is closed. Because of the presence of diodes in connection network 1302 (i.e., C1), current can only flow from left to right in C1. This results in the lack of a voltage drop across the nanoconnections.

If another electric field is applied at this time to weaken the nanoconnections (e.g., perhaps a perpendicular field), the nanoconnections causing activation to the neuron can be weakened (i.e., the connections running from positive inputs to the neuron are weakened) This can also be accomplished by an increased temperature, which could naturally arise from heat dissipation of the other circuitry on the chip. This feedback will continue as long as the connections are strong enough to activate the neuron (i.e., and no connections have formed in the second layer). Nanoconnections can thus form and be maintained at or near the values of neuron activation. This process will also occur for ensuing layers until an actual network output is achieved.

Although the following explanation for the training of the newly formed (and random) connections may appear unusual with respect to FIG. 13, the configuration depicted in FIG. 13 represents the smallest, simplest network available to demonstrate multi-layer training. A typical physical neural network can actually employ many more inputs, outputs and neurons. In the process of explaining training, reference is made to FIG. 13, however, embodiments of the present invention can be implemented with more than simply two inputs and one output.

FIG. 13 is thus presented for illustrative purposes only and the number of inputs, outputs, neurons, layers, and so forth, should not be considered a limiting feature of the present invention, which is contemplated to cover physical neural networks that are implemented with hundreds, thousands, and even millions of such inputs, outputs, neurons, layers, and so forth. Thus, the general principles explained here with respect to FIG. 13 can be applied to physical neural networks of any size.

It can be appreciated from FIG. 13 that neuron C (i.e., amplifier 1336) is generally excitatory and neuron D (i.e., amplifier 1338) is generally inhibitory. The use of NOT gates 1340 and 1354 and NOR gate 1342 create a situation in which the output is only positive if neuron C is high and neuron D zero (i.e., only if the excitatory neuron C is high and the inhibitory neuron D low). For the particular example described herein with respect to FIG. 13, where only one output is utilized, there generally exists a fifty-fifty chance that the output will be correct.

Recall, however, that in a typical physical neural network many more outputs are likely to be utilized. If the output is high when the desired output is low, then the training neuron (i.e., amplifier 1344, the last neuron on the right in FIG. 13) outputs a high signal. When S2 is closed during the training wave, this means that the post connections of the excitatory neuron will receive a high signal and the post connections of the inhibitory neuron a negative signal (i.e., because of the presence of NOT gate 1354). Note that through feedback thereof, each neuron will be locked into each state while S2 is closed.

Because of the presence of diodes within connection network 1328 (i.e., C2), there will be no voltage drop across those connections going to the excitatory neuron. There will be a voltage drop, however, across the nanoconnections extending from positive inputs of C2 to the inhibitory neuron (i.e., amplifier 1338). This can result in increases in inhibitory nanoconnections and a decrease in excitatory nanoconnections thereof (i.e., if an eroding is present). This is exactly what is desired if the desired output is low when the actual output is high. A correspondingly opposite mechanism strengthens excitatory connections and weakens inhibitory connections if the desired output is high when the actual output is low. When the desired output matches the actual output, the training neurons output is dependent on the gain of the differential amplifier.

Thus far an explanation has been presented describing how the last layer of a physical neural network can in essence train itself to match the desired output. An important concept to realize, however, is that the activations coming from the previous layer are basically random. Thus, the last connection network tries to match essentially random activations with desired outputs. For reasons previously explained, the activations emanating from the previous layer do not remain the same, but fluctuate. There must then be some way to "tell" the layers preceding the output layer which particular outputs are required so that their activations are no longer random.

One must realize that neurons simply cannot fire unless a neuron in a preceding layer has fired. The activation of output neurons can be seen as being aided by the activations of neurons in previous layers. An output neuron "doesn't care" what neuron in the previous layer is activating it, so long as it is able to produce the desired output. If an output neuron must produce a high output, then there must be at least one neuron in the previous layer that both has a connection to it and is also activated, with the nanoconnection(s) being strong enough to allow for activation, either by itself or in combination with other activated neurons.

With this in mind, one can appreciate that the nanoconnections associated with pre-output layers can be modified. Again, by referring to FIG. 13, it can be appreciated that when S2 is closed (and S1 still open), $R_f$ may form a voltage divider with the connections of C2, with $R_b$ taken out of the picture. Recall that $R_f$ represents resistors 1318 and/or 1320, while $R_b$ represents resistors 1310 and/or 1316. Because of the diodes on every input and output of C2, only connections that go from a positive activation of neurons A and B to ground after C2 will allow current to flow. Recall as explained previously that only those nanoconnections that are required to be strengthened in the output connection matrix thereof will be negative, so that the voltage signals H1 and H2 measured respectively at nodes 1319 and 1321 are the direct result of how many neurons "need" to be activated in the output layer. In other words, the more neurons in layer i+1 that need activation, the lower the total equivalent resistance of all connections connecting a neuron in layer "i" and the neurons in layer "i+1" needing activation.

By thereafter closing S1, the previous layer neurons in essence "know" how much of their activation signal is being utilized. If their signal is being utilized by many neurons in a preceding layer, or by only a few with very strong nanoconnections, then the voltage that the neuron receives as feedback when S1 is closed decreases to a point below the threshold of the neuron. Exactly what point this occurs at is dependent on the value of $R_f$ (i.e., resistors 1318 and/or 1320) As $R_f$ becomes larger, less resistance is generally required to lower H1 or H2 to a point below the threshold of the neuron. This feedback voltage is very important, as this is how the network matches inputs with desired outputs. First, note that the feedback is local, confined to individual neurons. In essence, if a neuron needs to supply activations to many neurons, then it must strengthen its connections to neurons that are activating it, so that it may continue to do its job.

Several subtleties exist in this feedback process. Although the feedback voltage is largely determined by the neurons' pre-synaptic connections, (i.e., "axonal" connections), it is also determined by the neurons' post synaptic connections (i.e., dendritic connections). If the feedback voltage, Vf, is lower than the threshold voltage, Vt, then the dendritic connections will be strengthened. Because the feedback voltage is a function of both the axonal and dendritic connections, one scenario that cannot lower Vf below Vt is weak axonal connections and very strong dendritic connections. In other words, if the dendritic connections (to activated neurons) are very strong, then the axonal connections (to neurons needing activation) must be correspondingly stronger. This relationship is not linear. Thus, based on the foregoing, nanoconnections in layers preceding the output layer can modify themselves.

Referring again to FIG. 13 as an example, if the voltage at H1 decreases to a point below $V_t$ when S1 is closed, then either neuron C or D (or both) will require the activation of neuron A to achieve the desired output. When S1 closes, neuron A receives the voltage at H1 as feedback, which is below the threshold of the neuron. This causes the neuron to output zero, which can again be transmitted by feedback to the neuron's input. Now the neuron is locked in a feedback loop constantly outputting zero. This causes an electric field to be generated across the connections of C1, from positive activations of I1 and/or I2 (i.e., inputs 1304 and/or 1306) to neuron A. Now the nanoconnections causing the activation of neuron A are even stronger.

Note that connections could also form between activated pre-synaptic neurons and the neuron in question even if no initial connection is present, or if the post-synaptic neuron is inactivated. This last form of connection formation is important because it allows for a form of connection exploration. In other words, connections can be formed, and if the feedback mechanism finds it useful to match a desired input-output relationship, it will be strengthen. If not, it will be weakened. This allows neuron A to keep outputting a high signal that in turn allows the output neurons to match the desired output. The same argument can apply for neuron B, or any neuron in any layer preceding the output layer.

Although a detailed description of the process has been provided above, it is helpful to view the process from a generalized perspective. Again, assuming that no connections are present in any of the connection networks, assume that a series of input vectors are presented to the inputs of the network, and a series of output vectors are presented to the desired output, while the training wave is present. The training wave should be at a frequency equal or greater than the frequency at which input patterns are presented or otherwise the first few layers will not be trained and the network will be unable to learn the associations. The first layer connection network, analogous to C1 in FIG. 13, will begin to form connections, and continue to build connections until the sum of the connection hovers around the activation threshold for the succeeding neurons (amplifiers). Once C1 connections have been created, C2 connections can be created in the same manner, this time with the input signals coming from the neuron activations of the preceding neurons.

The connections can, just like C1, build up and hover around the threshold voltage for the succeeding neurons. This pattern of forming connections can generally occur until a signal is achieved at the output. Once a signal has been outputted, the feedback process begins and the training wave guides the feedback so that connections are modified strategically, from the output connection network to the input connection network, to achieve the desired output. The training is continued until the user is satisfied with the networks ability to correctly generate the correct output for a given input.

In evaluating a standard feed-forward multi-layer neural network, connections generally form between every neuron in one layer and every neuron in the next layer. Thus, neurons in adjacent layers are generally completely interconnected. When implementing this in a physical structure where connection strengths are stored as a physical connection, the architecture must be configured that allows for both total connectedness between layers and which also provides for the efficient use of space. In a physical neural network device (i.e., a "Knowm™" device), connections form between two conducting electrodes. The space between the electrodes can be filled with a nano-conductor/dielectric solvent mixture, which has been described previously herein. As an electric field is applied across the electrode gap, connections form between the electrodes. A basic method and structure for generating a large number of synapses on a small area substrate is illustrated in FIG. 14.

FIG. 14 illustrates a pictorial diagram of a perspective view of a system 1400 that includes a synapse array 1401, which can be implemented in accordance with one embodiment of the present invention. The synapse array 1401 illustrated in FIG. 14 can be implemented as a chip, which may also be referred to as a Knowm™ chip or a physical neural network chip. Additionally, the configuration depicted in FIG. 14 can be referred to simply as a "synapse" chip. The use of the term "synapse" as utilized herein is thus analogous to use of the term synapse in the biological arts. Although not biological in nature, the functions of a synapse or synapse chip as described herein do have similarities to biological systems. A synapse is simply the point at which a nerve impulse is transmitted from one neuron to another. Similarly, a synapse chip can be configured as the point at which electrical signals are transmitted from artificial neuron to another.

The basic structure of a physical neural network device, such as a physical neural network chip and/or synapse chip, is depicted in FIG. 14. Synapse array 1401 (i.e., a synapse chip) can formed from a substrate 1404. By forming a gap 1402 between two plates P1 and P2 covered with electrodes, filled with a solution of nano-conductors and a dielectric solvent, it can be appreciated that connections can easily form between every input and every output by aligning vertically from one input electrode to a perpendicular output electrode. It is thus apparent that the input and output electrodes would include some sort of conducting material.

The input electrodes are indicated in FIG. 14 by input electrodes I1, I2, I3, I4 and I5. The output electrodes are indicated in FIG. 14 by output electrodes O1, O2, O3, O4, and O5. For a Knowm™ device (e.g., a synapse chip), a perpendicular field can be applied across the connection gap to weaken the connections, so that the connection strengths are fully controllable. Various placements of auxiliary electrodes, either on P1, P2, or both can accomplish this feature. Alternatively, the temperature could be maintained at an elevated level so that thermal energy can break down connections. This last form, (i.e., temperature degradation), could provide the most elegant solution. During the learning phase, an increased voltage drop across the connections can result in substantial heat generation within the chip. This heat, in turn, can be vital to the learning process by weakening connections that \are not used.

Figure 15:
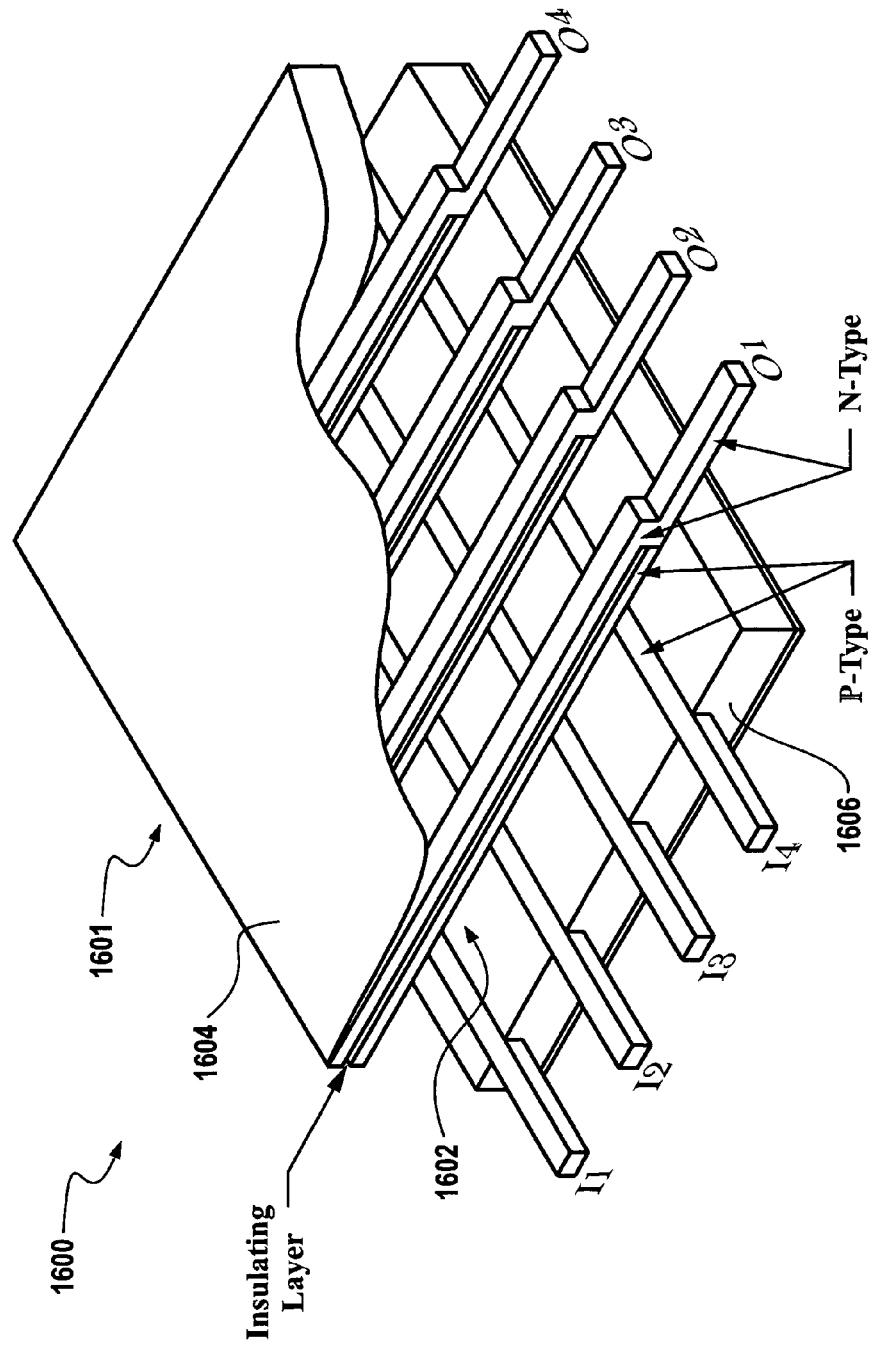
FIG. 15 illustrates a pictorial diagram of a perspective view of an alternative chip structure with parallel conductors on output, which can be implemented in accordance with an alternative embodiment of the present invention.

FIG. 15 illustrates a pictorial diagram 1600 of a perspective view of an alternative chip structure 1601 with parallel conductors on output, which can be implemented in accordance with an alternative embodiment of the present invention. As indicated in FIG. 15, the actual chip layout can be seen as two basic chip structures, an input layer 1606 and an output layer 1604, each sandwiched over a gap 1602 filled with a nano-conductor/dielectric solvent mixture. The output layer 1604 can generally be formed from output electrodes O1, O2, O3, and O4, while the input layer can be formed from input electrodes I1, I2, I3, and I4.

Although only four input electrodes and four output electrodes are illustrated in FIG. 15, this particular number of input and output electrodes is depicted for illustrative purposes only. In a typical synapse chip implemented in accordance with the present invention, many more (i.e., thousands, millions, etc.) input and output electrodes can be utilized to form input and output electrode arrays thereof. Additionally, the nanoconductors form connections in the intersections between input and output electrodes due to the increased electric field strength. Chip structure 1601 thus represents one type of a synapse chip, which can be implemented in accordance with one possible embodiment of the present invention described herein.

Figure 16:
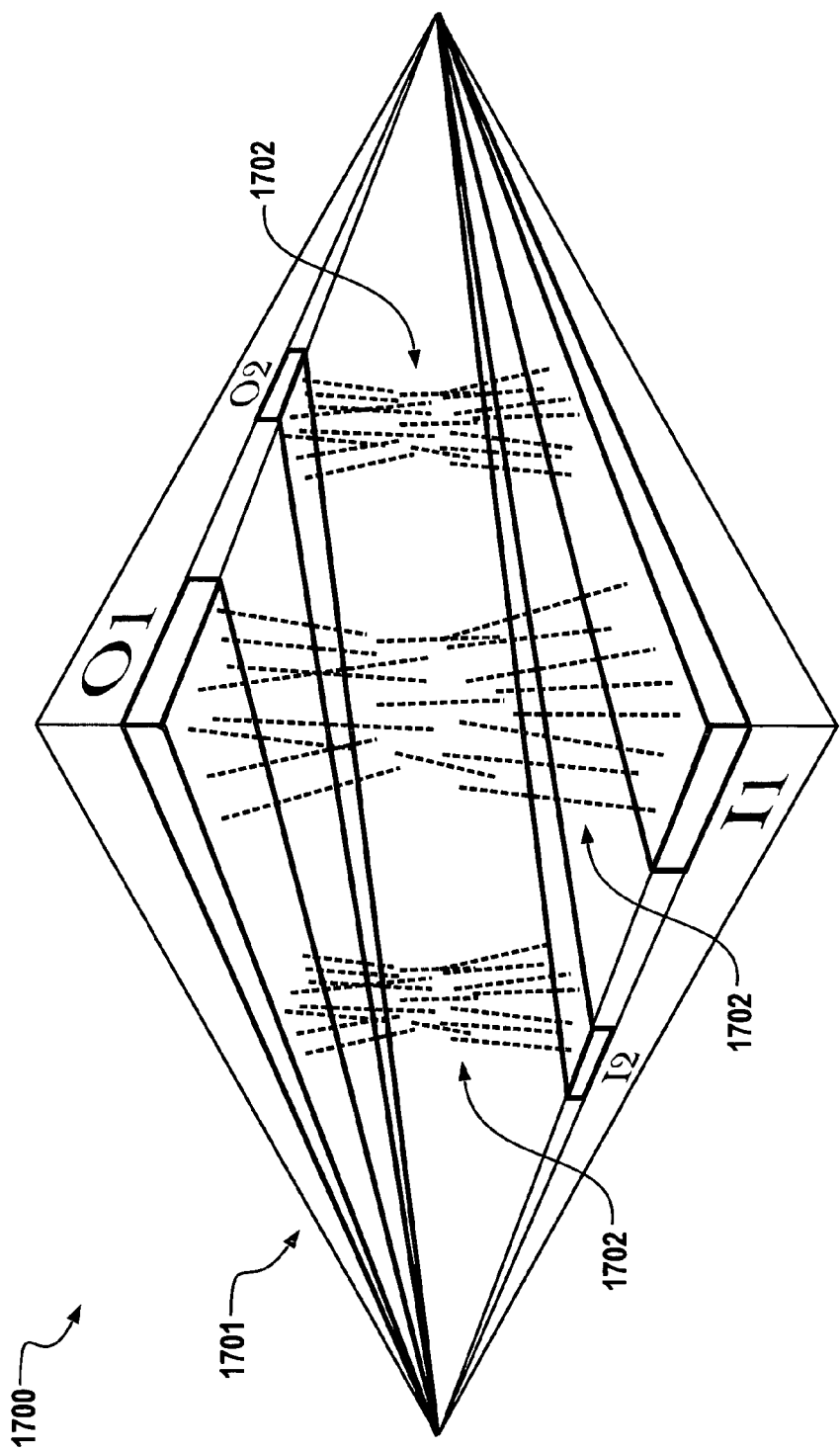
FIG. 16 illustrates a perspective view of a system that includes a connection formation, in accordance with a preferred or alternative embodiment of the present invention.

FIG. 16 illustrates a perspective view of a system 1700 that includes a connection formation 1701, in accordance with a preferred or alternative embodiment of the present invention. As depicted in FIG. 16, nanoconnections 1702 can form at intersections between input and output electrodes due to an increase in electric field strength. Architectures of this type can offer substantial benefits for producing a Knowm™ synapse chip. These include ease of assembly and efficient use of space. Regarding the ease of assembly, the total chip can comprise two electrode arrays aligned perpendicular to each other, with a layer of nano-conductor/dielectric solution between the two.

Figure 17:
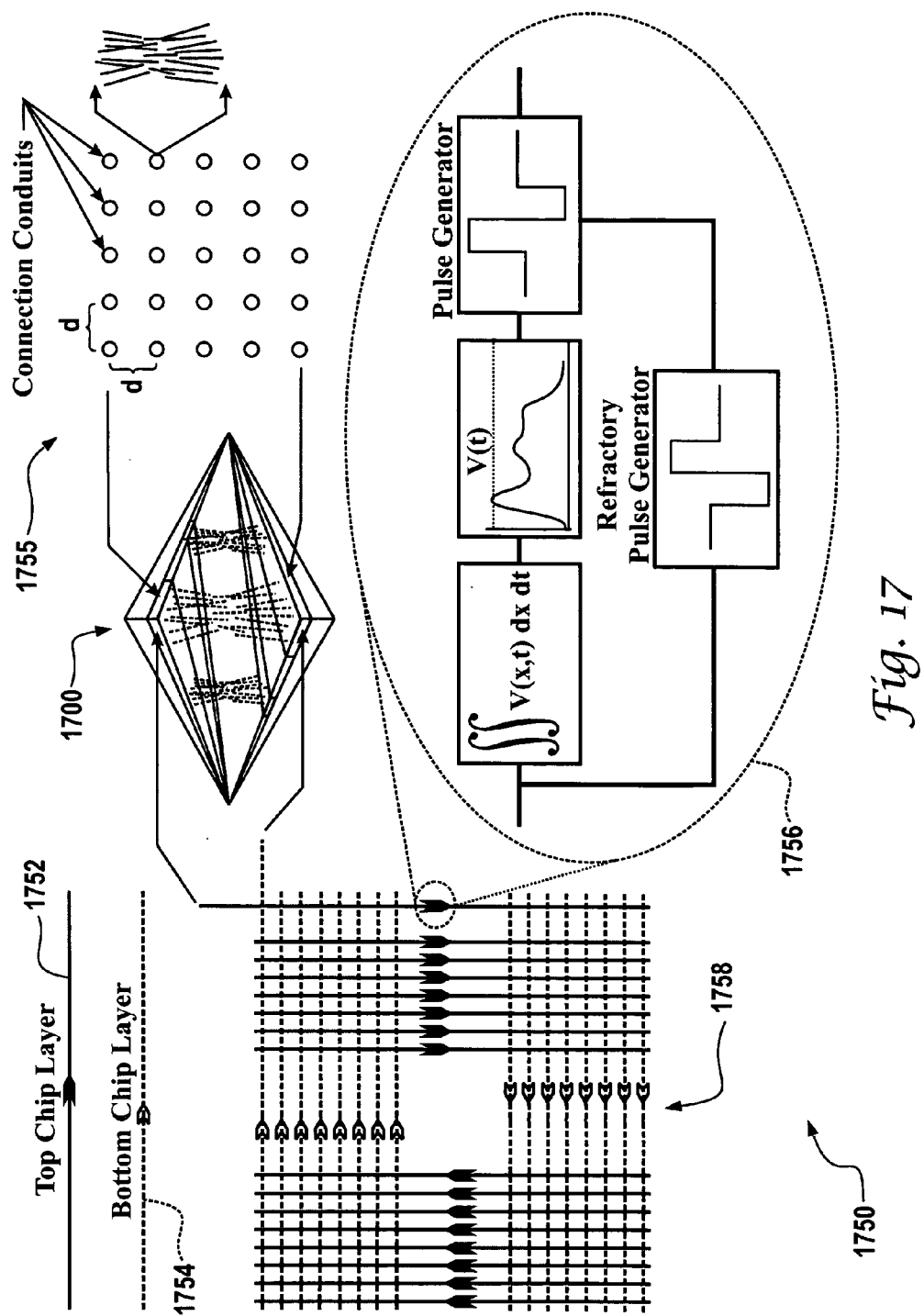
FIG. 17 illustrates a system illustrating the use of system of FIG. 16 in the context of a synapse chip and neural network configuration thereof.

FIG. 17 illustrates a system 1750 illustrating the use of system 1700 of FIG. 16 in the context of a synapse chip and neural network configuration thereof. System 1750 indicates a chip 1758 along with a top chip layer 1752 and a both chip layer 1754, which are respectively indicated through the use of solid lines (representing layer 1752) and dashed lines (representing layer 1754). A diagram 1756 represents connection conduits, while a schematic diagram 1756 represents graphically the mathematical operations taking place via chip 1758. Note that in FIGS. 16 and 17, like or analogous parts or elements are indicated by identical reference numerals.

A larger view of an adaptive network system can thus be seen in FIG. 17. As previously mentioned, a network can be constructed by integrating many base neurons (i.e., see schematic diagram 1756). Each base neuron can contain both temporal and a spatial summation of signals generated by other base neurons. This summed signal can then be compared to a threshold voltage, and if the summed voltage exceeds the threshold voltage, a pulse may be emitted at the base neurons pre-synaptic electrodes. The inverse of the pre-synaptic pulse can also be emitted at the base neurons post-synaptic electrodes.

The base neurons can be in a perpendicular array structure (i.e., chip 1758) composed of two or more layers 1752, 1754 coupled with Knowm synapses (i.e., system 1700). Each Knowm synapse can be composed of connection conduits, separated by a characteristic distance "d", where each connection conduit is the result of nano-particles aligning in an electric field generated by the temporal and sequential firing of the coupled base neurons (i.e., see schematic diagram 1756). External inputs to the network can be coupled to any post-synaptic electrode of any base neuron in any layer. And any network output can be provided at any pre-synaptic electrode of any base neuron in any layer.

Other attempts at creating a neural-like processor require components to be placed precisely, with resolutions of a nanometer. The design of FIG. 16, for example, only requires two perpendicular electrode arrays. Prepared nanoconductors, such as, for example, nanotubes and/or nanowires, can be simply mixed with a dielectric solvent. A micro-drop of the solution can thereafter be placed between the electrode arrays. Regarding the efficient use of space, even with electrode widths of 1 micron and spacing between electrodes of 2 microns, 11 million synapses or more could potentially fit on 1 square centimeter. If electrode widths of 100 nm, with spacing of 200 nm, are utilized, approximately 1 billion synapses could potentially fit on 1 $cm^2$.

Although the electrode dimensions cannot be lowered indefinitely without a considerable loss in connection resistance variation, it is conceivable that a 1 $cm^2$ chip could hold over 4 billion synapses (e.g., 50 nm electrodes and 100 nm spacing=4.4 billion synapes/$cm^2$). Because neuron circuitry could potentially be constructed on the other side of the synapse arrays, very compact neural processors with high neuron/synapse density could also be constructed.

Some considerations about the construction of a chip should be addressed. For example, the distance between the input electrodes should generally remain at a distance close, but not touching, the output electrodes. If carbon nanotubes are utilized for the nano-conductors within the gaps, one would need to prepare the nanotubes to lengths shorter than the gap distance. If the gap distance is, for example, approximately, 100 nm, then the nanotubes should be sized less this dimension. Given a diameter of about 1.5 nm, nanotubes can only go so far, perhaps 10's of nanometers. At 1.5 nm, one is now approaching atomic distances. The distance between the two electrodes could be maintained by resting the upper plate of electrodes on "pedestals", which could be formed by an interference photolithography technique.

Note that as utilized herein, the term "chip" generally refers to a type of integrated circuit, which is known in the art as a device comprising a number of connected circuit elements such as transistors and resistors, fabricated on a single chip of silicon crystal or other semiconductor material. Such chips have traditionally been manufactured as flat rectangular or square shaped objects. It can be appreciated, however, that such chips can be fabricated in a variety of shapes, including circular and spherical shapes in addition to traditional square, box or rectangular shaped integrated circuit chips. Thus, a synapse chip or physical neural network chip (i.e., a Knowm™ chip) can also be fabricated as a spherical integrated circuit.

A non-limiting and non-essential example of a spherical chip is disclosed in U.S. Pat. No. 6,245,630, "Spherical Shaped Semiconductor Circuit," which issued to Akira Ishikawa of Ball Semiconductor, Inc. on Jun. 12, 2001 and which is incorporated herein by reference. The spherical chip disclosed in U.S. Pat. No. 6,245,630 generally comprises a spherical shaped semiconductor integrated circuit ("ball") and a system and method for manufacturing the same. Thus, a "ball" shaped chip can replace the function of a flat, conventional chip.

The physical dimensions of the ball allow it to adapt to many different manufacturing processes which otherwise could not be used. Furthermore, the assembly and mounting of the ball may facilitate efficient use of the semiconductor as well as circuit board space. Thus, a physical neural network chip and/or synapse chip as disclosed herein can be configured as such a ball-type chip in addition to a rectangular or square shaped integrated circuit chip.

Based on the foregoing it can be appreciated that embodiments are generally directed toward a physical neural network synapse chip and also a method for forming such a synapse chip. The synapse chip disclosed herein with respect to one or more embodiments can be configured to include an input layer comprising a plurality of input electrodes and an output layer comprising a plurality of output electrodes, such that the output electrodes are located above or below the input electrodes. A gap is generally formed between the input layer and the output layer. A solution can then be provided which is prepared from a plurality of nanoconductors and a dielectric solvent.

The solution can be located within the gap, such that an electric field is applied across the gap from the input layer to the output layer to form nanoconnections of a physical neural network implemented by the synapse chip. Such a gap can thus be configured as an electrode gap. The input electrodes can be configured as an array of input electrodes, while the output electrodes can be configured as an array of output electrodes.

The nanoconductors can form nanoconnections at one or more intersections between the input electrodes and the output electrodes in accordance with an increase in strength of the electric field applied across the gap from the input layer to the output layer. Additionally, an insulating layer can be associated with the input layer, and another insulating layer associated with the output layer. The input layer can be formed from a plurality of parallel N-type semiconductors and the output layer formed from a plurality of parallel P-type semiconductors.

Similarly, the input layer can be formed from a plurality of parallel P-type semiconductors and the output layer formed from a plurality of parallel N-type semiconductors. Thus, the nanoconnections can be strengthened or weakened respectively according to an increase or a decrease in strength of the electric field. As an electric field is applied across the electrode gap, nanoconnections thus form between the electrodes.

The most important aspect of the electrode arrays described herein is their geometry. Generally, any pattern of electrodes in which almost every input electrode is connected to every output electrode, separated by a small gap, is a valid base for a connection network. What makes this particular arrangement better than other arrangements is that it is very space-efficient. By allowing the connection to form vertically, a third dimension can be utilized, consequently gaining enormous benefits in synapse density.

To understand just how space-efficient a Knowm™ chip utilizing connection formation in a third-dimension could be, consider the NET talk network created by Terry Sejnowski and Charles Rosenberg in the mid 1980's. NET talk took the text-representation of a word and could output the phonemic representation, thereby providing a text-to-speech translation. Such a network provided 203 inputs, 120 hidden neurons and 26 outputs, for a total of approximately 28 thousand synapses.

Utilizing electrode widths of approximately 200 nm and spacing between electrodes of approximately 400 nm, one could contain 28 thousand synapses on about 10160 $\mu m^2$. In comparison, a conventional synapse including all of the weight storage resistors and switches, I0-I4 current mirrors, multiplier and sign switching circuitry can take up, for example, approximately 106×113 $\mu m$ or 11978 $\mu m^2$. In other words, one could fit 28 thousand synapses in less than the area previously required to store only one synapse.

The benefits of creating a neural network processor are thus great. The ability to implement as many as 1 billion synapses on 1 $cm^2$ of surface substrate is a tremendous leap forward over prior art neural network technologies. Another innovation is the ability to mass-produce pre-trained, large-scale neural network chips. A physical neural network as disclosed herein does not have to be taught at all, but can instead be manufactured with the desired connections already in place. This is an important feature for consumer devices. For example, in most cellular telephones produced today, the ability to recognize rudimentary speech is available. One might, after pre-recording a voice, speak the word "Dave" and the cellular telephone can automatically call Dave after matching the word just spoken to a list of other pre-recorded names and thereafter pick the best match.

This is a rather rudimentary form of pattern recognition and could therefore be replaced by an exceedingly small Knowm™ synapse chip. For example, a Knowm™ chip can be taught at the factory to translate speech into text, thereby eliminating the need to pre-record ones voice for recognition tasks and instead relying on a more general speech recognition technique. Once the factory Knowm™ chip is trained, the synapse resistance values can be determined. With knowledge of what each synapse value needs to be, one can then design a perpendicular array chip so that the electrode widths create a cross-sectional area inversely proportional to the resistance of each synapse.

Figure 18:
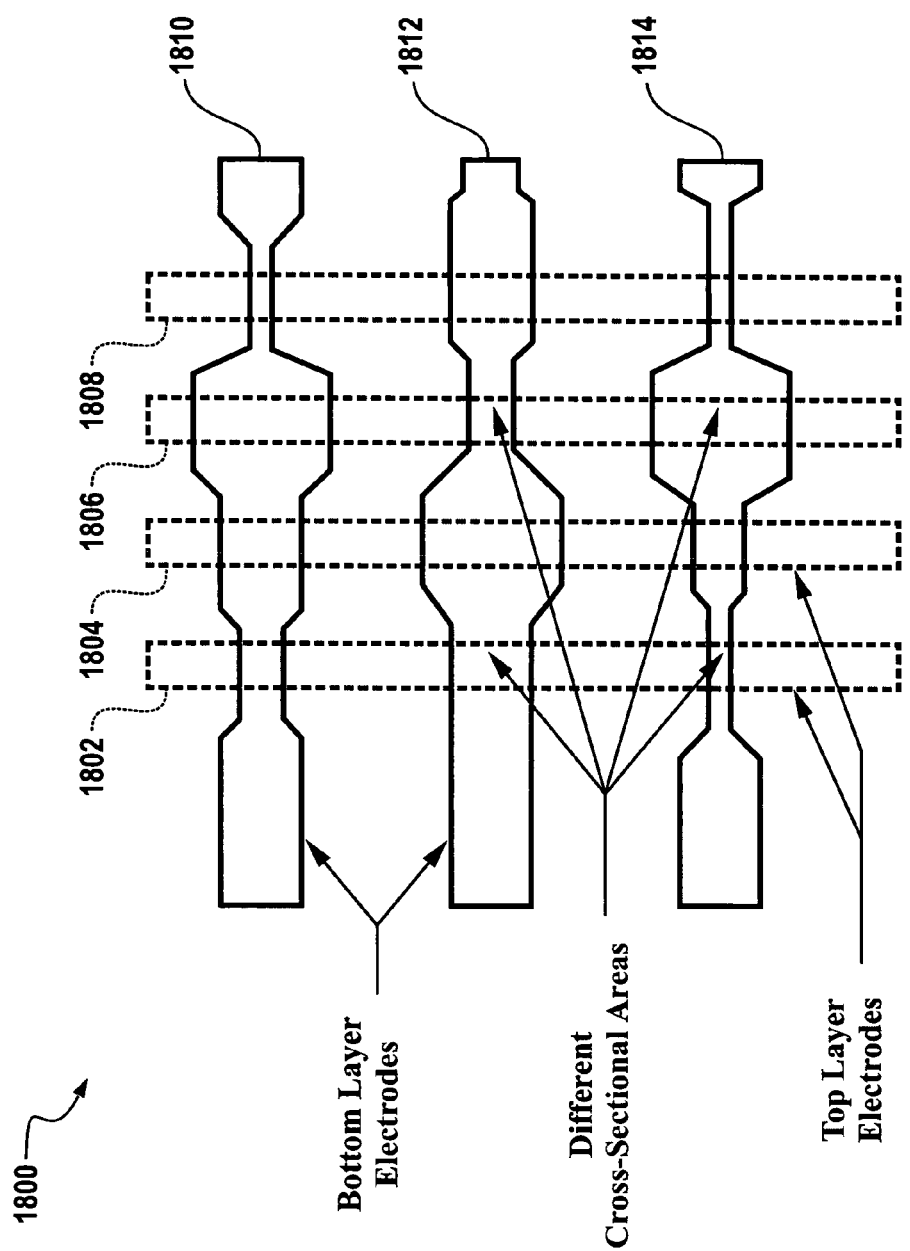
FIG. 18 illustrates a schematic diagram of electrode widths encoding specific synapses resistances, in accordance with an alternative embodiment of the present invention.

In other words, the resistance of each connection is generally a function of the cross-sectional area of the connection between electrodes. By pre-forming the electrodes to certain specified widths, and then allowing the maximum number of connections to form at each electrode intersection, a physical neural network can be mass-produced. Such a configuration can allow a very general network function (e.g., voice or facial recognition) to be produced and sold to consumers, without the necessity of forcing the consumer to train the network. FIG. 18 below illustrates this concept.

FIG. 18 illustrates a schematic diagram of a system 1800 of electrode widths encoding specific synapses resistances, in accordance with an alternative embodiment of the present invention. As indicated in FIG. 18, a plurality of bottom layer electrodes 1810, 1812, and 1814 having different cross sections are located below a plurality of top layer electrodes 1802, 1804, 1806 and 1808. After the physical neural network or synapse chip is assembled, the maximum number of connections can be formed at each synapse, which is equivalent to the desired resistance at each synapse. Of course, the function relating to the cross-section area of the electrodes and the corresponding resistance will differ from substance to substance and will most likely have to be determined experimentally.

A synapse or physical neural network chip could therefore be produced with certain ready-made abilities, such as voice or facial recognition. After installation, it is up to the designer to create a product that can then modify itself further and continue to adapt to the consumer. This could undoubtedly be an advantageous ability. Utilizing the example of the cellular telephone, the cellular telephone could in essence adapt its speech-recognition to the accent or manner of speech of the individual user. And all of this is possible because the Knowm™ synapses are so space-efficient. Networks with very powerful pattern recognition abilities could fit into a tiny fraction of a hand-held device, such as, for example, a wireless personal digital assistant and/or a cellular telephone.

The embodiments indicated herein are thus directed toward a physical neural network that can be configured from a connection or a plurality of connections of molecules or molecular conductors, such as nanoconductors, such as, for example, nanowires, nanotubes, and/or nanoparticles. Such physical neural network can be implemented in the form of one or more synapse chips that can be combined with a neuron system (e.g., a neuron chip) of independent summing circuits.

The fundamental concept of a Knowm™ network or system (e.g., a Knowm™ synapse chip) is remarkably simple. When particles in a dielectric solution are exposed to an electric field (i.e., AC or DC), the particles align with the field. As the particles align, the resistance between the respective electrodes decreases. The connection becomes stable once the electric field is removed. As the strength or frequency of the applied electric field is increased, the connections become increasingly aligned and the resistance further decreases. By applying a perpendicular electric field, one can also decrease the strength of the connections. Such connections can be utilized as "synapses" in a physical neural network chip (also referred to as a synapse chip), and the result is a Knowm™ chip—a fully adaptable, high-density neural network chip.

Although a multi-layer, feed-forward structure, has been addressed, recurrent, unsupervised neural networks can provide many advantages. An adaptive neuron, as a base for a larger Hebbian-based recurrent network utilizing Knowm™ synapses will be discussed. The basic theory behind adaptive networks will be presented; after which will be described the appropriate translation to an electrical system that utilizes Knowm™ synapses.

A Knowm™ synapse can be configured in a manner that is highly appropriate for an adaptive neural network, which can also be referred to as an adaptive integration network or simply, an adaptive network. As indicated earlier, adaptive neural networks to date have been limited to software designs and/or conventional hardware implementations. Adaptive neural networks have not been designed or implemented based on nanotechnology components, systems, and/or networks as discussed herein.

Figure 19:
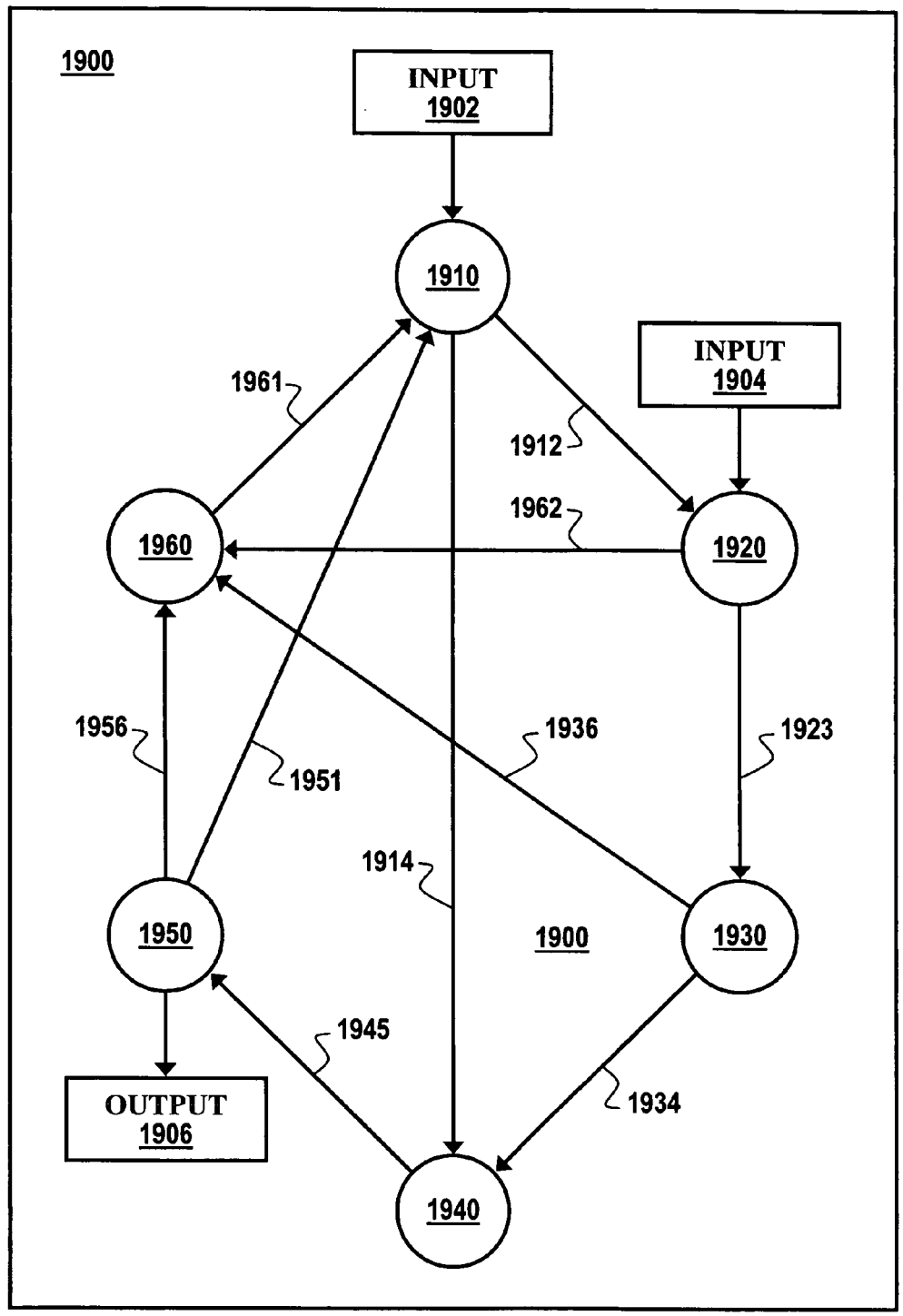
FIG. 19 illustrates a schematic diagram of one example of an adaptive integration network comprising six interconnected processing elements, in accordance with an alternative embodiment of the present invention.

FIG. 19 illustrates a schematic diagram of one example of an adaptive integration network 1900, comprising six interconnected processing elements, neurons 1910, 1920, 1930, 1940, 1950, and 1960. Although the adaptive integration network 1900 is illustrated as containing six neurons on a two-dimensional plane, it is to be understood that the present invention is not limited to the particular number of the neurons or to any particular network topology. In fact, implementations of an adaptive integration network may comprise hundreds, thousands, even millions of interconnected neurons. Neurons may be arranged in various physical and logical configurations, including but not limited to hexagonal, circular, rectangular, toroidal structures in one, two, three, or higher dimensions.

Such neurons can be implemented as a Knowm™ network or system. Each neuron 1910, 1920, 1930, 1940, 1950, and 1960 can be individually formed from standard photolithography or alternate procedures by building circuits capable of neuronal function, as will be later discussed. Alternatively, connections between neurons 1910, 1920, 1930, 1940, 1950, and 1960 may be formed as nanoconductor(s) suspended within a dielectric solvent or solution. An example of nanoconnections that may be implemented to neurons 1910, 1920, 1930, 1940, 1950, and 1960 is provided by nanoconnections 304 of FIG. 3.

A neuron combined with pre-synaptic electrodes can thus be the basic processing element of an adaptive integration network and can be (although not necessarily) configured to receive signals from its "pre-synaptic" neurons as input and, in response, transmit output signals to its "post-synaptic" neurons. A neuron has two output states, firing or non-firing. In one embodiment, binary output signal values of $x_i=1$ and $x_i=0$ are assigned for the firing and non-firing states, some embodiments may employ non-binary values for the output signal $x_i$, for example, within a range $0.0 \leq x_i \leq 1.0$.

As another example, the value of the output signal $x_i$ is 0.0 if the neuron is not firing, and greater than or equal to 1.0 if the neuron is firing as explained in more detail herein after. In the context of electronic circuitry, the output of the neuron would comprise a voltage. When a neuron fires, that neuron could potentially cause its post-synaptic neurons to fire, as more specifically explained herein after, which could cause their post-synaptic neurons to fire, and so on, setting up a chain reaction along an active pathway.

Any neuron in an adaptive integration network can be designated as a data input neuron or a data output neuron. A data input neuron is a neuron that receives a signal external to the adaptive integration network, and a data output neuron is a neuron whose output signal is transmitted to a destination external to the adaptive integration network. Accordingly, external signals input into data input neurons may initiate a chain reaction of neuron firings throughout the adaptive integration network. When the neuron firings eventually affect the state of the data output neurons, the output of the adaptive integration network will change in response.

In the example of FIG. 19, neurons 1910 and 1920 are data input neurons because neurons 1910 and 1920 receive external input signals 1902 and 1904, respectively. Neuron 1950 is a data output neuron because neuron 1950, when firing, produces an output signal 106. In this configuration, an asserted input signal 1902 eventually causes neuron 1910 to fire, which may then cause neuron 1940 and then neuron 1950 to fire, thereby producing the output signal 1906. Thus, the adaptive integration network 100 produces an output signal 1906 in response to an input signal 1902. In many implementations, it is convenient for data input neurons to only receive a single external signal and no internal signals as input.

In an adaptive neural network, a connection is the conduit along which a neuron receives a signal from another neuron. Connections can be formed between neurons in any direction to transmit a signal from an output of a pre-synaptic neuron to an input of a post-synaptic neuron. Typically, a neuron plays both roles, first as a post-synaptic neuron for receiving input signals from its pre-synaptic neurons, and second as a pre-synaptic neuron for generating output signals to its post-synaptic neurons.

For example, with continued reference to FIG. 19, pre-synaptic neuron 1910 is coupled to post-synaptic neuron 1940 by connection 1914, thus neuron 1910 is configured to transmit information to neuron 1940. In FIG. 19, neuron 1910 is also coupled to neuron 1920 by connection 1912; neuron 1920 is coupled to neuron 1930 by connection 1923; neuron 1930 is coupled to neuron 1940 by connection 1934 and to neuron 1960 by connection 1936; neuron 1940 is coupled to neuron 1950 by connection 1945; neuron 1950 is coupled to neuron 1910 by connection 1951 and to neuron 1960 by connection 1956; and neuron 1960 is coupled to neuron 1910 by connection 1961 and to neuron 1920 by connection 162.

Connections (e.g., nanoconnections) may be excitatory or inhibitory, through which transmitted signals respectively promote or retard the firing of the post-synaptic neuron in response. With continued reference to FIG. 19, excitatory a fully connected arrow represents connections, and inhibitory connections are illustrated with an offset, blocked arrow. For example, connections 1914, 1923, 1936, 1945, 1951, and 1962 are excitatory, and connections 1912, 1934, 1956, and 1961 are inhibitory.

Excitatory connections are used to transmit signals from one neuron to another in a feedback loop or other active pathway. Inhibitory connections, on the other hand, prevent neurons from firing and are useful in providing internal regulation among feedback loops, but cannot actually form a connection in a feedback loop. In the context of a physical neural network, the inhibitory connections may cause a momentary increase in the threshold voltage of the post-synaptic neuron, thereby inhibiting the activations of the neuron.

An adaptive integration network may be configured to include feedback loops. A loop is a closed circuit of linked excitatory connections arranged in the same circular direction. For example, adaptive integration network 1900 comprises two loops, a first loop with neurons 1910, 1940, and 1950 indicated with black excitatory connections 1914, 1945, and 1951, and a second loop with neurons 1920, 1930, and 1960 denoted with gray excitatory connections 1923, 1936, and 1962.

Loops are highly interactive with other loops. In general, a loop can be mutually reinforcing or mutually competitive with one or more other loops. The adaptive integration network 1900 depicted in FIG. 1 illustrates an example with two mutually competitive loops. If an input signal 1910 is applied causing neuron 1910 to fire in the first (black) loop, then a chain reaction is set up wherein neuron 1940 fires, then neuron 1950 fires, then neuron 1910 fires again, and so forth.

In addition, neurons 1910 and 1950 have inhibitory connections 1912 and 1956, respectively for suppressing firings of neurons 1920 and 1960, respectively, in the second (gray) loop. Thus, activation of the first (black) loop can force the deactivation of the second (gray) loop. Similarly, activating the second (gray) loop builds a circular chain of firings through neurons 1920, 1930, and 1960, while suppressing activity in neurons 1910 and 1940, via inhibitory connections 1961 and 1934, respectively.

Figure 20:
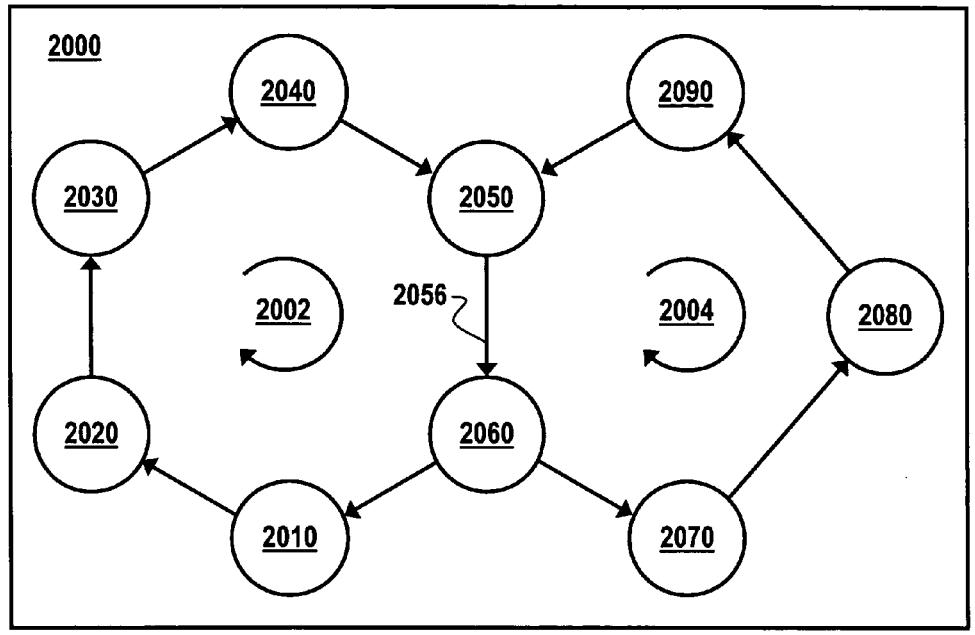
FIG. 20 illustrates a schematic diagram of an adaptive integration network with mutually interacting loops that share a connection, in accordance with one embodiment of the present invention.

Mutually interacting loops may be aggregated to form metaloops at a higher level of integration. For example, two mutually interacting loops may share one or more connections in common such that activity in one loop will affect the activity in the other loop. Referring to FIG. 20, a portion of an adaptive integration network 2000 is depicted with two mutually interacting loops 2002 and 2004.

Loop 2002 comprises six neurons 2010, 2020, 2030, 2040, 2050, and 2060 connected in sequence, and loop 2004 comprises five neurons 250, 2060, 2070, 2080, and 2090 connected in sequence. Both loop 2002 and 2004 share neurons 2050 and 2060, which are coupled by connection 2056. Activity on either loop influences activity on the other loop. For example, if neuron 2010 in loop 2002 fires, that firing eventually results in the firing of neuron 2060, which transmits a signal to neuron 2010 of loop 2002 and to neuron 2070 of loop 2004. Similarly, if neuron 2070 in loop 2004 fires, that firing eventually results in the firing of neuron 2060, which transmits a signal to neuron 2010 of loop 2002 and to neuron 2070 of loop 2004.

Figure 21:
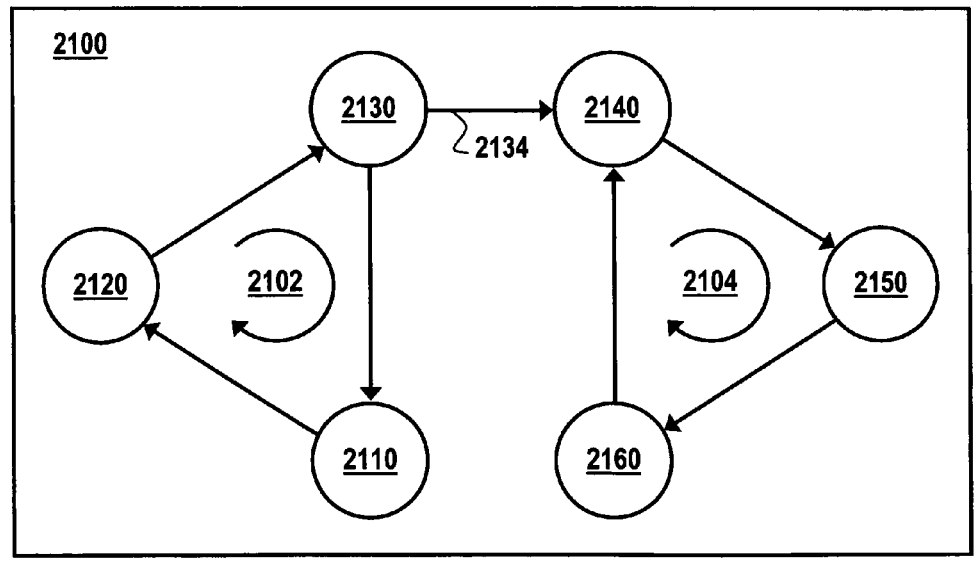
FIG. 21 illustrates a portion of an adaptive integration network with two loops in accordance with an embodiment.
Figure 22:
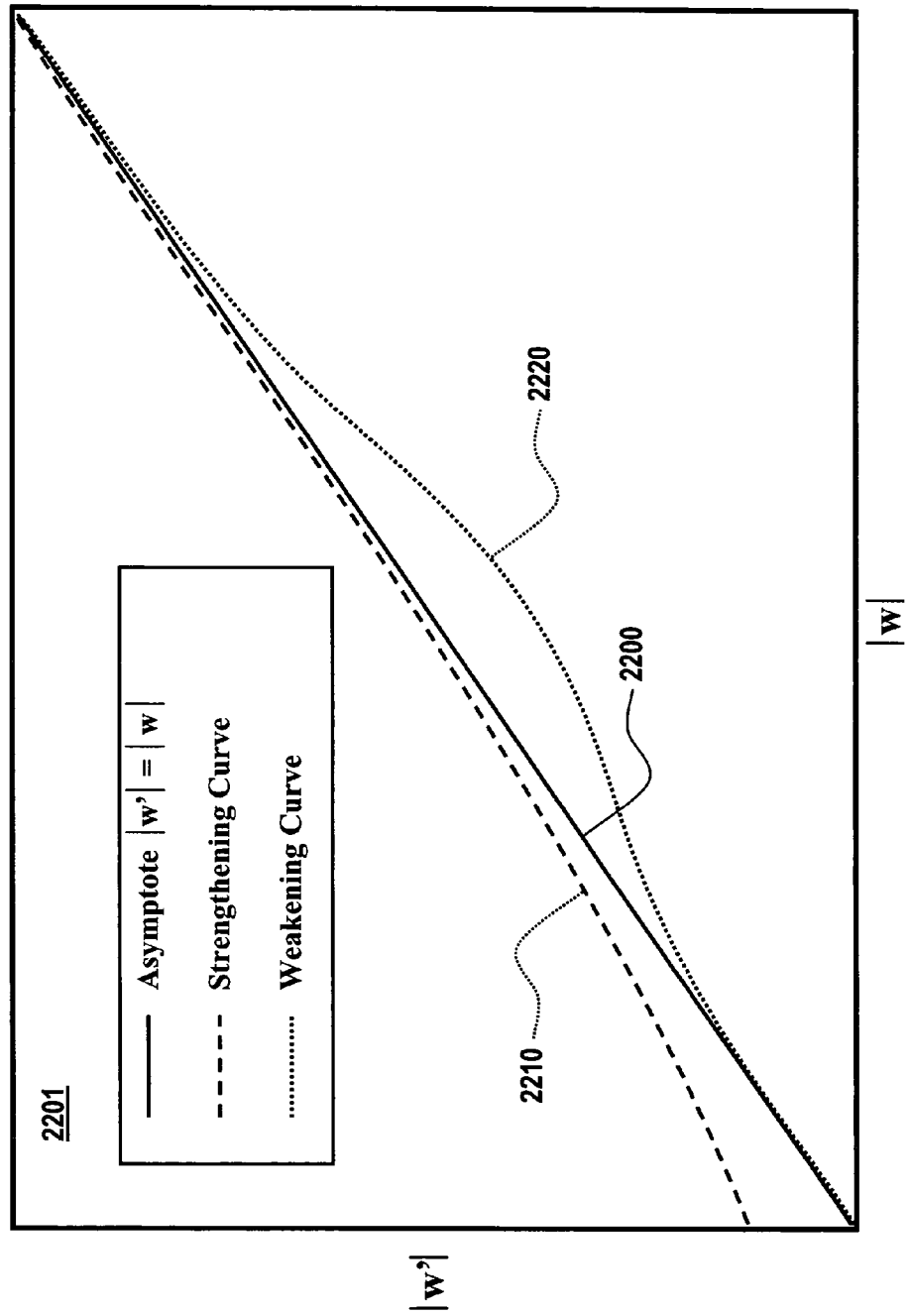
FIG. 22 illustrates a graph illustrating exemplary connection weight strengthening and connection weight weakening curves in accordance with one embodiment of the present invention.

As another example, one loop could branch off an active pathway to another loop, thereby initiating activity in the other loop. FIG. 21 illustrates a portion of an adaptive integration network 2100 with two loops 2102 and 2104. Loop 2102 comprises three neurons 2110, 2120, and 2130 connected in sequence, and loop 2104 comprises three neurons 2140, 2150, and 2160 connected in sequence. Furthermore, loop 2102 is connected to loop 2104 by a connection 2134 from neuron 2130 of loop 2102 to neuron 2140 of loop 2104. Activity in loop 2102, eventually results in the firing of neuron 2130, which sustains the activity of loop 2102 by transmitting an output signal to neuron 2110 of loop 2102 and initiates activity in loop 304 by transmitting the output signal via connection 2134 to neuron 340 of loop 2104.

Since an adaptive integration network provides much flexibility in configuration, it is to be understood that the present invention is not limited to any particular configuration of neurons and connections. Preferably, it is desirable to choose the number, distribution, and types of connections to maximize the total number of feedback loops while minimizing the functional constraints and interdependence of the loops. In general, this goal can be met by employing as many connections per node as feasible for a given implementation.

The distribution of connections can vary from implementation to implementation of an adaptive integration network.

For example, a maximum length can limit connections so that distant neurons are not directly connected, and the assignment of connections can be determined randomly or in accordance with an algorithm designed to give each neuron a similar physical or logical arrangement.

In an adaptive integration network, a neuron fires in response to firings of the neuron's pre-synaptic neurons under certain conditions. More specifically, each neuron has an associated excitation level $\epsilon$, which is responsive to the signals received from the neuron's pre-synaptic neurons. The neuron can fire when the neuron's excitation level $\epsilon$ is greater than or equal to the neuron's threshold value, $\theta$. In the context of a physical neural network, this is accomplished with an integrator circuit, as will be described.

Furthermore, each connection can be characterized by a corresponding synaptic efficiency in transferring its signal, represented by a connection weight $w_i$, where i indicates the $i_{th}$ connection for the neuron. In the context of a physical neural network, the synaptic efficiency is a direct result of the alignment of the nano-conductors between pre-synaptic and post-synaptic electrodes, and the alignment is in turn a result of heightened activation.

In a hardware implementation, when a pre-synaptic neuron fires a signal to its post-synaptic neurons, the firing neuron causes the excitation level $\epsilon$ of the post-synaptic neurons to change by a factor directly related to the properties of an integrator, as discussed previously. After firing, the neuron's excitation level $\epsilon$ is reset to a base level. In a hardware implementation, a refractory pulse generator, as discussed, can accomplish this previously. If the neuron does not fire, on the other hand, the integrator preserves the neuron's excitation level $\epsilon$, so that the excitation level $\epsilon$ may accumulate over time and the neuron may eventually fire. In one embodiment, however, the excitation level $\epsilon$ is subject to a decay process, for example, by multiplying the current excitation level by an attenuation parameter in the range $0.0 \leq \alpha \leq 1.0$. In a hardware implementation, this could be accomplished, for example, by storing charge from synaptic activations in a capacitor and allowing for a small leakage current that serves the function of the attenuation parameter.

In one embodiment, neurons may be subject to a refractory period in which the neuron's excitation level $\epsilon$ is forced to remain at the base level for a given period of time. During the refractory period, the activity of its pre-synaptic neurons does not affect the neuron's excitation level $\epsilon$. Consequently, the refractory period can serve to impose a limit on the maximum firing rate of the neuron. As previously discussed, the refractory pulse generator triggers the grounding of all post-synaptic electrodes, thereby playing a crucial role in network learning.

In a hardware implementation, the following sub-circuits that compose an individual neuron accomplish the refractory period. The inputs from synaptic activations are summed via an integrator, which allows the accumulation of signals over time. The integrated signal is passed to a threshold circuit, such as a comparator or operational amplifier that outputs a high or low voltage in response to the integrator signal being above a set threshold. This signal is passed to a circuit that allows a pulse of period "T" to be generated. The output pulse is the output of the neuron. This output is feed into a refractory pulse generator, which serves the purpose of grounding the post-synaptic electrodes in a Knowm synapse while the neuron is actively generating a pulse.

If the output pulse of the neuron was high, then the refractory pulse generator could comprise a NOT gate, for example. The grounding of the postsynaptic electrodes serves two purposed. First, the neuron is re-set to a zero level activation, as described earlier. Second, the lowered potential causes an increase in the electric field across all connection in a connection network currently activating the neuron. In other words, during the time of the refractory pulse, all the connections that are coming from firing neurons become stronger.

Training is generally the process of updating the nano-connections in an adaptive integration network so that the adaptive integration network produces desired outputs in response to inputs. In contrast with prior techniques involving artificial neural networks that employ distinct training and implementation phases, training the adaptive integration network is constantly occurring during the normal operation of the adaptive integration network and is a direct result of feedback within the network.

Prior to operation of the adaptive integration network, the connection weights within the adaptive integration network are initialized, for example, either randomly or to a preset value. During the operation of the adaptive integration network, the connection weights are constantly strengthened or weakened, provided that the connection weight strengthening or weakening conditions are met. Connection weight strengthening refers to the process of decreasing the resistance of the nano-connection. Connection weight strengthening occurs whenever any two connected neurons fire in close temporal proximity, with the post-synaptic neuron firing after the pre-synaptic neuron, during the post-synaptic neurons refractory pulse period.

Optionally in some adaptive network implementations, connection weight strengthening occurs every time a neuron fires, but the magnitude of the connection weight strengthening is a function of the amount of time since the pre-synaptic neuron of the connection has fired. This is a natural result of frequency dependence on connection formation in a Knowm synapse since connections contributing less to the over-all activation of a neuron will receive fewer "refractory" pulses and consequently see a decreased frequency of electric field across the pre and post-synaptic electrode terminals.

Connection weight strengthening allows for frequently used neuronal pathways to be reinforced. As one neuron fires, the neuron produces an output signal that may induce one or more of the neuron's post-synaptic neurons to fire in close temporal proximity, thereby strengthening the connection between the neurons. Similarly, the firing of the post-synaptic neuron may cause that neuron's post-synaptic neuron to fire, creating a chain reaction of firing neurons along an active pathway. Since a connection weight increases when both the pre-synaptic and the post-synaptic neurons fire in close temporal proximity, each time the active neural pathway is used, the connection weights along the active pathway are increased.

A loop is a special case of a frequently used active pathway, because, once initiated, the neurons in the loop successively fire in cycles around the loop. Each time the neurons fire, their connections are strengthened, yielding a stable loop circuit. Consequently, the connection weight strengthening rules foster stable circuits of self-reinforcing loops, which can constitute stored memory of patterns and other information Connection weight weakening generally refers to the process of decreasing the strength of the connection. In an adaptive network, connection weight weakening occurs after a specified period of passivity for the connection. A connection is considered "passive" for particular point in time if the post-synaptic neuron and the pre-synaptic neuron of the connection have not fired in close temporal proximity in that period of time. Thus, the connection weights for passive connections progressively weaken, reducing the influence of those passive connections in the adaptive integration network. In a physical Knowm implementation, a decrease in synapse activations results in a lower frequency of applied electric field and thus a decrease in connection formation. As discuss previously, The connection formation could be constantly degraded by a perpendicular electric field or even from a dissolution process within the solution.

Larger connection weights are slowly decreased, thereby allowing for strong connections to remain more or less fixed, slow to decay even after prolonged passivity. This effect is naturally achieved in a knowm network by a decrease in the local electric filed around a strong nano-connection, thereby weakening effects from perpendicular electric fields. Alternatively, a strong nano-connection results in higher van-der-wall attractions and a corresponding heightened resistance to dissolution within the dielectric medium. In an adaptive integration network, connection weights are constantly being adjusted during normal operation, for example, strengthened when two connected neurons fire in close temporal proximity or weakened after a period of passivity. Therefore, even mere use of the adaptive integration network causes the adaptive integration network to be fine-tuned.

Figure 23:
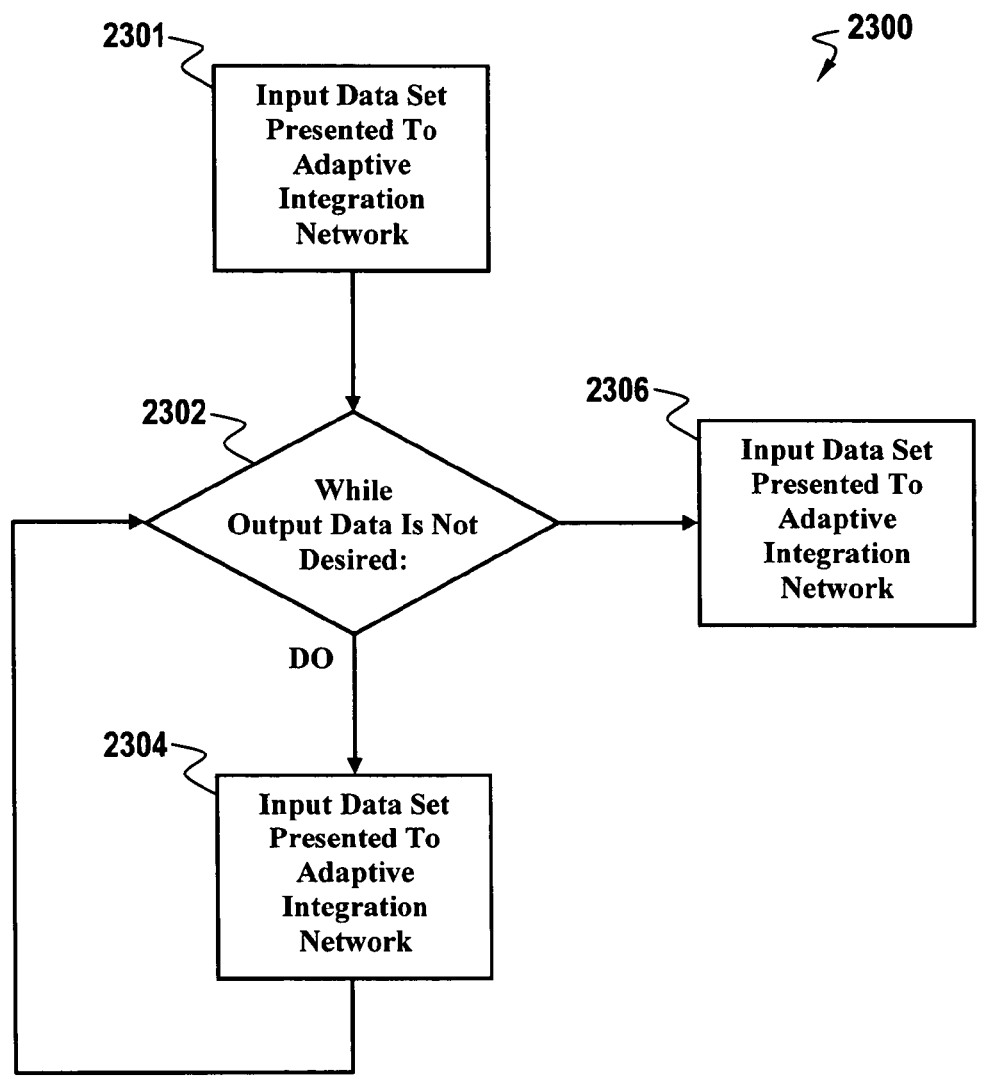
FIG. 23 illustrates a flowchart illustrating the operation of adaptive learning in accordance with one embodiment of the present invention.

In certain cases, however, it is desirable to cause the adaptive integration network to learn and adapt to new patterns and information. FIG. 23 illustrates a flowchart 2300 illustrating the operation of adaptive learning in accordance with one embodiment of the present invention. As illustrated in FIG. 23, adaptive learning can be fostered by presenting input data to the adaptive integration network, as indicated at block 2301. The input data causes neuron firings, leading to output data from output data neurons as the result.

As indicated at decision block 2302, a loop can be controlled long as the output data does not match the desired output. The network activity of the adaptive integration network can be increased, as depicted at block 2304, which causes the output data to change. When the desired data is produced, the network activity is restored to a normal level, as described at block 2306. Various techniques may be employed to increase network activity, i. e. the rate of neural firings, including threshold lowering and neural output signal magnification.

Network activity can be increased by lowering the thresholds of the neurons in the adaptive integration network. For example, the thresholds could be reduced by a fixed amount or proportion, such as to one half. Threshold lowering causes neurons to fire sooner, because the excitation level $\epsilon$ only needs to reach a lower threshold level. Consequently, firing rate of neurons in the adaptive integration network is increased and, hence, the network activities of the adaptive integration network.

Yet another technique for increasing network activity is to increase the magnitude of the neural signals. Each time a neuron fires, the excitation level $\epsilon$ of the post-synaptic neurons are increased by a much larger amount because the neural output signal $x_i$ is larger. Consequently, the threshold level of the neuron is reached much more rapidly, increasing the firing rate of neurons in the adaptive integration network and, hence, the network activity. This can be accomplished by increasing the supply voltage of the neuron circuitry while keeping the threshold voltage constant.

Increasing network activity enables for new active pathways to be explored. For example, a neuron that is adjacent to an active pathway, but not part of the active pathway, might not ordinarily fire because it has low connection strength for a connection to a neuron on the active pathway. In this case, the excitation level $\epsilon$ of the neuron does not sufficiently accumulate to the ordinary threshold level to fire, for example, due to a more rapid attenuation of the excitation level $\epsilon$ or to competing inhibitory inputs. A lowered threshold, however, may be low enough or the excitation level $\epsilon$ may accumulate rapidly enough to induce that neuron to fire, enabling a new active pathway to be branched off the main active pathway.

Increasing network activity can also cause an active pathway for one stable circuit to transform into an active pathway for another stable circuit. A stable circuit, which constitutes stored memory, information, or patterns within the adaptive integration network, represents a locally optimal position in the solution space (all possible outputs for all possible input). As a result, increasing network activity permits adaptive exploration through the solution space in search of other locally optimal positions for the new input/output data sets. Another result of increasing network activity is that the response time of the adaptive integration network is reduced, making the adaptive integration network faster.

Figure 24:
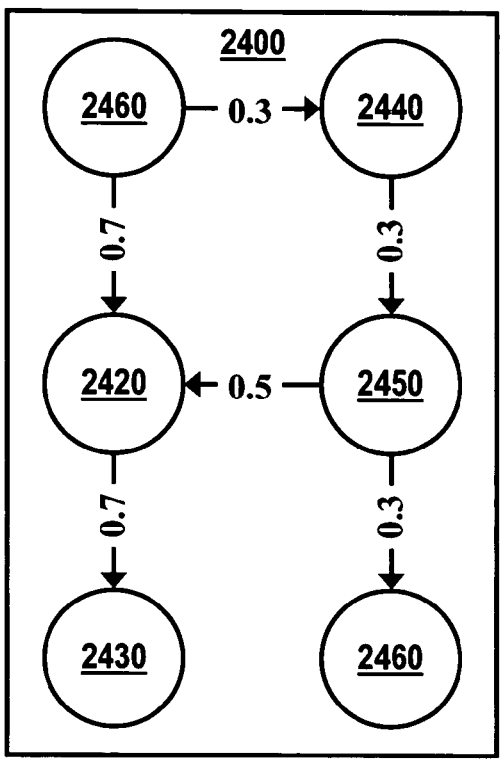
FIGS. 24 and 25 illustrates before and after schematic drawings of an exemplary adaptive integration network for illustrating how an active pathway is dislodged in accordance with one embodiment of the present invention.
Figure 25:
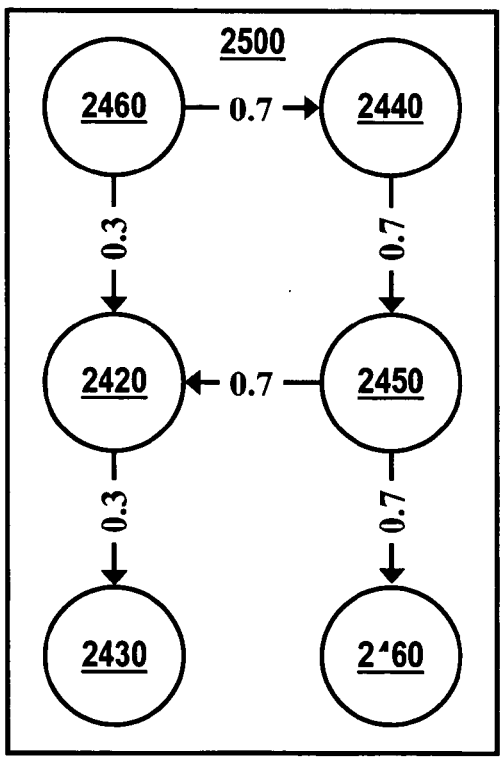

FIGS. 24 and 25 illustrate how increasing network activity can dismantle an active pathway. Note that in FIGS. 24 and 25, like or analogous parts are indicated by identical reference numerals. Thus, In FIG. 24, a system 2400 includes an active pathway comprising neurons 2410, 2420, and 2430 with high connection weights of 0.7. The pathway that includes neurons 2440, 2450, and 2460 with low connection weights of 0.3, on the other hand, is inactive. Furthermore, the low connection weight of 0.3 for the connection between neuron 2410 of the active pathway and neuron 2440 means that neuron 2440 rarely fires, because the connection weight is too low to cause the excitation level $\epsilon_{2440}$ of neuron 2440 to sufficiently increase to reach the ordinary threshold level.

When network activity is increased, for example by lowering the threshold, the accumulated excitation level $\epsilon_{2440}$ is now high enough with respect to the lowered threshold to cause neuron 2440 to fire in response to a firing of neuron 2410. When neuron 2440 fires, an output signal is transmitted to the neuron 2450, which also fires with the increased network activity. The firing of neuron 2450 induces neuron 2460 to fire and therefore strengthen their connection.

Neuron 2450, moreover, is the source of an inhibitory connection to neuron 2420 of the active pathway, which prevents neuron 2420 from firing so often. As both neuron 2450 and neuron 2420 fire, the inhibitory connection between the two neurons is strengthened, further preventing neuron 2420 from firing so often. Eventually, the passivity of neuron 2420 causes the connection between neuron 2410 and 2420 to weaken, completing the dislodging of the active pathway.

FIG. 25 illustrates the result of dislodging the active pathway, in which the new active pathway comprises neurons 2410, 2440, 2450, and 2460. FIG. 25 thus illustrates a system 2500 in which neurons 2420 and 2430 were formerly part of an active pathway, but are no longer, because their connection weights have been weakened. Adaptive learning can be initiated in response to an external signal from a user when the output is wrong, which is analogous to a biological pain signal. This external signal causes the network activity to be increased, for example, by lowering the threshold levels of the neurons. The increased network activity causes the input signals to be deflected or rerouted onto new active pathways and loops, thereby exploring new stable circuits.

These new pathways and loops will eventually affect the data output neurons and alter the output values. If the output values are still undesired, then the increase in the network activity is maintained, causing the new pathways and loops to be ephemeral and generating even newer active pathways and loops. As soon as the desired output is attained, the user can discontinue the network activity increasing signal, causing the relevant network parameters (thresholds, etc.) to rebound to their ordinary levels and ceasing the adaptive training. This process can be automated if the desired output is presented before hand so that the output of the adaptive integration network can be compared by computer with the desired output to generate the external signal.

In contrast with retraining methods for conventional artificial neural networks, including both software and hardware implementations thereof, adaptive learning with adaptive integration networks is less disruptive, particularly when implemented via nanotechnology devices and techniques, such as discussed herein. For example, with conventional artificial neural networks every neuron is perturbed during training, but with adaptive integration networks only the neurons along active pathways and their neighbors are affected.

Thus, only relevant connections are adjusted, and previously established but unrelated loops and meta-loops are left intact, which hold previously learned classifications and information. Therefore, in further contrast with conventional artificial neural networks, a nanotechnology-based adaptive integration network can learn new information and patterns at any time without having to relearn previously learned material or going through a new training stage.

Figure 26:
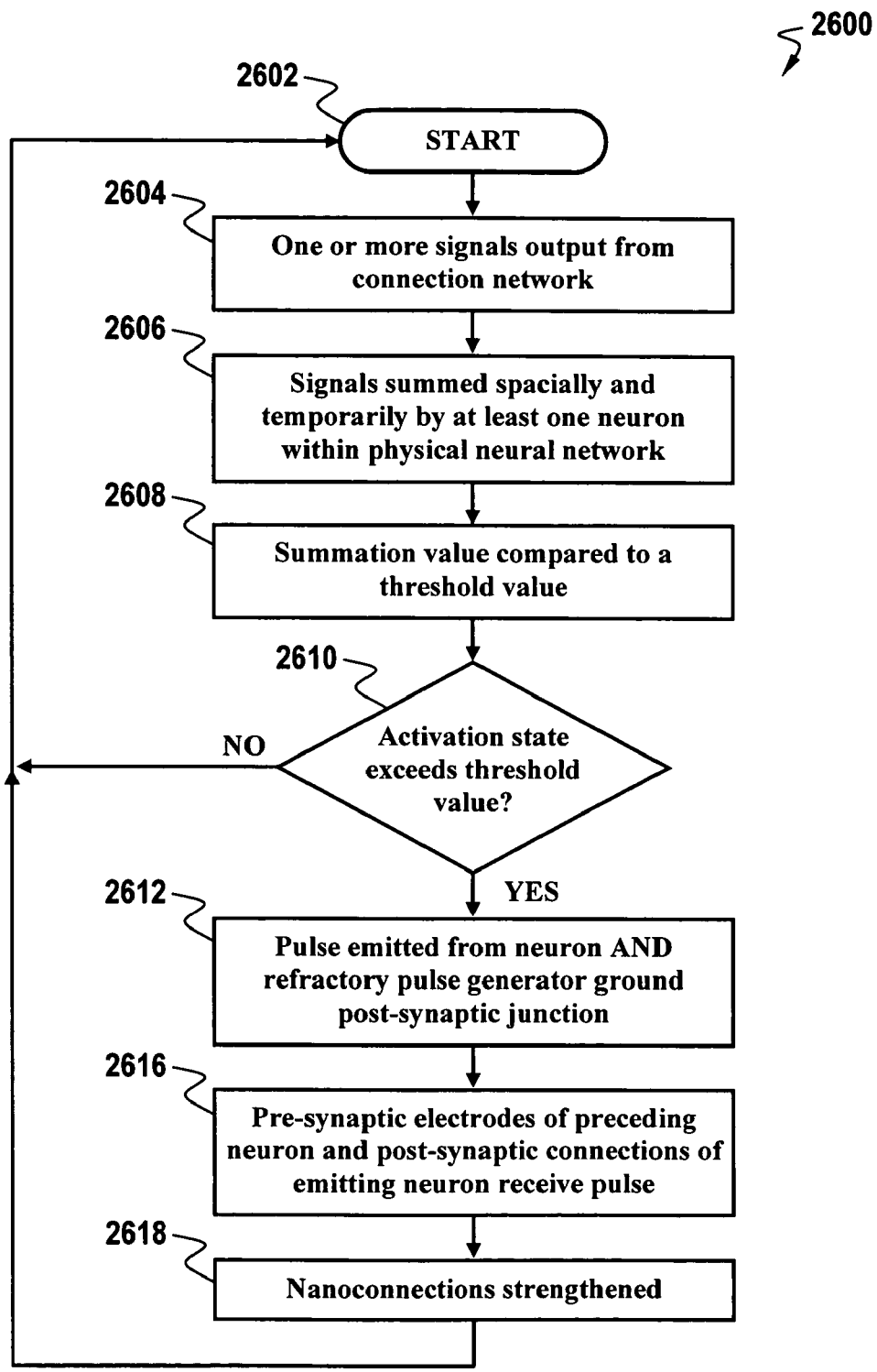
FIG. 26 illustrates a flow chart of operations depicting logical operational steps for modifying a synapse of a physical neural network, in accordance with an alternative embodiment of the present invention.

FIG. 26 illustrates a flow chart 2600 of operations depicting logical operational steps for modifying a synapse of a physical neural network, in accordance with an alternative embodiment of the present invention. According to the operations generally illustrated in flow chart 2600 of FIG. 26, a Knowm™ synapse can be modified based on a neuron refractory period. The process is generally initiated, as indicated at block 2602. As depicted at block 2604, one or more signals can be output from a connection network formed for example, from nanoconnections, such as nanoconnections 304 of FIG. 3.

Such signals may be generated in the form of a voltage or a current, depending upon a desired implementation. For illustrative purposes only, it can be assumed that such signals comprise voltage signals. As indicated next at block 2606, these signals provided by the connection network can be summed by at least one neuron within the physical neural network and then, as illustrated at block 2608, compared to a threshold value. The threshold voltage can be an externally applied and modifiable voltage.

If, as indicated at block 2610, the current state of activation does not exceed the threshold value or threshold voltage, the process simply terminates, as indicated at block 2611. If, however, the current state of activation does exceed the threshold value or threshold voltage, then the process continues, as indicated at block 2612, and a pulse (e.g., a voltage pulse or current pulse) is emitted from a neuron within the physical neural network. During this pulse, a "refractory pulse generator" grounds the postsynaptic junction thereof.

This operation in turn can cause the synapses receiving pre-synaptic activation to experience an increase in the local electric field. The pre-synaptic electrodes of succeeding neurons and post-synaptic connections of the pulse emitting neuron thus receive a pulse, as indicated at block 2615. Thus, synapses that contribute to the activation of the neuron can receive an increase in the local electric field parallel to the connection direction and can also experience a higher frequency of activation, two parameters that increase the strength nanoconnections thereof, as indicated at block 2618, and thus the strength of the Knowm™ synapse.

Figure 27:
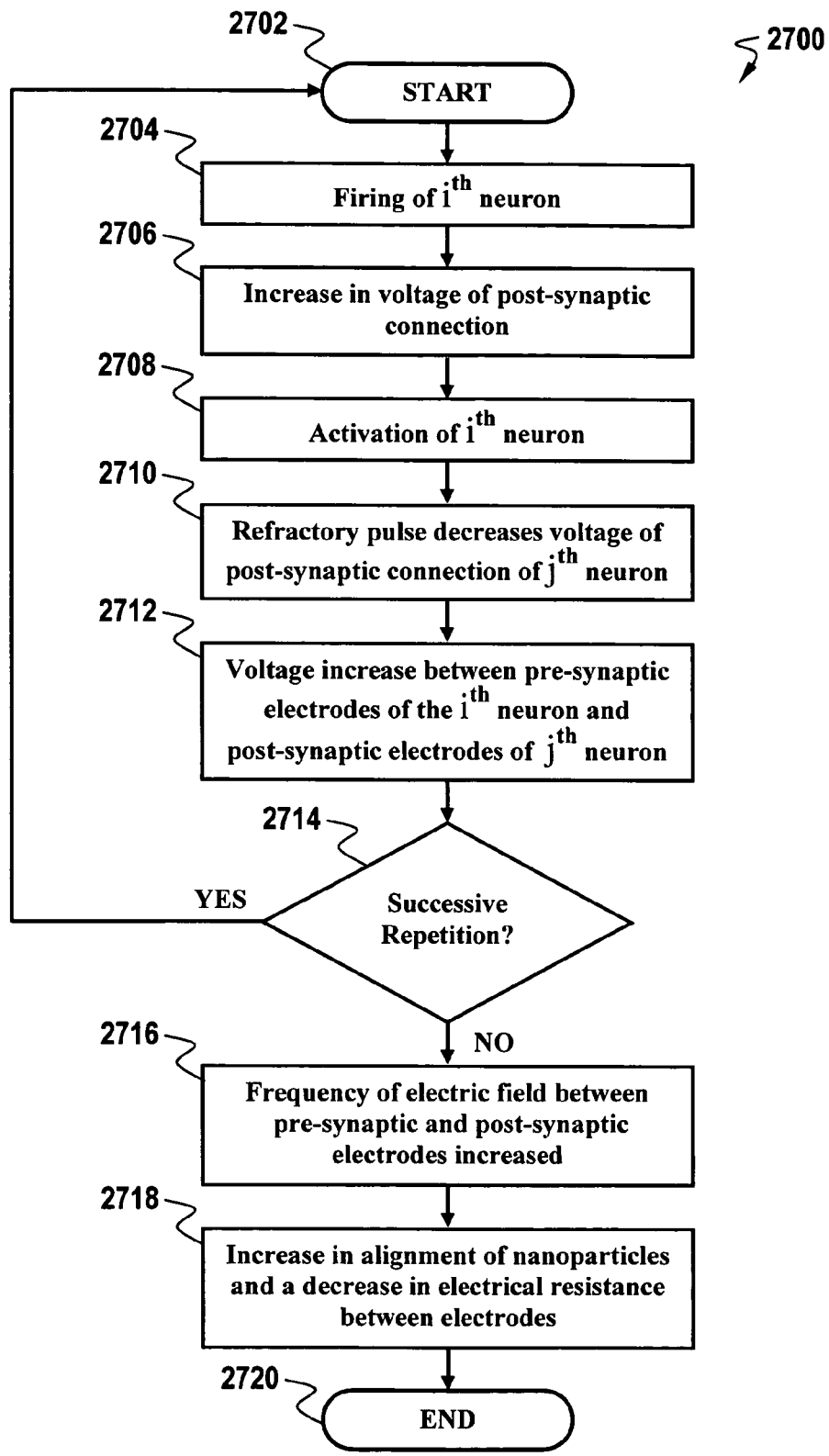
FIG. 27 illustrates a flow chart of operations illustrating logical operational steps for strengthening one or more nanoconnections of a connection network of a physical neural network by an increase in frequency, in accordance with an alternative embodiment of the present invention.

FIG. 27 illustrates a flow chart 2700 of operations illustrating logical operational steps for strengthening one or more nanoconnections of a connection network of a physical neural network by an increase in frequency, in accordance with an alternative embodiment of the present invention. Flow chart 2700 of FIG. 27 generally illustrates a process for strengthening nanoconnections (e.g., nanconnections 304 of FIG. 3) of a physical neural network based on the close temporal proximity between two or more connected firing neurons. The process can be initiated, as indicated at block 2702, in which an initial (e.g., $i_{th}$) neuron is fired.

For illustrative purposes only, it can be assumed that the first neuron is fired. The firing of the first neuron causes an increase in the voltage of a pre-synaptic connection (e.g., a pre-synaptic electrode), as indicated at block 2708, and the an activation of a subsequent or second neuron, as illustrated at bock 2708, which in turn causes a refractory pulse to decrease the voltage of the post-synaptic connection (e.g., a post-synaptic electrode), as illustrated at block 2710. These operations in turn can generally result in an increased voltage between pre-synaptic electrodes and post-synaptic electrodes thereof, as depicted at block 2712. As indicated at block 2712, the processes illustrated beginning at block 2704 can be repeated for subsequent electrodes.

The result of the operations described at blocks 2704 to 2712 occurring many times in succession can produce, as illustrated at block 2716, an increased frequency of the electric field between the pre-synaptic and post-synaptic electrodes, thereby causing, as depicted at block 2718, an increase in the alignment of nanoparticles (e.g., nanotubes, nanowires, etc.) and a decrease in the electrical resistance between electrodes thereof. The process can then terminate, as indicated at block 2720

One remarkably useful property of a Knowm™ synapse, which renders such a device very appropriate for an adaptive neural network, is that the frequency or magnitude of the electric field determines the connection strength. Thus, the connections that become frequently "activated" become stronger. The question of frequency dependence on synapse formation is actually a question of frequency dependence on alignment and connection formation, and can be viewed from at least two different perspectives.

Before further discussion, it will be helpful to make clear some terminology that will aid in the descriptions of the device. In the following descriptions, an adaptive network is built from one base neuron circuit. Each neuron circuit is fundamentally the same, and the network is build by connecting the base neuron circuits together to form certain topologies that result in desired properties, such as maximizing internal feed-back and memory retention. Thus, a complete description can almost be made by describing in detail the function and circuitry of an individual neuron circuit, and then studying how large numbers of the same base neuron will interact with each other. When the term "Neuron" is used, it refers to the electrical analog of a biological neuron, not a biological neuron. This includes summation properties, in time and space, and output properties (e.g., the ability to generate a relatively low-impedance output signal).

Biologically, each neuron can receive signals from other neurons at its post-synaptic terminals. Likewise, in a Knowm™ physical neural network, each neuron can receive signals form it post-synaptic electrodes. Biologically, a neuron transfers signals to other neurons via its pre-synaptic terminals. Likewise, a Knowm™ physical neural network transfers signals via its pre-synaptic electrodes.

The connections between the pre-synaptic electrodes of one neuron and the post-synaptic electrodes of another neuron are formed via nano-connections, and these connections can be seen as independent from either neuron. In other words, the connections do not belong to either neuron, but aid in the transfer of signals form one neuron to another. For example, when one says "positive activation of a pre-synaptic electrode", one is simply saying that the pre-synaptic electrode is raised to a positive voltage. With these clarifications, we can now proceed.

An adaptive network based on nanotechnology fabrication techniques can be based on, for example, the use of gold nanowires. Gold nanowires are not considered a limiting feature of the present invention, but are described herein for general illustrative and edification purposes only and also to indicate one possible embodiment of the present invention. Gold particles of gold ranging in a diameter of approximately 15 nm to 30 nm can be placed between electrodes deposited on a surface. When an alternating voltage is applied to the electrodes, thin metallic fibers begin to grow on the electrode edge facing the gap.

The fibers can grow in the direction of the other electrode until the gap is bridged, with the wires remaining in contact after the electric field is removed. The nanowire growth is caused by particle aggregation at the tip of the fibers, thereby extending them toward the opposite electrode. The tip of the growing nanowire creates local electric fields of high intensity and gradient, giving rise to a dielectrophoretic force, which causes the aggregation.

Thus, a first perspective of synapse connection can be seen as a bridge-building process, occurring from one electrode to the other. This process can also be implemented utilizing carbon nanoparticles, such as carbon nanotubes and/or carbon nanowires. Because of their exceedingly small size, carbon nanotubes present a promising possibility because nanotubes have been found to form connections between electrodes. As the frequency increases from 0 Hz to 10's or even 100's of Megahertz, the standard deviation of angles of nanotubes from the electric field decreases. Thus, instead of a bridge-building process, universal alignment of all nanotubes can be implemented.

The nanotubes and/or nanowires and/or other molecular conductors (e.g., molecules), however, may join end to end to bridge a gap, because many carbon nanotubes may overlap between two or more electrodes to form long ropes. With this in mind, the space between two electrodes can be viewed as a multiplicity of bridges between electrodes (conduits), each separated by a characteristic distance that is a result of the local disturbed electric field around each "bridge". Likewise, many conduits can bundle together to form a rope, bridging the electrodes.

By configuring nanotechnology-based neural circuitry, as described herein, which activates the connections required to be strengthened more frequently, while leaving the connections that need to be weakened inactivated, an adaptive network can be directly emulated utilizing artificial synapses that can both compute and store weight values. All that is required for such a network is a special type of neuron, modeled very much like that of a biological neuron. Each neuron can contain a number of separate functions. By connecting enough neurons into a topology that allows internal feedback, a modifiable network can be constructed which learns though an adaptive feedback process called adaptive integration learning.

As will be discussed later, these neurons can be constructed in conjunction with Knowm synapses to form highly interconnected networks, which use very little space on a VLSI chip. As one will see, such synapses lead themselves to a vertical stacking of planar chips, creating very high-density neural networks. The primary feature of an adaptive network is that of Hebbian learning. If the pre-synaptic neuron fires in close temporal proximity to the post-synaptic neuron, then the connections between the two (i.e., the synapse) can be strengthened. Similarly, if a synapse remains inactive for a long duration, then that connection can be gradually weakened.

Although this mechanism is by no means proven biologically, it provides a possible mechanism of how a cell can strengthen connections in a Hebbian manner, and can be considered the basis for an artificial neuron, which in turn can be used to build an adaptive network. In any case, some mechanism must be in place within a neuron so that its post-synaptic junctions know when they have contributed to neural activation. In an adaptive network utilizing Knowm™ synapses, for example, neurons that achieve a higher rate of activation can produce a higher-frequency (and magnitude) electrical field across their synaptic connections, thereby strengthening such connections. As one can see, the property of Knowm™ synapse strengthening in proportion to an increase in the frequency of an electric field is seminal to the incorporation of a Knowm™ device or component into an adaptive network.

Although the connection modification process is the result of an overall applied frequency, it can also be seen as a very small incremental change for every activation of the synapse. An activation of a synapse can be seen as an activation of a pre-synaptic neuron at the same time as the activation of the post-synaptic neuron. This results in an increase in the electric field, and although the connection strengthening process only works with applied frequencies, it can be regarded as an incremental change for every activation to aid in understanding the behavior of the circuit since it is very difficult to picture anything more than small time intervals when dealing with large networks operating at high frequencies and summing signals in a temporal manner over thousands of synaptic inputs.

Signals comprising a voltage from a connection network can be summed by a neuron, in a spatial and temporal manner, and compared to the threshold voltage. One should note that although the voltage from the connection network is shown forming a voltage divider with $R_b$, which then in turn is summed by the neurons summing circuits, any circuit that accomplishes the same take may be used. For example, an amplifying stage may be added, or the integrating function may become part of the temporal summing circuit. The components described herein are meant to outline basic parts for circuit operation, but are not intended to limit the scope and type of circuit embodiments and implementations thereof.

Evaluating an individual adaptive neuron, if the current state of activation exceeds the threshold voltage, then a pulse may be emitted. During this pulse, the RPG, "refractory pulse generator" grounds the post-synaptic electrodes. This causes the synapses receiving pre-synaptic activation to experience an increase in the local electric field. For example, suppose a pre-synaptic neuron just fired, and caused the firing of the neuron. This means that the pre-synaptic electrode, which itself is connected to the pre-synaptic neuron which just fired, is now on the positive swing of the output pulse.

The neuron, once fired, can output the same pulse, but the RPG will turn it into a negative-going pulse at its post-synaptic electrode. Because the firing of the pre-synaptic neuron precedes that of the post-synaptic neuron, the respective synapse can see (i.e., experience) an alternating electric field. Thus, synapses that contribute to the activation of the neuron can receive both an increase in the local electric field parallel to the connection direction and, when applied many times over, can also experience a higher frequency of activation, two parameters that increase the strength of a Knowm™ synapse. For reasons that will become clear later, the neuron is allowed to source current only on the positive portion of the pulse and sink current on the negative portion of the pulse, where as the neuron cannot source or sink current if it is not activated (i.e., producing a pulse).

One important point to understand before we continue is that each neuron operates in a completely asynchronous mode. This results in every neuron being completely independent from the rest of the network, and consequently massively parallel networks can be built that rely on the emergent behavior of all the interconnected, independent neurons. General properties of the neurons in the network, such as threshold, refractory period and habituation, may be controlled externally via an external CPU. Such external inputs may affect how the network computes, but are not a source of computation in and of themselves.

Before a neuron can act on information coming from its post-synaptic activations, the signals must all be summed. This summation can be performed with, for example, a resistor, $R_b$, acting as a voltage divider. Summation can alternatively be accomplished with an operational amplifier circuit, which has the added benefit that parameters can be manipulated remotely. A summation circuit can lead to the ability to easily form inhibitory connections and even control the activity of excitatory and inhibitory connections by adjusting the gain of the excitatory and/or inhibitory amplifiers. In a physical chip structure, the area taken (on the chip) for the implementation of a summation circuit, or the use of a one or more large resistor such as $R_b$, can be a deciding factor in what type of circuit is utilized. Many summations circuits exist, and it is anticipated that a circuit that offers both external control and low component count will be most desirable.

One of the most important features of an adaptive Knowm™ neuron is an integrator. The integrator can sum the signals in time, so that a signal received from one synapse in one instant can be added to a signal from another synapse a short time later. The integrator one uses in an adaptive neuron has a large influence on the behavior of the network. A good analogy is to consider a barrel with a small hole in the bottom, and a trigger that opens a large valve at the bottom of the barrel when the level of incoming water reaches a certain point or threshold. Thus, we can picture pulses of water filling the barrel, from various sources, and a constant leakage of water out of the barrel due to the small hole. If the rate of water into the barrel is greater than the leakage due to the hole, the water level will rise until it hits a point where the valve is triggered and the water is rapidly flushed from the barrel.

In this analogy, the integrator can be seen as the barrel (which stores inputs from past time periods) and the leakage hole, which serves to keep the integrator from accumulating water and firing over long lengths of time when little activation is present. Both of these parameters can be adjusted. The integrator can be built in a number of different ways, and it is the intent of this patent to cover all possible cases, with no preference toward any particular circuit. It is anticipated, for example, that the capacitance of the post-synaptic electrodes could be used as a stage in the construction of an integrator.

Some integrating circuits have been found to be more stable than others. The exact details of the integration circuit are not important for the description of the device described herein, in accordance with one possible embodiment of the present invention, because it is the intent of such an embodiment to cover generally all possible integrator circuits. It is believed that the type of integrator utilized can have a large effect on the performance of a network. Bi-stable integrators can result in much more robust integrators than previous models. Thus, the bi-stable property can be emulated in the electronic circuitry of the integrator and incorporated into an adaptive neuron.

The next important sub-system of an adaptive neuron is a threshold circuit. This can be accomplished via a number of ways, but a comparator (i.e. Op-amp) provides the simplest example. If the output from the integrator circuit reaches a voltage equal or greater than a threshold voltage, the threshold circuit outputs a signal, which we will assume to be high but could also be low. The threshold circuit, in combination with the integrator and summation circuit, performs the temporal and spatial summations necessary for an adaptive neuron.

The next sub circuit is the pulse-generator. Because Knowm™ networks respond to applied frequencies of electrical fields, it is necessary to encode outputs via pulses. This idea fits nicely with the biological analogy where signals are transmitted as a series of action potentials traveling through axons and dendrites. The input to the pulse generator is the output from the threshold circuit. The output from the pulse generator is, as can be expected, a pulse. The width of the pulse can be determined by the designer of the circuit, or controlled externally.

For reasons that will become clear in the context of an adaptive network, the output of the RPG can be a high (+Vcc) pulse followed immediately by a low (−Vcc or ground) pulse if the neuron output pulse is a low pulse (−Vcc or ground) followed by a high (+Vcc) pulse. Likewise, the output of the RPG can be a low pulse (−Vcc or ground) followed by a high (+Vcc) pulse if the neuron output pulse is a high (+Vcc) pulse followed immediately by a low (−Vcc or ground) pulse.

The output of the adaptive neuron, as far as any post-synaptic neurons are concerned, is generally (although not necessarily) that of the pulse generator, with one small caveat. To implement the form of Hebbian learning via a refractory pulse, as mentioned previously, the adaptive neuron should be allowed to strengthen those post-synaptic synapses that are activated while the neuron is also activated. In other words, pre-synaptic neuron firings that are highly correlated with post-synaptic neuron firings should be strengthened. To accomplish this, a refractory pulse generator can be introduced. The refractory pulse generator takes a positive input (+Vcc from the pulse generator output) and produces a negative (−Vcc or ground) pulse at the post-synaptic electrodes. Following the negative pulse, the refractory pulse generator creates a positive (+Vcc) pulse, which can serve to positively activate the post-synaptic connections immediately after the negative activation.

Alternately, the refractory pulse generator can produce a positive pulse followed by a negative pulse. If the output of the pulse generator is a positive pulse followed by a negative pulse, then the output of the refractory pulse generator can be a negative pulse followed by a positive pulse. The width of this positive pulse can be adjusted, but it can be assumed to be the same as the negative pulse to aid in the description. One can also think of the refractory pulse generator as an inverter of the pulse generator, the output of which projects to the post-synaptic electrode.

Connected to the pulse generator and refractory pulse generator and neuron output are two important sub-circuits, a Selective Current Sink and a Selective Current Source, which serve an important, although not immediately obvious purpose. When the pulse generator outputs a positive pulse, the Selective Current Source allows the neuron to source current. When the refractory pulse is negative, the selective current sink allows the neuron to sink current. If no pulse is present, i.e., the pulse generator is outputting zero, then the current sink and current source does not sink or source current, but leaves the pre-synaptic electrodes floating.

The importance of the Selective Current Sink will become clear when one considers the group behavior of many neurons in a perpendicular array structure, all highly interconnected. Such restrictions on adaptive neurons can restrict current flow to predominantly the pre-to-post synaptic electrode direction, which can also keep unwanted current flows and voltage drops occurring from activated post-synaptic electrodes to inactivated post-synaptic electrodes and also from activated pre-synaptic electrodes to inactivated pre-synaptic electrodes.

In biological neural networks, habituation of the individual neurons plays a large role in global network function. As such, it can be appreciated that such an electrical analog could provide useful computational properties. Biologically, a neuron needs to consume chemical resources to provide the energy to fire. When the resources run low, and the by-products overwhelm the cell, the neurons firing rate begins to slow down. Likewise, when the neuron has not fired for awhile, the chemical resources needed for energy production begin to stockpile, which causes them to fire at heightened frequencies in comparison to neurons that have fired more frequently and not built up chemical reserves. The electrical analog could be provided in many ways, such as making the threshold of the neuron a function of the neurons past firing history. This can be accomplished with digital and/or analog circuitry, as long as the synaptic electrodes receive the proper pulse.

On a superficial level, it ca be appreciated how such a Hebbian learning circuit generally functions. When pre-synaptic neurons activate the adaptive neuron, the refractory pulse generator grounds (i.e., or lowers to −Vcc) all of the post-synaptic electrodes, which can cause an increased electrical field across all connections with high pre-synaptic electrodes. Immediately after the negative activation, the refractory pulse generator positively activates the post-synaptic electrodes. Those pre-synaptic neurons just activated can sink a current for a brief time, because of the selective current sink at their output. Thus, the connections participating in the activation of the neuron will see a full-wave alternating electrical field of increased magnitude. When this process is repeated, selective connections (i.e., those with a temporal correlation in firing) will generally experience an increase in the strength and frequency of the electric filed, and consequently become stronger.

Synaptic connections that activate just before a neuron's activation becomes stronger can experience an increased alternating electric field parallel to connection direction. Additionally, synapses that fire after the neuron activates become weaker (via columbic repulsion), and connections that could result in more efficient signal transduction synapses that fire and do not activate the neuron become slightly stronger (i.e., experience a half-magnitude alternating electrical field). This last form of connection modification provides a form of connection exploration within the circuit. Without a form of non-Hebbian connection formation, potentially useful connections would never form. In other words, for Hebbian learning to take place, the connections should already exist. Hebbian learning only "picks out" those connections that turn out to be useful, and destroys those that cause undesired outputs.

The pulse emitted from the neuron can also take on a variety of other forms, such as, for example, a sinusoidal pulse, triangular pulse, etc. A general concept of how the electric fields at a synapse functions can be obtained if one assumes that the frequencies of pre- and post-synaptic activations are not the same, and considers the beat-frequencies of the input and output wave-forms present at the input and output electrodes. In this case, the gradient of the voltages at the pre- and post-synaptic electrodes can be approximately equivalent to the electric field. Although the connections themselves play an important role in the local electric field, it can be assumed that the cross-sectional area of the pre- and post-synaptic electrodes is large compared to the size of nano-connections, so that this problem is minimized.

Figure 28:
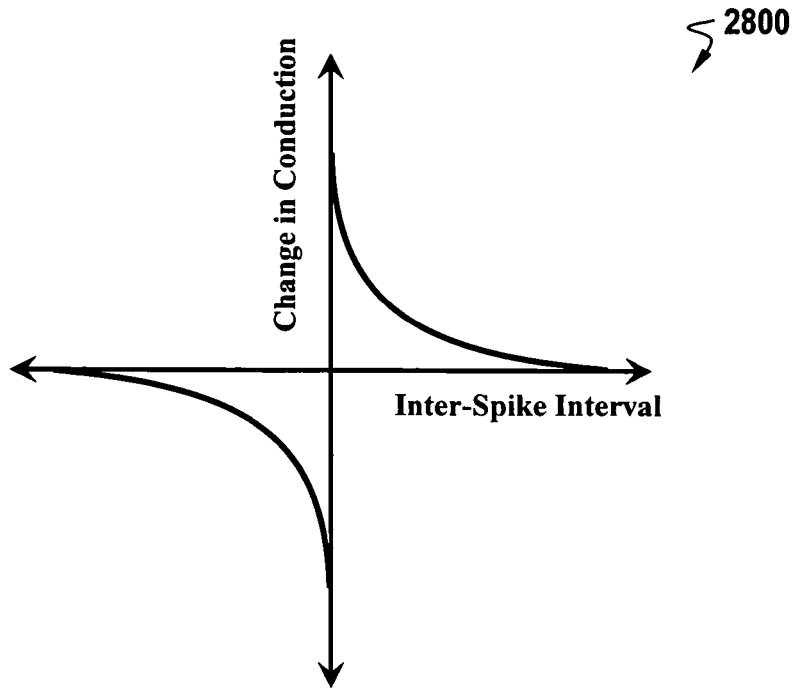
FIGS. 28 and 29 illustrate respective graphs of varying Spike-Time Dependent Plasticity (STPD) models.
Figure 29:
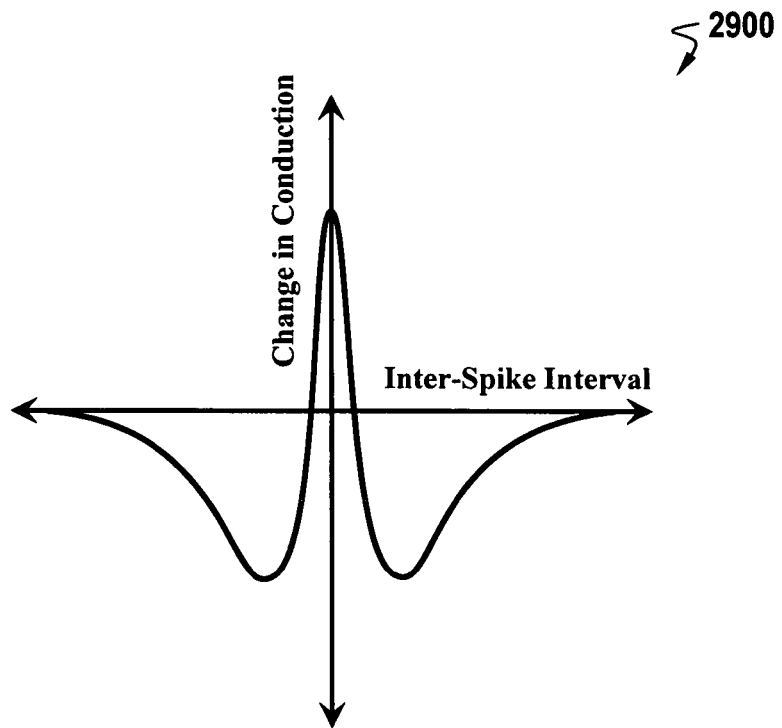

As indicated in the background section of this disclosure, researchers, researchers in the neuro-biological fields have been challenged with a need to develop a computationally efficient algorithm that can emulate a biologically realistic neural network. Specifically, researchers have attempted to develop a method, which would allow the efficient calculation of Spike-Timing Dependent-Plasticity (STDP), while also permitting fully interconnected networks. In STDP, timing between pre- and post-synaptic events can cause a net potentiation (LTP) or a net depression (LTD) of synapses. FIGS. 28 and 29 illustrate respective graphs 2800 and 2900 of varying STDP models.

Many biological studies have found a relationship between "T", the inter-spike interval and $\Delta g/g$, the fractional change in conductance in the synapses, which would indicate LTP or LTD. FIG. 28 illustrates a graph 2800 indicative of this relationship. Graph 2800 indicates that if the pre-synaptic pulse arrives after the post-synaptic pulse, the synapses can be depressed (weakened) in an exponential manner. If the post-synaptic pulse arrives after the pre-synaptic pulse, then the synapse will potentiate, again with an exponential dependence on "T". Other biologically realistic models have predicted a dependence such as that provided in graph 2900 of FIG. 29. Thus, graph 2900 is symmetrical and strikingly different from that of graph 2800 of FIG. 28.

Figure 30:
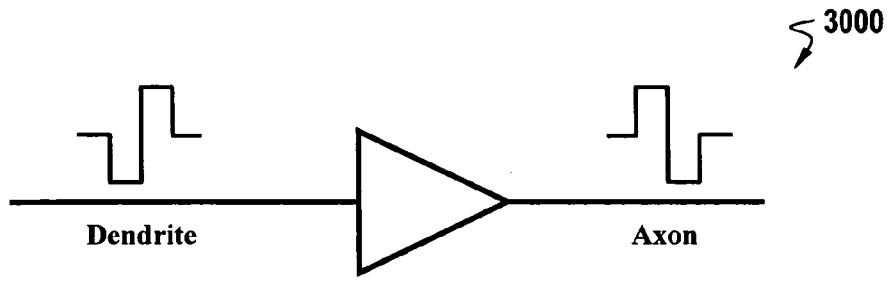
FIG. 30 illustrates a high-level block diagram of a neuron, including a dendrite and axon thereof, which can be implemented in accordance with an embodiment of the present invention.

To achieve a computationally efficient STDP algorithm, every neuron outputs a characteristic pulse via its axon, after attaining a threshold value. Simultaneously, the neuron can emit a characteristic pulse via its dendrites. FIG. 30 illustrates a schematic diagram of a neuron 3000, including a dendritic pulse and an axonal pulse thereof. Such pulses accomplish two goals. First, the axonal pulses can cause the excitation or inhibition of other neurons. Second, interactions between dendritic and axonal pulses can determine updates to synapses. Each neuron can be designated as either excitatory or inhibitory, and the pulses can be designed so that the interaction of a dendritic pulse and an axonal pulse results in either potentiation or depression on the synapse, depending on the timing between the pulses.

Figure 31:
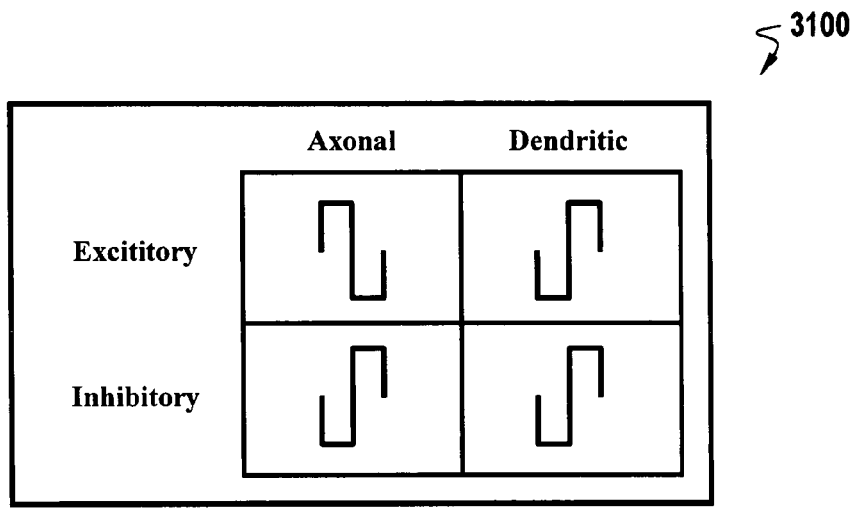
FIG. 31 illustrates a block diagram of an excitatory axonal pulse and an excitatory dendritic pulse, which can be implemented in accordance with an embodiment of the present invention.

An update to the synapse can be a function of the pre- and post-synaptic pulses. In general, the following rule can be applied: $\omega_{t+1} = \omega_t - (\text{pre})(\text{post})$, where (pre)(post) represents the product of the pre- and post-synaptic activation, as provided by a pulse. Consider the pulses 3100 depicted in FIG. 31. Two types of pulses are illustrated in FIG. 31, including an excitatory axonal pulse and an excitatory dendritic pulse.

Figure 32:
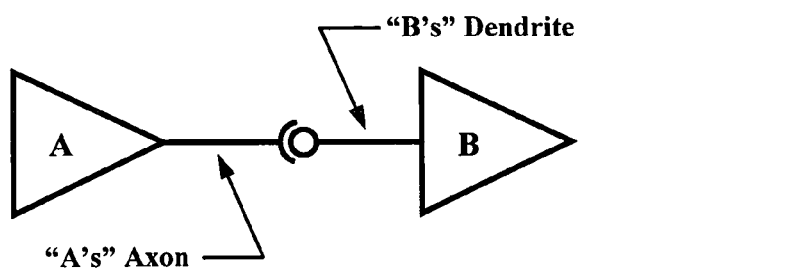
FIG. 32 illustrates a high-level diagram of two neurons, which can be implemented in accordance with an embodiment of the present invention.
Figure 33:
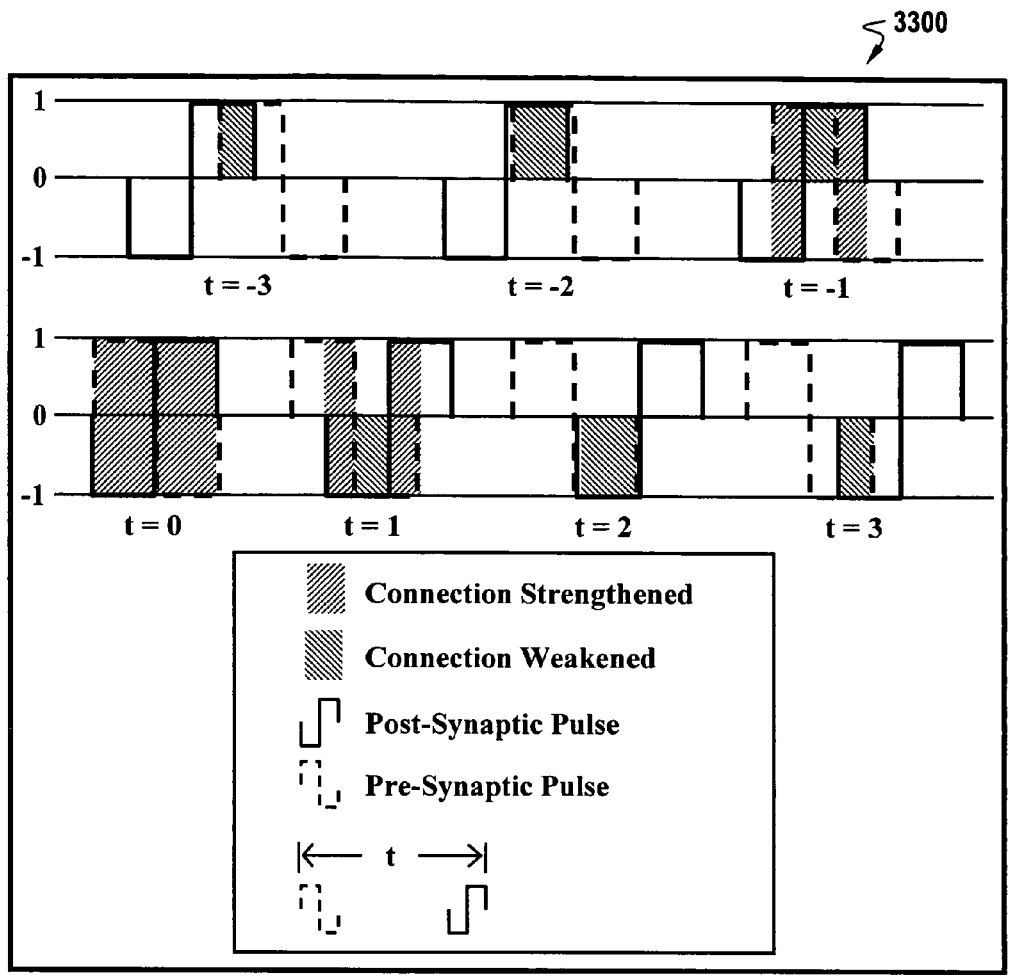
FIG. 33 illustrates a series of pulses, which can be implemented in accordance with an embodiment of the present invention.

Also, consider the configuration of FIG. 32, which illustrates a schematic diagram of two neurons 3200, identified as neuron "A" and neuron "B". Neuron "A" can emit a pulse down its axon, and neuron "B", when activated, can emit a pulse up its dendrite. When neurons "A" and "B" initiate pulses after activation, such as, for example, pulses depicted in FIG. 31, a configuration of pulses, such as pulses 3300 depicted in FIG. 33, can be achieved. In FIG. 33, T is generally a measure between the post-synaptic pulse (dendritic pulse) initiation and the pre-synaptic pulse (axonal pulse). Note that in FIG. 33, the dashed lines generally represent a post-synaptic pulse (dendritic pulse), while the solid lines generally represent the pre-synaptic pulse (axonal pulse).

Figure 34:
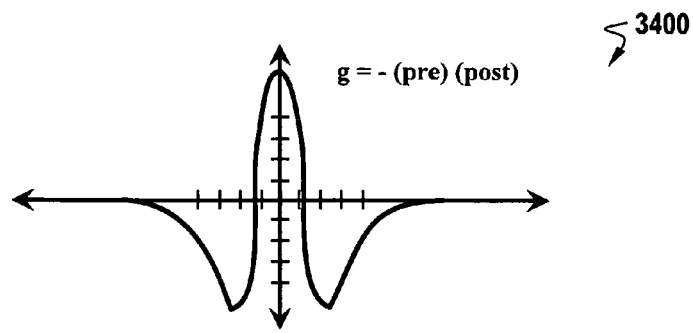
FIG. 34 illustrates a graph, which can be generated in accordance with an embodiment of the present invention.
Figure 35:
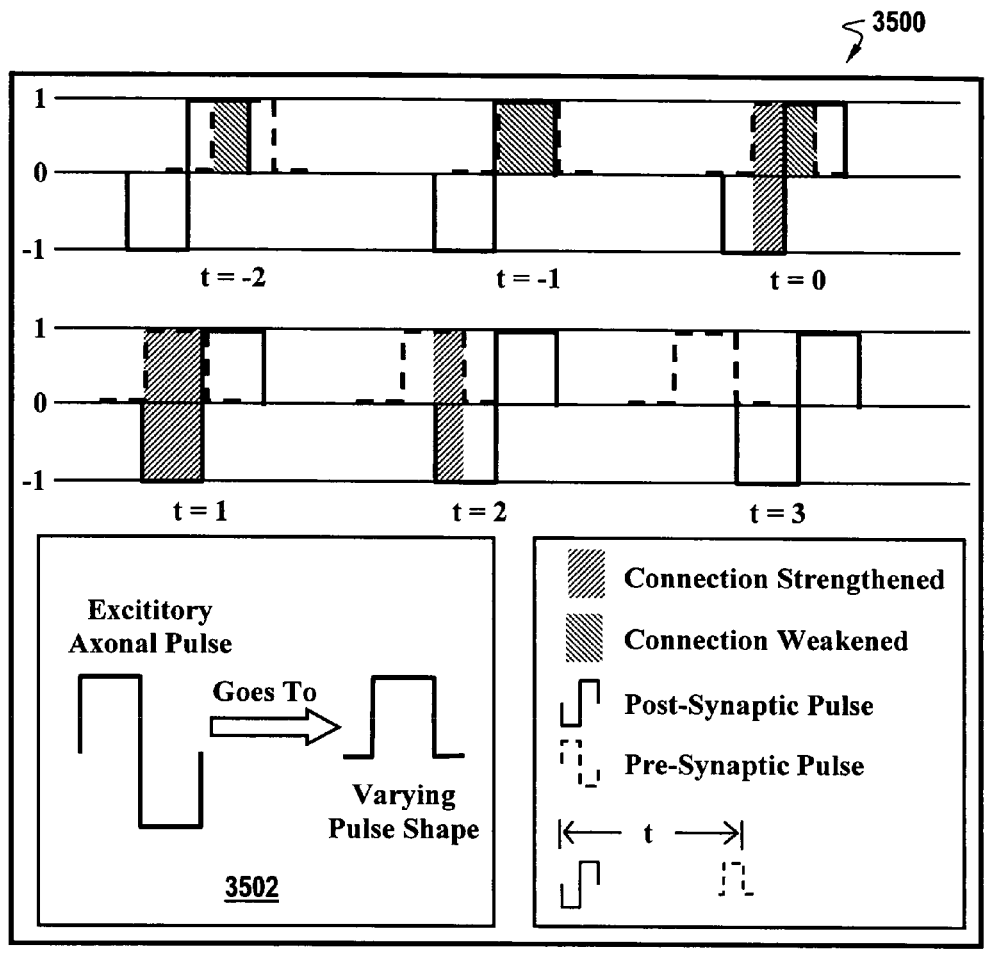
FIG. 35 illustrates alternative pulses which can be implemented in accordance with an embodiment of the present invention.
Figure 36:
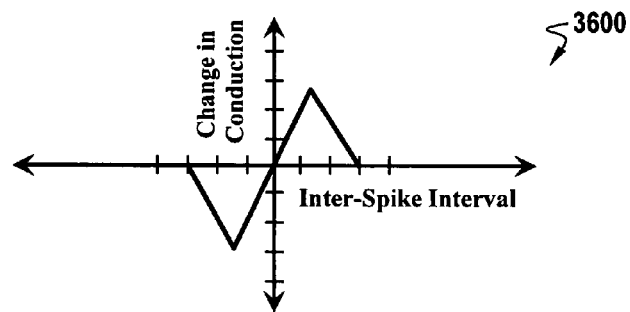
FIG. 36 illustrates a graph, which can be generated in accordance with an embodiment of the present invention.

A similar but varying format can be followed in FIG. 35. If an update is provided at every time-step, and there are at least four time steps available per pulse, such a measurement is generally illustrated in graph 3400 of FIG. 34, which is a good fit to realistic biological models incorporating bio-chemical processes. FIG. 35 illustrates a system 3500 representing an alternative set of pulses, including post-synaptic and pre-synaptic pulses, which are shown to the right of block 3502. As indicated at block 3502 of system 3500, other learning rules can be obtained by modifying the dendritic or axonal pulses. When the pulses 3502 are plotted, a graph 3600 as indicated in FIG. 36 can be generated as an approximation of another learning rule.

Thus, by varying the pulse shapes, many different learning rules can be implemented. By changing the pulse patterns, post synaptic, pre-synaptic or both, different learning rules can be obtained. For example, by using skewed gaussian pulses in place of square pulses in the previous example, one can obtain an exponential dependence on "T", instead of a linear. The examples provided herein with respect to the use of pulse generation and pulse shapes are merely examples of embodiments in which the present invention can be implemented are not considered limiting features of the present invention.

Figure 37:
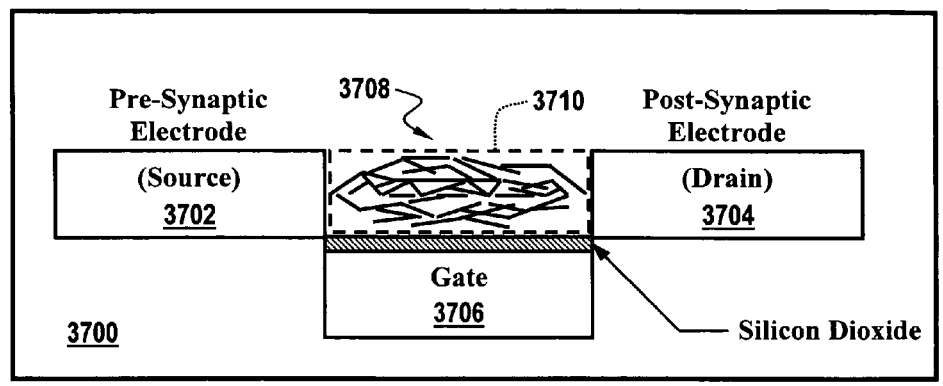
FIG. 37 illustrates a high-level block diagram illustrating a system comprising a network of nanoconnections formed between one or more respective input and output electrodes, in accordance with an alternative embodiment of the present invention.

FIG. 37 illustrates a high-level block diagram illustrating a system 3700 comprising a network of nanoconnections 3708 formed between one or more respective input and output electrodes 3702 and 3704, in accordance with an alternative embodiment of the present invention. Nanoconnections 3708 are located within a connection gap 3710, which is illustrated generally by a dashed line in FIG. 37. Nanoconnections 3708 generally are formed as a plurality of interconnected nanoconnections. As indicated earlier, connection gap 3710 can be filled with a solvent or solution (e.g., a liquid, gel, etc).

An individual nanoconnection may constitute a nanoconductor such as, for example, a nanowire(s), a nanotube(s), nanoparticles(s), or any other molecular structures (e.g., molecules). Nanoconnections 3708 can also be constituted as a plurality of interconnected nanotubes and/or a plurality of interconnected nanowires. Similarly, nanoconnections 3708 can be formed from a plurality of interconnected nanoparticles (i.e. molecules).

A major problem with emulating a biologically realistic neural network models, with pulse-coded outputs and modifiable synapses, concerns the extremely computationally expensive nature of the calculations. Whereas every synapse in a biological network can modify itself individually according to simple rules such as STDP, any calculation must take into account the state of the entire system, in essence storing the state in memory and constantly updating it. Because of the largely serial nature of both modern computers and memory, this task can be extremely inefficient, resulting in simulations that take many hours, days, or even weeks to achieve only a few seconds of simulated "real time". In addition to the difficulties involved in simulation activities, knowledge of the general structure of biologically realistic networks is also limited.

Although synaptic plasticity rules may create a network that can learn and adapt to its environment, a major step in creating a truly useful network is determining a general structure that allows plasticity to further "tune" the circuit. Such a general structure is, for example, coded in the genome of every living organism. The more simple the organism, the more "hard-wired" the network. It is anticipated that many useful networks will be developed for relatively simple tasks that are currently being accomplished with lower-level organisms such as insects, reptiles and birds.

Evolution has determined general connection patterns over hundreds of millions of years, and encoded this in DNA.

Unfortunately, it is not a simple matter of analyzing DNA to determining a general connection pattern. Nor can a brain be efficiently dissected to determine the connection patterns, simply because the fundamental synaptic plasticity rules may differ slightly, and with a different learning rule comes different connection patterns. In designing a pulsed network with modifiable connections, it is very important to allow every possible connection, but it is not desirable that every connection be "on". For example, the human brain possesses about 100 billion neurons, but each neuron is connected to only 10,000 others.

Knowing which connections should not be connected is a problem that only evolution can solve. This would require the initialization of certain synapses (i.e., turning some synapse on, while leaving the majority of the others off) and then testing the network by subjecting it to stimulus characteristic to the environment in which it will be used. If the network performs the job well, those particular connections can be recorded, and then production may begin only for those connections that are allowed to form. It is very likely, however, that the synapses that are initialized on the first trial will not be adequate. If not, some connections must be turned "on," "off," or some combination thereof, perhaps in a random manner that mimics evolution, or perhaps in a systematic manner.

The new pattern of connections must be subjected to its environment, and evaluated as to its ability to perform the desired task. It can be appreciated that a standard computer processor cannot achieve the speed necessary to simulate every generation, because many generations will most likely need to be evaluated, and every generation must have a chance to adapt to its environment via STDP rules. The time required to evaluate one generation via standard computation methods would most likely take many weeks.

In essence, it is necessary to recreate millions of years of evolution and many thousands of generations. To accomplish this, a faster version of the environment should be provided, and the network must adapt at an appropriately speed-up rate. One can accomplish this feat with a Knowm™ adaptive network, but synapses musts be turned "on" and "off" for initialization at the beginning of every generation.

As indicated earlier, computer simulations of neural networks are too complicated and slow for efficient and useful applications. Such serial based algorithms must initialize connections and then run learning routines and then re-initialize, run again, and so forth. Certain connections are desired for initialization, while others simply must be turned off. System 3700 therefore presents a solution to this problem. A gate 3706 can be located adjacent to the connection gap 3710, electrically insulated, and thus provide an electric field for nanoconnections 3708, which can be, for example, semi-conducting nanotubes, nanowires, nanoparticle and/or other molecular semi-conducting structures.

Gate 3706 can be formed from materials, such as, for example, aluminum, gold, and the like. Note that the gate 3706 can be insulated from the nanoconnections and/or other molecular semi-conducting structures with the connection gap 3710 by a material, such as, for example, silicon dioxide or other types of oxide insulators. Although silicon dioxide is shown utilized in the configurations of systems 3700 and 3800, it can be appreciated that other types of insulating materials may also be utilized in place of silicon dioxide and that the use of silicon dioxide is not a limiting feature of the embodiments disclosed herein. Other types of insulating material that could be utilized in place of silicon dioxide or which could potentially complement the use of silicon dioxide as an insulator include materials such as, for example, aluminum oxide, hafnium oxide, zirconium oxide, yttrium oxide and/or silicon dioxide mixed with transition or rare-earth metals such as zirconium and/or lanthanum. The use of silicon dioxide as an insulating material in FIGS. 37 and 38 herein is therefore presented for illustrative and exemplary purposes only.

System 3700 can be comprised of semi-conducting nanoconnections 3708, rather than simply conducting nanoconnections and/or other conducting molecular structures. The semi-conducting nanoconnections 3708 can be formed from material such as, for example, carbon, silicon, indium phosphide, and so forth. An AC field can be formed across the connection gap 3710, and made to vary, thereby strengthening or weakening nanoconnections and accomplishing STDP rules.

Such a structure can be viewed as analogous to a field-effect transistor, in which the source and drain electrodes correspond to the pre- and post-synaptic electrodes, and which the gate effectively controls if the connection is on or off. What is different about this structure when compared to prior literature is that the resistance between the source and drain can be modified by aligning the nanoparticles with an alternating electric field across the source and drain electrodes, thereby implementing the functionality of a synapse with the added ability that the synapse can be turned "on" or "off" with the gate voltage.

Figure 38:
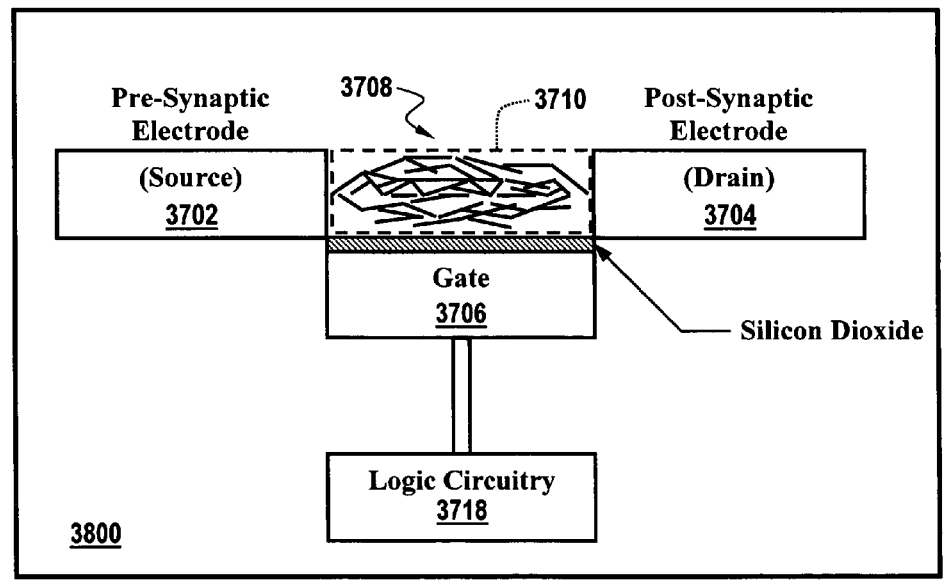
FIG. 38 illustrates a high-level block diagram illustrating a system 3800 comprising a network of nanoconnections formed between one or more respective input and output electrodes, in accordance with an alternative embodiment of the present invention.

FIG. 38 illustrates a high-level block diagram illustrating a system 3800 comprising a network of nanoconnections 3708 formed between one or more respective input and output electrodes 3702 and 3704, in accordance with an alternative embodiment of the present invention. Note that in FIGS. 37 and 38, identical or analogous features or elements are generally indicated by identical reference numerals. Thus, system 3800 of FIG. 38 is similar to that of system 3700 of FIG. 37, but additionally includes logic circuitry 3718, which can be connected to gate 3706. Such logic circuitry 3718 can include devices such as NAND, NOR, OR, and/or AND logic circuitry and the like.

Logic circuitry 3718 can thus include additionally circuitry such as transistors, resistors, capacitors, and the like. The use of gate 3706 in association with nanoconnections 3708 permits the connections 3708 and/or connection network thereof to function as a transistor or a group of transistors for determining which individual synapses or groups thereof are to be identified as activated or deactivated. System 3700 of FIG. 37 and by extension, system 3800 of FIG. 38, permit individual synapses within the physical neural network thereof to be turned "ON" or "OFF". Thus, systems 3700 and 3800 can be utilized in the context of a developers chip or a training chip for initialization and/or re-initialization and training of the physical neural network formed thereof.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. An electromechanical neural network system based on nanotechnology, comprising:
    an adaptive synaptic element comprising a plurality of nanoconductors suspended and free to move about in a liquid dielectric solution located within a connection gap formed between at least one pre-synaptic electrode and at least one post-synaptic electrode, wherein said liquid dielectric solution comprises a mixture of said plurality of nanoconductors and a dielectric solvent, wherein said liquid dielectric solution possesses an electrical conductance that is less than an electrical conductance of said plurality of nanoconductors suspended in said liquid dielectric solution;
    a plurality of interconnected nanoconnections associated with said adaptive synaptic element, said plurality of interconnected nanoconnections comprising said plurality of nanoconductors in said liquid dielectric solution, said plurality of interconnected nanoconnections electrically connecting said at least one pre-synaptic electrode to said at least one post-synaptic electrode through said liquid dielectric solution and said plurality of nanoconductors disposed within said liquid dielectric solution; and
    a voltage mechanism for applying an electric field across said connection gap, whereby said electric field induces a dipole in each nanoconductor among said plurality of nanoconductors, thereby creating a dielectrophoretic force attracting said plurality of nanoconductors to said connection gap and aligning said plurality of nanoconductors within said liquid dielectric solution and strengthening or weakening each nanoconnection among said plurality of interconnected nanoconnections according to an application of said electric field across said connection gap; and
    a feedback circuit electrically connected to and associated with said adaptive synaptic element and said voltage mechanism, said feedback circuit providing at least one feedback signal, wherein said feedback circuit together with said adaptive synaptic element and said voltage mechanism comprise a multi-layer, feed-forward network that includes said liquid dielectric solution, said at least one pre-synaptic electrode and said at least one-post synaptic electrode.

2. The system of claim 1 further comprising:
    a plurality of synapses associated with said adaptive synaptic element, wherein said plurality of synapses comprises said plurality of interconnected nanoconnections of said adaptive synaptic element and wherein each synapse among said plurality of synapse adapts to a voltage independent of voltage polarization.

3. The system of claim 1 wherein each nanoconductor among said plurality of nanoconductors comprises a carbon nanotube.

4. The system of claim 1 wherein each nanoconductor among said plurality of nanoconductors comprises gold.

5. The system of claim 1 wherein each nanoconductor among said plurality of nanoconductors comprises latex.

6. The system of claim 1 wherein each nanoconductor among said plurality of nanoconductors comprises DNA.

7. The system of claim 1 wherein each nanoconductor among said plurality of nanoconductors comprises silicon.

8. The system of claim 2 wherein said voltage mechanism for applying an electric field across said connection gap applies a voltage across a space occupied by said liquid dielectric solution to configure and arrange said adaptive synaptic element, said voltage comprising a DC voltage or an AC voltage that when applied across said liquid dielectric solution gradually forms said interconnected nanoconnections of said plurality of interconnected nanoconnections in said liquid dielectric solution within said connection gap between said at least one pre-synaptic electrode and said at least one post-synaptic electrode.

9. The system of claim 1 wherein said feedback circuit connected to said adaptive synaptic element provides for a Hebbian synapse modification that permits said adaptive synaptic element to function as a recurrent and highly interconnected network.

10. The system of claim 1 further comprising a learning mechanism connected to said adaptive synaptic element to train said electromechanical neural network system, wherein said learning mechanism trains said electromechanical physical neural network utilizing an STDP (Spike-Timing Dependent-Plasticity) training rule.

11. The system of claim 8 wherein said voltage mechanism generates a weak alternating electric current perpendicular to said plurality of interconnected nanoconnections, which causes at least some of said plurality of interconnected nanoconnections not contributing to a desired output to weaken and eventually dissolve back into said liquid dielectric solution, thereby allowing for an increased flexibility in a continuous training of said electromechanical neural network system utilizing said training mechanism.

12. The system of claim 10 wherein at least some of said interconnected nanoconnections among said plurality of interconnected nanoconnections are weakened by increasing a temperature of said liquid dielectric solution, which causes at least some of said plurality of interconnected nanoconnections not contributing to a desired output to weaken and eventually dissolve back into said liquid dielectric solution, thereby allowing for an increased flexibility in a continuous training of said electromechanical neural network system utilizing said training mechanism.

13. The system of claim 2 further comprising:
    at least one base neuron in a perpendicular array structure composed of a plurality of neural network layers coupled with said plurality of synapses comprising said plurality of interconnected nanoconnections of said adaptive synaptic element, wherein each synapse among said plurality of synapses comprises a plurality of connections conduits separated by a particular distance wherein each connection conduit among said plurality of connection conduits is a result of said plurality of nanoconductors aligning in the presence of said electric field, wherein said electric field is generated by a temporal and sequential firing of said at least one base neuron.

14. The system of claim 1 wherein said dielectric solvent comprises a volatile liquid and further comprising an air-tight seal for confining said liquid dielectric solution within said connection gap to prevent said volatile liquid from coming into contact with air.

15. The system of claim 2 further comprising a gate located adjacent said connection gap, and insulated from electrical contact by an insulation layer, wherein said gate is connected to logic circuitry which can activate or deactivate at least one synapse among said plurality of synapses utilizing a gate voltage provided by said gate, whereby a resistance between said at least one pre-synaptic electrode and said at least one post-synaptic electrode is modifiable by aligning said plurality of nanoconductors in said liquid dielectric solution when said electric field is applied across said connection gap and comprises an alternating electric field.

16. An electromechanical neural network system based on nanotechnology, comprising:
   a resistive synaptic element comprising a plurality of nanoconductors suspended and free to move about in a liquid dielectric solution located within a connection gap formed between at least one pre-synaptic electrode and at least one post-synaptic electrode, wherein said liquid dielectric solution comprises a mixture of said plurality of nanoconductors and a dielectric solvent, wherein said resistive synaptic element functions as an impermanent interconnect between maid at least one pre-synaptic electrode and said at least one post-synaptic electrode;
   a plurality of interconnected nanoconnections associated with said resistive synaptic element, said plurality of interconnected nanoconnections comprising said plurality of nanoconductors in said liquid dielectric solution, said plurality of interconnected nanoconnections electrically connecting said at least one pre-synaptic electrode to said at least one post-synaptic electrode through said liquid dielectric solution and said plurality of nanoconductors disposed within said liquid dielectric solution;
   a plurality of synapses associated with said resistive synaptic element, wherein said plurality of synapses comprises said plurality of interconnected nanoconnections of said resistive synaptic element and wherein each synapse among said plurality of synapses is independent of voltage polarization; and
   a voltage mechanism for applying an AC electric field across said connection gap, whereby said AC electric field induces a dipole in each nanoconductor among said plurality of nanoconductors only when said plurality of nanoconductors is located within said liquid dielectric solution, thereby generating a dielectrophoretic force attracting said plurality of nanoconductors to said connection gap and aligning said plurality of nanoconductors within said liquid dielectric solution and strengthening or weakening each nanoconnection among said plurality of interconnected nunoconnections according to an application of said AC electric field across said connection gap so that said electromechanical neural network system adapts itself to the requirements of a given situation regardless of the initial state of said plurality of interconnected nanoconnections; and
   a feedback circuit connected to and associated with said resistive synaptic element and said voltage mechanism, said feedback circuit providing at least one feedback signal, wherein the longer the amount of time said AC electric field is applied across said connection gap and/or the greater the frequency or amplitude of said AC electric field applied across said connection gap, the more nanoconductors among said plurality of nanoconductors align and the stronger said interconnected nanoconnections among said plurality of nanoconnections become.

17. The system of claim 16 further comprising a learning mechanism connected to said resistive synaptic element to train said electromechanical neural network system, wherein said learning mechanism includes said feedback circuit and trains said electromechanical physical neural network utilizing an STDP (Spike-Timing Dependent-Plasticity) training rule.

18. A method of forming an electromechanical neural network system based on nanotechnology, comprising:
   providing a liquid dielectric solution comprising a mixture of a dielectric solvent and a plurality of nanoconductors, wherein each nanoconductor among said plurality of nanoconductors is suspended and free to move about in said liquid dielectric solution;
   forming a connection gap between at least one pre-synaptic electrode and said at lease post-synaptic electrode;
   configuring a connection network to comprise said plurality of nanoconductors suspended and free to move about in said liquid dielectric solution located within said connection gap formed between said at least one pre-synaptic electrode and said at least one post-synaptic electrode, wherein said connection network comprises an impermanent interconnect between said at least one pre-synaptic electrode and said at least one post-synaptic electrode;
   configuring said connection network to comprises a plurality of interconnected nanoconnections with said connection network, wherein said plurality of interconnected nanoconnections comprise said plurality of nanoconductors in said liquid dielectric solution, said plurality of interconnected nanoconnections electrically connecting said at least one pre-synaptic electrode to said at least one post-synaptic electrode through said liquid dielectric solution and said plurality of nanoconductors disposed within said liquid dielectric solution;
   providing a plurality of synapses from said connection network, wherein said plurality of synapses comprises said plurality of interconnected nanoconnections of said connection network and wherein each synapse among said plurality of synapses is independent of voltage polarization;
   applying an electric field across said connection gap, whereby said electric field induces a dipole in each nanoconductor among said plurality of nanoconductors only when said plurality of nanoconductors is located within said liquid dielectric solution, thereby generating a clielectrophoretic force attracting said plurality of nanoconductors to said connection gap and aligning said plurality of nanoconductors within said liquid dielectric solution and strengthening or weakening each nanoconnection among said plurality of interconnected nanoconnections according to an application of said electric field across said connection gap; and
   providing at least one feedback signal to said connection network from a feedback circuit connected to and associated with said connection network and said plurality of synapses.

19. The method of claim 18 wherein the longer the amount of time said electric field is applied across said connection gap and/or the greater the frequency or amplitude of said electric field applied across said connection gap, the more nanoconductors among said plurality of nanoconductors align and the stronger said interconnected nanoconnections among said plurality of nanoconnections become.

20. The method of claim 18 further comprising training said electromechanical neural network system utilizing an STDP (Spike-Timing Dependent-Plasticity) training rule.

* * * * *